US012731543B2

(12) United States Patent
Shin et al.

(10) Patent No.: US 12,731,543 B2
(45) Date of Patent: Sep. 8, 2026

(54) PIXEL CIRCUIT AND DISPLAY DEVICE

(71) Applicant: LG Display Co., Ltd., Seoul (KR)

(72) Inventors: Ki Seob Shin, Paju-si (KR); Da Hye Shim, Paju-si (KR); Boo Heung Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/972,421

(22) Filed: Dec. 6, 2024

(65) Prior Publication Data

US 2025/0252919 A1 Aug. 7, 2025

(30) Foreign Application Priority Data

Feb. 5, 2024 (KR) ........................ 10-2024-0017420

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/08* (2013.01); *G09G 2320/0233* (2013.01); *G09G 2320/068* (2013.01); *G09G 2330/08* (2013.01); *G09G 2380/10* (2013.01)

(58) Field of Classification Search
CPC ....... H10K 59/00–95; G09G 2320/068; G09G 2320/028; G09G 2358/00; G09G 3/3233; G09G 2300/0426; G09G 3/3208
See application file for complete search history.

(56) References Cited

U.S. PATENT DOCUMENTS

2006/0125737 A1* 6/2006 Kwak .................. G09G 3/3233 345/76
2009/0039355 A1* 2/2009 Kwak ..................... A61P 13/12 257/72
2013/0162620 A1* 6/2013 Kim ..................... G09G 3/3233 345/212
2014/0176399 A1* 6/2014 Lee .......................... G09G 3/20 345/55
2021/0066430 A1* 3/2021 Cha ...................... H10K 59/131
(Continued)

FOREIGN PATENT DOCUMENTS

KR 10-2022-0165958 A 12/2022
KR 10-2023-0102364 A 7/2023
KR 10-2023-0102365 A 7/2023

*Primary Examiner* — Sanjiv D. Patel

(74) *Attorney, Agent, or Firm* — Morgan, Lewis & Bockius LLP

(57) ABSTRACT

A pixel circuit may include a first light-emitting element; a second light-emitting element; a driving element configured to drive the first and second light-emitting elements; a first switch element connected between the driving element and the first light-emitting element; a second switch element connected between the driving element and the second light-emitting element; and a compensation circuit including: a capacitor connected to a gate electrode of the driving element; a third switch element configured to apply a reference voltage to one electrode of the capacitor; a fourth switch element connected between the first light-emitting element and an initialization voltage line to which an initialization voltage is applied; and a fifth switch element connected to the second light-emitting element and the initialization voltage line. A display device is also disclosed.

24 Claims, 41 Drawing Sheets

(56) References Cited

U.S. PATENT DOCUMENTS

| | | | | |
|---|---|---|---|---|
| 2022/0399529 | A1* | 12/2022 | Shin | G09G 3/3258 |
| 2023/0217690 | A1 | 7/2023 | Hong et al. | |
| 2023/0217763 | A1 | 7/2023 | Hong et al. | |
| 2024/0107812 | A1* | 3/2024 | Kim | G09G 3/3233 |
| 2024/0221590 | A1* | 7/2024 | Wang | G09G 3/3233 |

* cited by examiner

FIG. 16

| Parameter | Voltage [V] |
|---|---|
| VDD | 12 |
| VSS | 0 |
| Vref | 3 |
| VGH | 16 |
| VGL | -9 |
| Vdata | 0.5~5 |
| Vini_P(R) | 0.5 |
| Vini_S(R) | 1 |
| Vini_P(GB) | 1.5 |
| Vini_S(GB) | 2 |

Tini

PIXEL CIRCUIT AND DISPLAY DEVICE

CROSS-REFERENCE TO RELATED APPLICATIONS

This application claims the benefit of and priority to Korean Patent Application No. 10-2024-0017420, filed Feb. 5, 2024, the entire contents of which are incorporated herein by reference for all purposes.

BACKGROUND

1. Technical Field

The present disclosure relates to a pixel circuit and a display device optionally including the same.

2. Description of the Related Art

Variable viewing angle technology is being applied to display devices. Variable viewing angle technology may present video content or visual information reproduced on a display device only to a user within a narrow viewing angle range, or to multiple users within a wide viewing angle range.

As the market for future vehicles such as electric vehicles and self-driving cars expands, demand for vehicle display devices is rapidly increasing. Research is being conducted on a method of dividing the screen of a vehicle display device and controlling one part of the screen to have a narrow viewing angle and the other part to have a wide viewing angle. This technology may drive pixels with a narrow viewing angle arranged in one area of the screen to display personal contents or information that only a specific user may view, and simultaneously drive pixels with a wide viewing angle arranged in the other area of the screen to display shared contents that multiple users may view together.

In vehicle display devices, display panels for organic light emitting display devices are attracting attention. An organic light emitting display device includes an organic light emitting diode (hereinafter, referred to as "OLED") that emits light by itself, and has an advantage in that the response speed is fast, the luminous efficiency and luminance are good, and the viewing angle is wide. The organic light emitting display device has a fast response speed, is excellent in terms of luminous efficiency, luminance and viewing angle, and provides an excellent contrast ratio and color reproducibility since it may express the black grayscale in complete black. Because the display panel of an organic light emitting display device may be flexibly bent, it may easily implement a curved surface. Due to these advantages, the share of organic light emitting display devices in the vehicle display device market is rapidly increasing.

The description of the related art should not be assumed to be prior art merely because it is mentioned in or associated with this section. The description of the related art includes information that describes one or more aspects of the subject technology, and the description in this section does not limit the invention.

SUMMARY

In one or more aspects of the present disclosure, each pixel employed in an in-vehicle display device includes two light-emitting elements with different viewing angles. In one or more aspects, the same reference voltage is used as a voltage to initialize the light-emitting element of each pixel or to set a driving current for the light-emitting element to emit light.

However, since the light-emitting element uses the same reference voltage, this may result in black floating during emission, as well as an event where a red pixel emits light earlier at low grayscale.

Although it is necessary to lower the reference voltage to improve the black floating, lowering the reference voltage will reduce the data range because the reference voltage is included in the formula used to obtain the driving current.

The inventors of the present disclosure have recognized the problems and needs of the related art, have performed extensive research and experiments, and have developed a new invention. One or more aspects of the present disclosure are directed to a display panel and a display device that substantially obviate one or more problems due to limitations and disadvantages of the related art.

One or more aspects of the present disclosure provide a pixel circuit and a display device including the same.

It should be noted that aspects and objects of the present disclosure are not limited to the above-described aspects and objects, and other aspects and objects of the present disclosure will be apparent to those skilled in the art from the present disclosure.

A pixel circuit according to example embodiments of the present disclosure may include a first light-emitting element; a second light-emitting element; a driving element configured to drive the first and second light-emitting elements; a first switch element connected between the driving element and the first light-emitting element; a second switch element connected between the driving element and the second light-emitting element; and a compensation circuit including: a capacitor connected to a gate electrode of the driving element; a third switch element configured to apply a reference voltage to one electrode of the capacitor; a fourth switch element connected between the first light-emitting element and an initialization voltage line to which an initialization voltage is for being applied; and a fifth switch element connected to the second light-emitting element and the initialization voltage line.

A display device according to example embodiments of the present disclosure may include a pixel array in which a plurality of data lines, a plurality of gate lines, and a plurality of pixel circuits are disposed; a data driver configured to output a data voltage to the plurality of data lines; and a gate driver configured to output a gate signal to the plurality of gate lines, wherein each of the plurality of pixel circuits includes: a first light-emitting element; a second light-emitting element; a driving element configured to drive the first and second light-emitting elements; a first switch element connected between the driving element and the first light-emitting element; a second switch element connected between the driving element and the second light-emitting element; and a compensation circuit including: a capacitor connected to a gate electrode of the driving element; a third switch element configured to apply a reference voltage to one electrode of the capacitor; a fourth switch element connected between the first light-emitting element and an initialization voltage line to which an initialization voltage is for being applied; and a fifth switch element connected to the second light-emitting element and the initialization voltage line.

A display device according to example embodiments of the present disclosure may include a display panel in which a plurality of data lines, a plurality of gate lines, a plurality of voltage lines, and a plurality of sub-pixels are disposed, wherein the plurality of voltage lines include an initialization voltage line to which an initialization voltage is for being applied, and wherein the initialization voltage line includes: a first voltage line which is disposed in a non-display area surrounding a display area for displaying an image and which is configured to receive the initialization voltage from a power supply; and a plurality of second voltage lines which are disposed in the display area, which are branched from the first voltage line, and which are configured to supply the initialization voltage to the plurality of sub-pixels.

One or more aspects of the subject technology are configured to supply an initialization voltage for initializing the anode electrodes of the first and second light-emitting elements (such as first and second light-emitting elements with different viewing angles) to be, for example, lower than the reference voltage for controlling the driving current flowing through the driving elements, thereby improving the degree of freedom in controlling the driving current and improving black floating.

According to one or more aspects of the present disclosure, since the initialization voltage is set differently in the first mode and the second mode, it is possible to prevent the red sub-pixel from emitting light earlier at the low grayscale, thereby improving luminance uniformity.

According to one or more aspects of the present disclosure, a repair capacitor is formed between the initialization voltage line and the node connected to the anode electrodes of the first and second light-emitting elements, and the repair capacitor is welded when necessary. This makes it possible to change light dots to dark dots, thereby improving production yield.

One or more aspects of the present disclosure may enable low power driving and process optimization.

The effects of the present disclosure are not limited to the above-mentioned effects, and other effects that are not mentioned will be apparently understood by those skilled in the art from the following description and the appended claims.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing description and the following description of the present disclosure are examples, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure. In the drawings:

FIG. 16 is an example of a diagram illustrating the magnitude of an initialization voltage applied to the pixel circuit;

Figure 1:
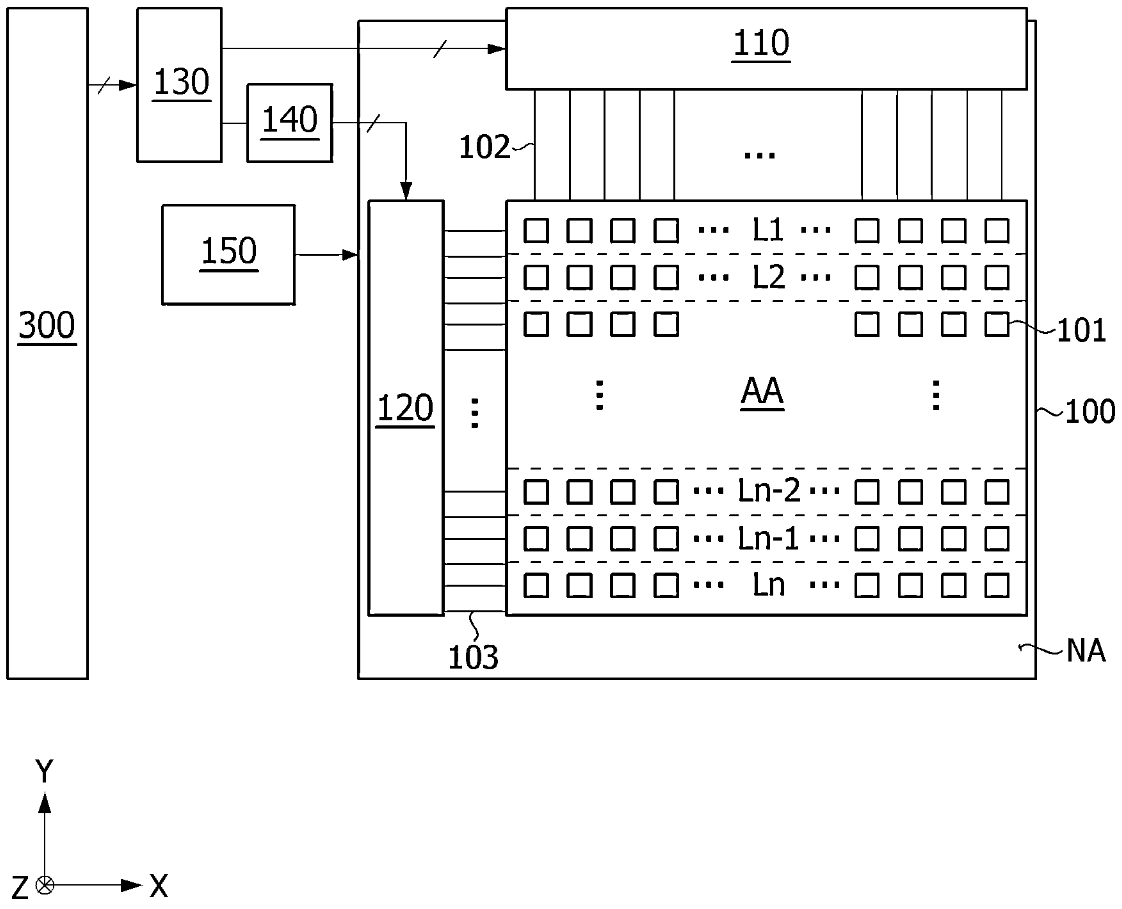
FIG. 1 is a block diagram illustrating a display device according to one example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. Unless stated otherwise, the same reference numerals may be used to refer to the same or substantially the same elements throughout the specification and the drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term “comprise,” “have,” “include,” “contain,” “constitute,” “made of,” “formed of,” “composed of,” or the like is used with respect to one or more elements (e.g., layers, films, components, circuits, transistors, voltage lines, voltages, regions, areas, portions, steps, operations, and/or the like), one or more other elements may be added unless a term such as “only” or the like is used. The terms used in the present disclosure are merely used in order to describe particular example embodiments, and are not intended to limit the scope of the present disclosure. The terms of a singular form may include plural forms unless the context clearly indicates otherwise. The word “exemplary” is used to mean serving as an example or illustration. Embodiments are example embodiments. Aspects are example aspects. In one or more implementations, “embodiments,” “examples,” “aspects,” and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term “may” encompasses all the meanings of the term “can.”

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

When a positional relationship between two elements (e.g., layers, films, components, circuits, transistors, voltage lines, voltages, regions, areas, portions, and/or the like) are described using any of the terms such as “on,” “on a top of,” “upon,” “on top of,” “over,” “under,” “above,” “upper,” “at an upper portion,” “below,” “lower,” “at a lower portion,” “beneath,” “near,” “close to,” “adjacent to,” “beside,” “next to,” “at or on a side of,” and/or the like indicating a position or location, one or more other elements may be located between the two elements unless a more limiting term, such as “immediate(ly),” “direct(ly),” or “close(ly),” is used. For example, when an element and another element are described using any of the foregoing terms, this description should be construed as including a case in which the elements contact each other directly as well as a case in which one or more additional elements are disposed or interposed therebetween. Furthermore, the spatially relative terms such as the foregoing terms as well as other terms such as “front,” “rear,” “back,” “left,” “right,” “top,” “bottom,” “upper,” “lower,” “downward,” “upward,” “up,” “down,” “column,” “row,” “vertical,” “horizontal,” “diagonal,” and the like refer to an arbitrary frame of reference. For example, these terms may be used for an example understanding of a relative relationship between elements, including any correlation as shown in the drawings. However, embodiments of the disclosure are not limited thereby or thereto. The spatially relative terms are to be understood as terms including different orientations of the elements in use or in operation in addition to the orientation depicted in the drawings or described herein. For example, where a lower element or an element positioned under another element is overturned, then the element may be termed as an upper element or an element positioned above another element. Thus, for example, the term “under” or “beneath” may encompass, in meaning, the term “above” or “over.” An example term “below” or the like, can include all directions, including directions of “below,” “above” and diagonal directions. Likewise, an example term “above,” “on” or the like can include all directions, including directions of “above,” “on,” “below” and diagonal directions.

In describing a temporal relationship, when the temporal order is described as, for example, “after,” “following,” “subsequent,” “next,” “before,” “preceding,” “prior to,” or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like (including, for example, "first-first," "first-second," "second-first," and "second-second") may be used herein to describe various elements (e.g., layers, films, components, circuits, transistors, voltage lines, voltages, regions, areas, portions, steps, operations, and/or the like), these elements should not be limited by these terms, for example, to any particular order, precedence, or number of elements. These terms are used only to distinguish one element from another. For example, a first element may denote a second element, and, similarly, a second element may denote a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

For the expression that an element (e.g., layer, film, component, circuit, transistor, voltage line, voltage, region, area, portion, or the like) is "crossing," "intersecting," "connected," "coupled," "attached," "adhered," "linked," or the like another element or to another element, the element can not only be directly crossing, intersecting, connected, coupled, attached, adhered, linked, or the like another element or to another element, but also be indirectly crossing, intersecting, connected, coupled, attached, adhered, linked, or the like another element or to another element with one or more intervening elements disposed or interposed between the elements, unless otherwise specified.

For the expression that an element (e.g., layer, film, component, circuit, transistor, voltage line, voltage, region, area, portion, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, component, circuit, transistor, voltage line, voltage, region, area, portion, or the like) is "provided," "disposed," "connected," "coupled," or the like in, on, with or to another element may be understood, for example, as that at least a portion of the element is provided, disposed, connected, coupled, or the like in, on, with or to at least a portion of another element. The phrase "through" may be understood, for example, to be at least partially through or entirely through. The phrase that an element (e.g., layer, film, component, circuit, transistor, voltage line, voltage, region, area, portion, or the like) "contacts," "overlaps," or the like with another element may be understood, for example, as that at least a portion of the element contacts, overlaps, or the like with a least a portion of another element.

The terms such as a "line" or "direction" should not be interpreted only based on a geometrical relationship in which the respective lines or directions are parallel, perpendicular, diagonal, or slanted with respect to each other, and may be meant as lines or directions having wider directivities within the range within which the components of the present disclosure may operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, component, circuit, transistor, voltage line, voltage, region, area, portion, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in more detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor may be referred to as a first electrode and a second electrode or as a second electrode and a first electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

FIG. 1 is a block diagram illustrating a display device according to one example embodiment of the present disclosure.

Referring to FIG. 1, the display device according to an example embodiment of the present disclosure includes a display panel 100, and a display panel driving circuit for writing pixel data to pixels of the display panel 100. Additionally, the display device includes a power supply 150.

The display panel 100 may be, but not limited to, a panel having a rectangular structure with a length in the X-axis direction, a width in the Y-axis direction, and a thickness in the Z-axis direction. For example, the display panel 100 may be a heterogeneous panel of which at least a portion is curved or elliptical.

The display area AA of the display panel 100 includes a pixel array to display an input image. The pixel array includes a plurality of data lines 102, a plurality of gate lines 103 crossing the data lines 102, and pixels arranged in a matrix form. The display panel 100 may further include power lines commonly connected to the pixels. The power lines may be commonly connected to pixel circuits to supply a voltage required for driving pixels 101 to the pixels 101.

Each of the pixels 101 may be divided into (or may include) a red sub-pixel, a green sub-pixel, and a blue sub-pixel for color implementation. Each pixel may further include a white sub-pixel. Each sub-pixel includes a pixel circuit for driving a light emitting element. The light emitting element may include an OLED or an inorganic light emitting diode (LED). Each pixel circuit is connected to the data lines, the gate lines, and the power lines. In the following description, a pixel may be interpreted as a sub-pixel.

The pixels may be arranged as real color pixels and pentile pixels. A pentile pixel may realize a higher resolution than a real color pixel by driving two sub-pixels with different colors as one pixel 101 and using a preset pixel rendering algorithm. This pixel rendering algorithm may compensate for insufficient color representation in each pixel with the color of light emitted from adjacent pixels.

Each of the pixels may include at least one first light-emitting element that emits light in a first mode, and a second light-emitting element that emits light in a second mode. Each of the pixels 101 emits light from the first light-emitting element at a wide viewing angle in the first mode, while emitting light from the second light-emitting element at a narrow viewing angle in the second mode.

The display area AA includes a plurality of pixel lines L1 to Ln. Each of the pixel lines L1 to Ln includes one line of pixels arranged along the line direction (X-axis direction) in the pixel array of the display panel 100. Those pixels arranged in one pixel line share the gate lines 103. The sub-pixels arranged in the column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on the screen and a real object in the background is visible. The display panel 100 may be made of a flexible display panel.

The power supply 150 receives an input voltage applied from the host system 300 and outputs a voltage needed to drive the pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output a constant voltage (or direct current voltage), such as gate-on voltage, gate-off voltage, pixel driving voltage, cathode voltage, reference voltage, and IC driving voltage of the display panel driving circuit, through the DC-DC converter. The gate-on voltage and the gate-off voltage may be supplied to the level shifter 140 and the gate driver 120. Voltages such as pixel driving voltage, cathode voltage, and reference voltage may be supplied to the pixels 101 through the power lines commonly connected to the pixels 101.

The display panel driving circuit writes pixel data of the input image to the pixels 101 of the display panel 100 under the control of the timing controller 130. The display panel driving circuit includes a data driver 110 and a gate driver 120.

The display panel driving circuit may further include a touch sensor driver for driving touch sensors. The touch sensor driver is not shown in FIG. 1. The data driver 110 and the touch sensor driver may be integrated into one source drive IC.

The data driver 110 receives pixel data of the input image as a digital signal from the timing controller 130 and outputs a data voltage. The data driver 110 may receive gamma reference voltages and generate gamma compensation voltages for each grayscale through a voltage dividing circuit. The per-grayscale gamma compensation voltages are supplied to a digital to analog converter (hereinafter referred to as "DAC") disposed in each channel of the data driver 110.

The data driver 110 samples and latches digital data received from the timing controller 130 and then inputs (or provides) the digital data to the DAC. Here, the digital data includes pixel data of the input image. Additionally, the digital data may include mode selection data for selecting first mode and second mode. The DAC converts the pixel data into a gamma compensation voltage and outputs a data voltage of the pixel data.

The gate driver 120 may be formed on the display panel 100 together with the circuit elements and wiring lines of the display area AA. The gate driver 120 may be disposed in at least one of left and right non-display areas NA outside the display area AA in the display panel 100 or at least a part thereof may be disposed within the display area AA.

The gate driver 120 may be disposed in the non-display areas NA on both sides of the display panel 100 with the display area AA of the display panel interposed therebetween to supply gate pulses on both sides of the gate lines 103 in a double feeding method. In another example embodiment, the gate driver 120 may be disposed in at least one of the left and right non-display areas NA of the display panel 100 to supply gate signals to the gate lines 103 in a single feeding method. The gate driver 120 sequentially outputs pulses of the gate signals to the gate lines 103 under the control of the timing controller 130. The gate driver 120 may sequentially supply the gate signals to the gate lines 103 by shifting the pulses of the gate signals using shift registers. When a plurality of gate signals are applied to each pixel, the gate driver 120 may include a plurality of shift registers. The gate signal may include a scan signal being input to the pixel circuit through a plurality of gate lines, and an emission signal (or EM signal).

The timing controller 130 receives digital video data of an input image and a timing signal synchronized with this data from the host system 300. The timing signal may include a vertical synchronization signal Vsync, a horizontal synchronization signal Hsync, and a data enable signal DE. Since the vertical period and horizontal period may be known by counting the data enable signal DE, the vertical synchronization signal Vsync and the horizontal synchronization signal Hsync may be omitted. The horizontal synchronization signal Hsync and the data enable signal DE have a periodicity of 1 horizontal period (1H).

The timing controller 130 may control the display panel driving circuit by generating a data timing control signal for controlling the operation timing of the data driver 110 and a gate timing control signal for controlling the operation timing of the gate driver 120 based on the timing signals Vsync, Hsync, and DE received from the host system 300. The timing controller 130 may synchronize the data driver 110 and the gate driver 120 by controlling the operation timing of the display panel driving circuit.

The gate timing control signal output from the timing controller 130 may be input to the shift register of the gate driver 120 through the level shifter 140. The level shifter 140 may convert a voltage of the gate timing control signal received from the timing controller 130 to a swing width between the gate-on voltage and the gate-off voltage and supply it to the gate driver 120.

The host system 300 may include a main board of one of a television system, a set-top box, a navigation system, a personal computer (PC), a vehicle system, a mobile terminal, and a wearable terminal. The host system 300 may scale an image signal from a video source according to the resolution of the display panel 100, and may transmit it to the timing controller 130 together with the timing signals.

Figure 2A:
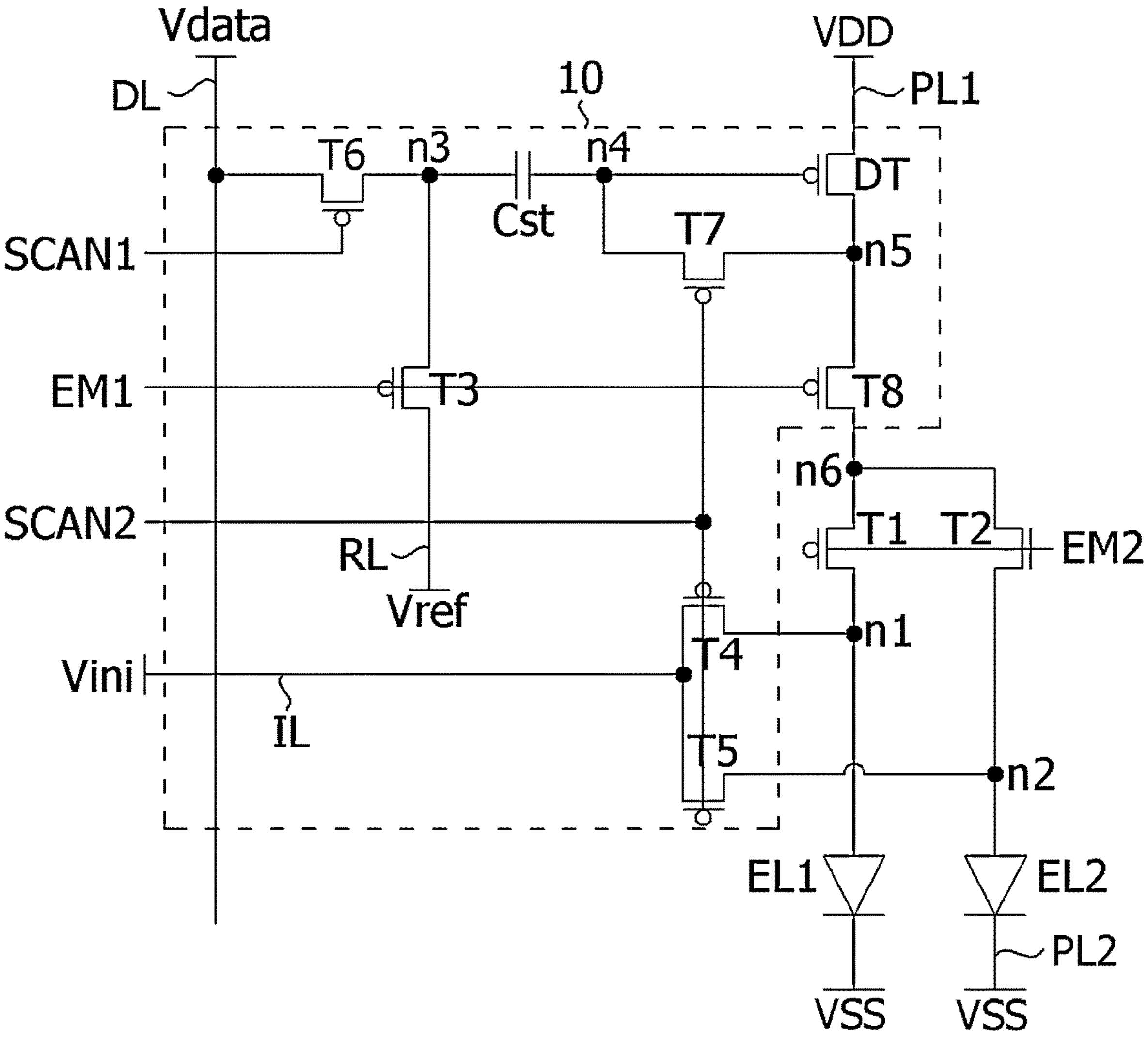
FIGS. 2A and 2B are circuit diagrams illustrating a pixel circuit according to a first example embodiment of the present disclosure.
Figure 2B:
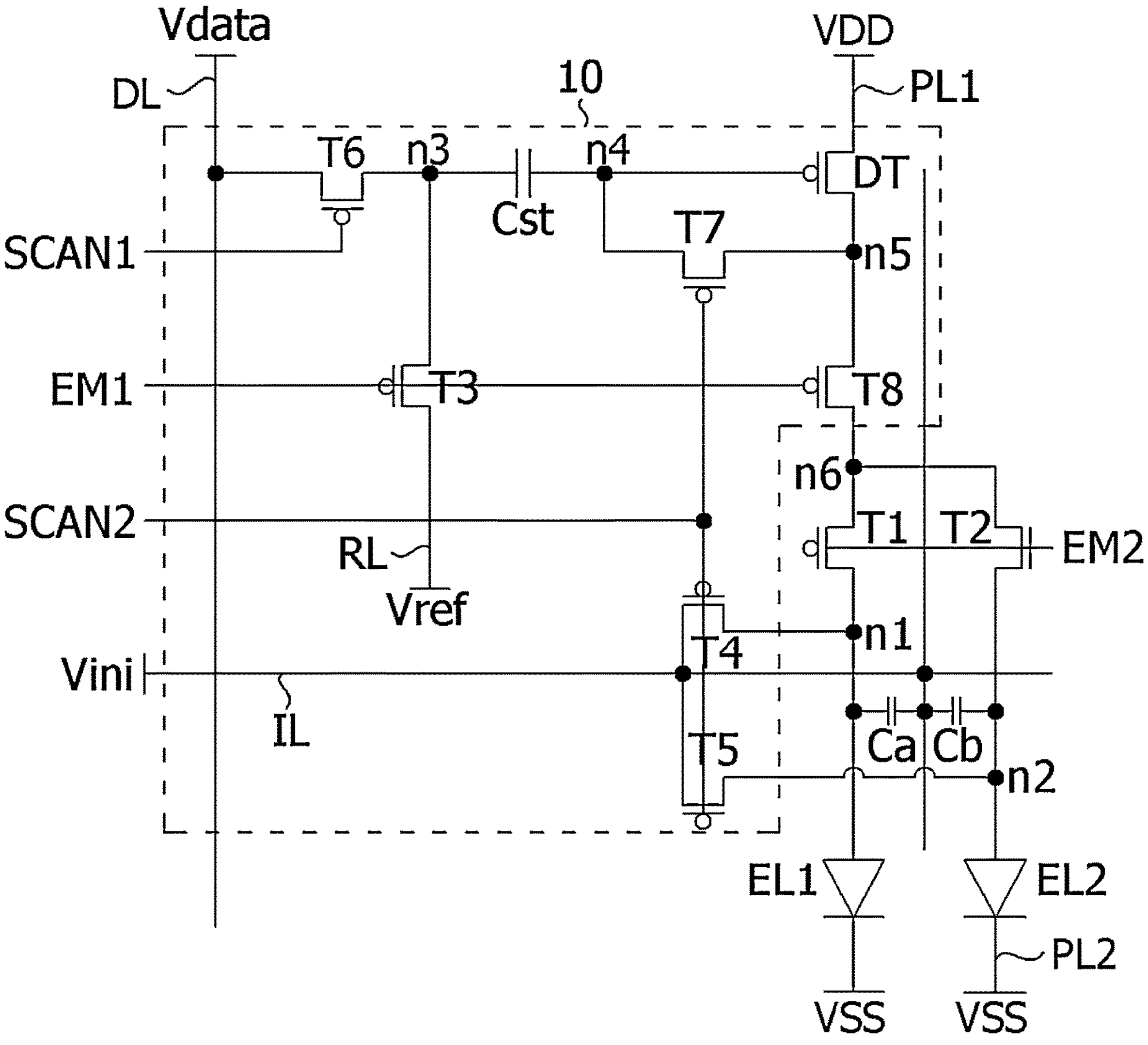
Figure 3:
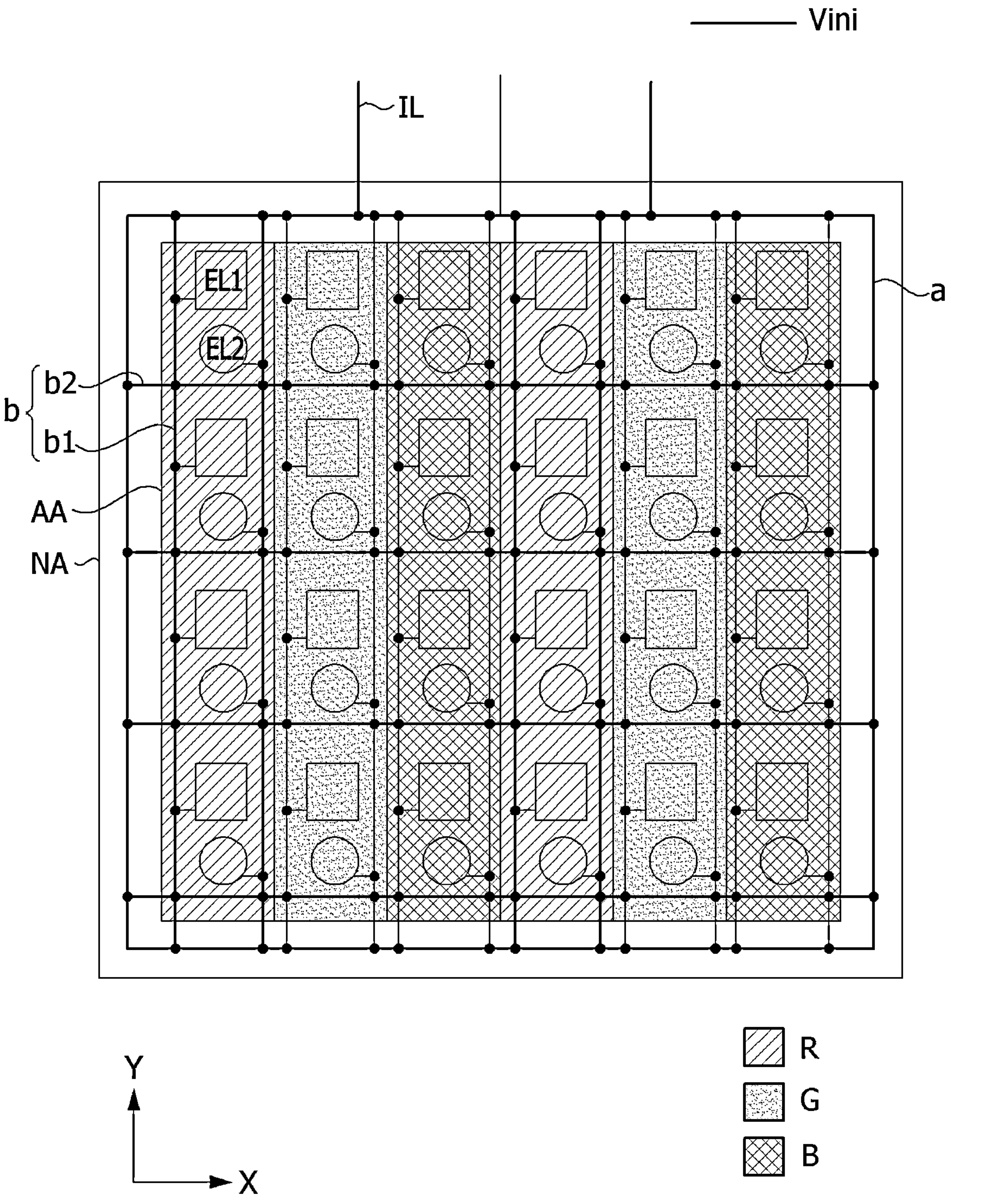
FIG. 3 is an example of a diagram illustrating an arrangement of the initialization voltage lines shown in FIG. 2B.
Figure 4:
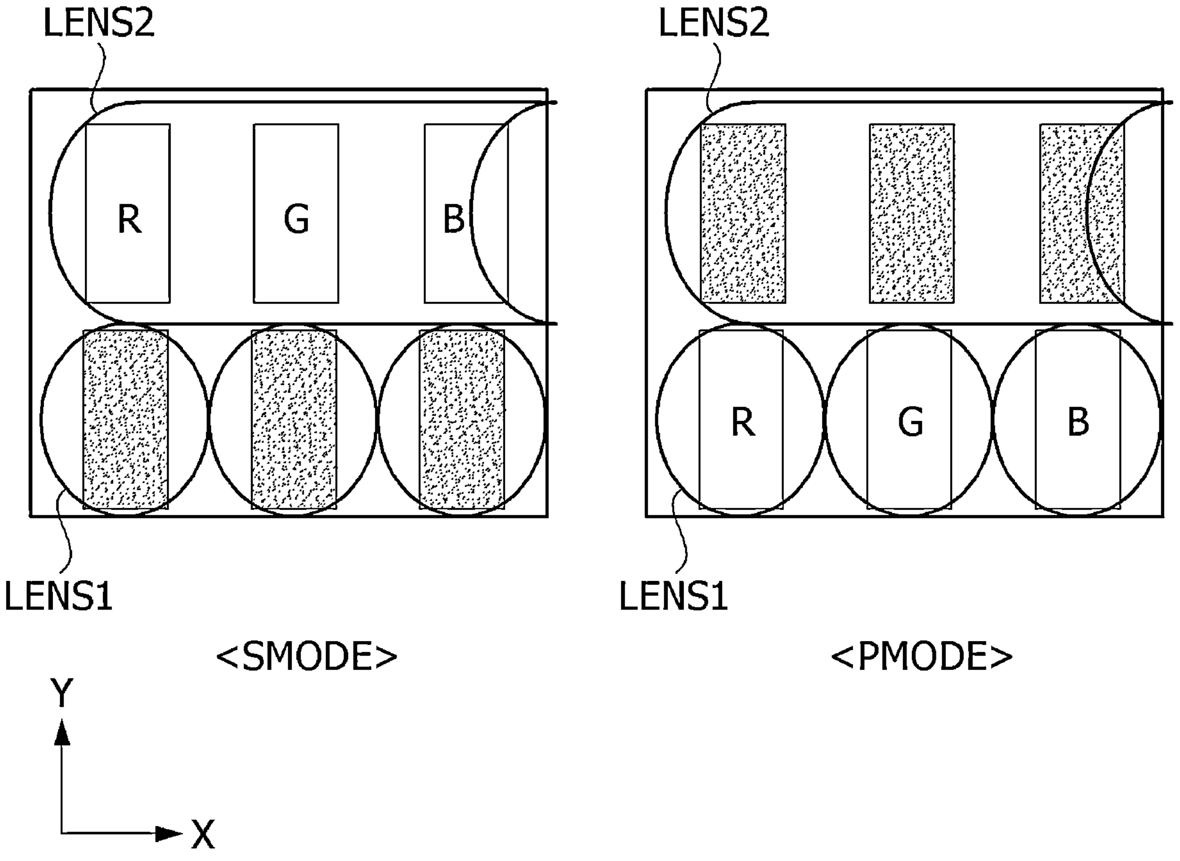
FIG. 4 is an example of a diagram illustrating lenses disposed over first and second light-emitting elements.

FIGS. 2A and 2B are circuit diagrams illustrating a pixel circuit according to a first example embodiment of the present disclosure, FIG. 3 is an example of a diagram illustrating an arrangement of the initialization voltage lines shown in FIG. 2B, and FIG. 4 is an example of a diagram illustrating lenses disposed over first and second light-emitting elements.

Referring to FIGS. 2A and 2B, a pixel circuit according to a first example embodiment includes a first light-emitting element EL1 that emits light in a first mode PMODE, a second light-emitting element EL2 that emits light in a second mode SMODE, a driving element DT to drive the first and second light-emitting elements EL1 and EL2, a compensation circuit 10 connected to the driving element, a first switch element T1, and a second switch element T2. The compensation circuit includes a plurality of switch elements T3 to T8 and a capacitor Cst. The driving element DT and the plurality of switch elements T1 and T3 to T8 may be implemented as p-channel transistors, and the switch element T2 may be implemented as an n-channel transistor, but are not necessarily limited thereto.

The pixel circuit is connected to power lines to which a direct current or a constant voltage is applied, such as a pixel driving voltage line or first power line PL1 to which a pixel driving voltage VDD is applied, a pixel base voltage line or second power line PL2 to which a pixel base voltage VSS is applied, a reference voltage line RL to which a reference voltage Vref is applied, and an initialization voltage line IL to which an initialization voltage Vini is applied. On the display panel 100, the power lines are commonly connected to all pixels.

The driving element DT drives the first and second light-emitting elements EL1 and EL2 by generating a current according to a gate-source voltage Vgs. The driving element DT includes a first electrode connected to the first power line PL1 to which the pixel driving voltage VDD is applied, a gate electrode connected to a fourth node n4, and a second electrode connected to a fifth node n5.

The first and second light-emitting elements EL1 and EL2 may be implemented as organic light-emitting diodes (OLEDs). Each of the light-emitting elements EL1 and EL2 includes an anode, a cathode, and an organic compound layer formed between the anode and the cathode. The anode of the first light-emitting element EL1 is connected to a fifth node n5, and the cathode thereof is connected to the second power line PL2 to which the pixel base voltage VSS is applied. The anode of the second light-emitting element EL2 is connected to a sixth node n6, and the cathode thereof is connected to the second power line PL2. The organic compound layer may include a hole injection layer HIL, a hole transport layer HTL, an emission layer EML, an electron transport layer ETL, and an electron injection layer EIL, but the present disclosure is not limited thereto. Each of the light-emitting elements EL1 and EL2 may be implemented in a tandem structure in which a plurality of light-emitting layers are stacked. The light-emitting elements EL1 and EL2 of the tandem structure may improve the luminance and lifetime of the pixel.

The first switch element T1 is connected between a first node n1 and a sixth node n6. The first switch element T1 is turned on according to the gate-on voltage VGL of a fourth gate signal EM2 to connect the first node n1 to the sixth node n6. The first switch element T1 includes a first electrode connected to the sixth node n6, a gate electrode to which the fourth gate signal EM2 is applied, and a second electrode connected to the first node n1.

The second switch element T2 is connected between a second node n2 and the sixth node n6. The second switch element T2 is turned on according to the gate-on voltage VGH of the fourth gate signal EM2 to connect the second node n2 to the sixth node n6. The second switch element T2 includes a first electrode connected to the sixth node n6, a gate electrode to which the fourth gate signal EM2 is applied, and a second electrode connected to the second node n2.

A third switch element T3 is connected between a third node n3 and the reference voltage line RL. The third switch element T3 is turned on according to the gate-on voltage VGL of a third gate signal EM1 to connect the third node n3 to the reference voltage line RL. The third switch element T3 includes a first electrode connected to the third node n3, a gate electrode to which the third gate signal EM1 is applied, and a second electrode connected to the reference voltage line RL.

A fourth switch element T4 is connected between the first node n1 and the initialization voltage line IL. The fourth switch element T4 is turned on according to the gate-on voltage VGL of a second gate signal SCAN2 to connect the first node n1 to the initialization voltage line IL. The fourth switch element T4 includes a first electrode connected to the initialization voltage line IL, a gate electrode to which the second gate signal SCAN2 is applied, and a second electrode connected to the first node n1.

A fifth switch element T5 is connected between the second node n2 and the initialization voltage line IL. The fifth switch element T5 is turned on according to the gate-on voltage VGL of the second gate signal SCAN2 to connect the second node n2 to the initialization voltage line IL. The fifth switch element T5 includes a first electrode connected to the initialization voltage line IL, a gate electrode to which the second gate signal SCAN2 is applied, and a second electrode connected to the second node n2.

A sixth switch element T6 is connected between the data line DL and the third node n3. The sixth switch element T6 is turned on according to the gate-on voltage VGL of the first gate signal SCAN1 to apply the data voltage Vdata of pixel data to the third node n3. The sixth switch element T6 includes a first electrode connected to the data line DL, a gate electrode to which the first gate signal SCAN1 is applied, and a second electrode connected to the third node n3.

A seventh switch element T7 is connected between a fourth node n4 and a fifth node n5. The seventh switch element T7 is turned on in response to the gate-on voltage of the second gate signal SCAN2 to connect a gate electrode of the driving element DT and a second electrode thereof. The seventh switch element T7 includes a first electrode connected to the fourth node n4, a gate electrode to which the second gate signal SCAN2 is applied, and a second electrode connected to the fifth node n5.

An eighth switch element T8 is connected between the fifth node n5 and the sixth node n6. The eighth switch element T8 is turned on according to the gate-on voltage VGL of the third gate signal EM1 to connect the fifth node n5 to the sixth node n6. The eighth switch element T8 includes a first electrode connected to the fifth node n5, a gate electrode to which the third gate signal EM1 is applied, and a second electrode connected to the sixth node n6.

As shown in FIG. 2B, the initialization voltage line IL may be disposed between the first node n1 and the second node n2. The initialization voltage Vini may be applied to the initialization voltage line IL, and a first repair capacitor Ca may be formed between the first node n1 and the initialization voltage line IL, and a second repair capacitor Cb may be formed between the second node n2 and the initialization voltage line IL.

As shown in FIG. 3, the initialization voltage line IL may be arranged in a matrix form so that it is connected to all pixels. The initialization voltage line IL includes a first voltage line "a" to which the initialization voltage is applied from a power supply 150 in FIG. 1 and a second voltage line "b" branched from the first voltage line. The first voltage line "a" may be formed to have a first size having a first width and a first thickness, and the second voltage line "b" may be formed to have a second size having a second width and a second thickness which is smaller than the first size.

The first voltage line "a" may be disposed in a non-display area NA surrounding a display area AA that displays an image, and the second voltage line "b" may be disposed in the display area AA. The second voltage line "b" may include a plurality of second-first voltage lines b1 that are branched from the first voltage line disposed in a first axial direction (or first direction) (in other words, branched from a part of the first voltage line disposed in the first axial direction (or first direction)) and a plurality of second-second voltage lines b2 that are branched from the first voltage line disposed in a second axial direction (or second direction) perpendicular to the first axial direction (in other words, branched from a part of the first voltage line disposed in the second axial direction (or second direction)).

The second-first voltage lines b1 may supply the initialization voltage to the sub-pixels. In one or more examples, each of the second-first voltage lines b1 may be connected to one or more corresponding sub-pixels, and supply the initialization voltage to the one or more corresponding sub-pixels. The second-second voltage lines b2 may connect the first voltage line "a" disposed in the second axial direction and may lower the resistance of the voltage lines. In this case, the second-second voltage lines b2 may be formed to be disposed one for each pixel line in the display area AA, but are not necessarily limited thereto.

The initialization voltage line IL may apply the initialization voltage to the first node n1 to which an anode of the first light-emitting element EL1 is connected and a second node n2 to which an anode of the second light-emitting element EL2 is connected, and may form the first repair capacitor Ca between itself and the first node n1 and the second repair capacitor Cb between itself and the second node n2.

The capacitor Cst is connected between the third node n3 and the fourth node n4. The capacitor Cst maintains the gate-source voltage Vgs of the driving element DT during a light emission period.

A first lens LENS1 illustrated in FIG. 4 may be disposed over the first light-emitting element EL1. The first lens LENS1 may be a hemispherical lens that is thicker in the center and thinner toward the edges. The first lens LENS1 may condense the light emitted by the first light-emitting element EL1 in a first mode PMODE to narrow an up-down viewing angle and a left-right viewing angle of the first light-emitting element EL1.

A second lens LENS2 illustrated in FIG. 4 may be disposed over the second light-emitting element EL2. The second lens LENS2 may be a semi-cylindrical lens to limit the up-down viewing angle while widening the left-right viewing angle. The second lens LENS2 is long in the left-right direction (or X-axis direction) of the display panel 100 and is narrow in the up-down direction (or Y-axis direction). The second lens LENS2 may have a hemispherical cross-section. The second lens condenses the light emitted by the second light-emitting element EL2 in a second mode SMODE to narrow the up-down viewing angle and widen the left-right viewing angle. By using the second lens LENS2, the up-down viewing angle of the second light emitting element EL2 is comparable to that of the first light-emitting element EL1, and the left-right viewing angle thereof is larger than that of the first light-emitting element EL1. In FIG. 4, 'R' denotes a red sub-pixel that emit red light, 'G' denotes a green sub-pixel that emit green light, and 'B' denotes a blue sub-pixel that emit blue light. In FIG. 4, the darkened sub-pixels are non-driving sub-pixels that do not emit light.

Light emitted from a screen of a vehicle display disposed on a dashboard of a vehicle may travel to a front-facing camera disposed in front of an upper end of a room in the vehicle, and the screen of the vehicle display may be seen in an image captured by the front-facing camera. The first lens LENS1 limits the vertical viewing angle of the first light-emitting element EL1 that emits light in the first mode to prevent a ghost image of the screen of the vehicle display, which is captured by the front-facing camera.

The first and second lenses LENS1 and LENS2 may be implemented as, but are not limited to, a transparent medium or a transparent insulating layer pattern disposed within the display panel 100.

The first light-emitting element EL1 emits light at a first viewing angle by the first lens LENS1, and the second light-emitting element EL2 emits light at a second viewing angle wider than the first viewing angle by the second lens LENS2.

This pixel circuit may be driven in a first mode in which the first light-emitting element EL1 with a narrow viewing angle emits light, or in a second mode in which the second light-emitting element EL2 with a wide viewing angle emits light.

Figure 5:
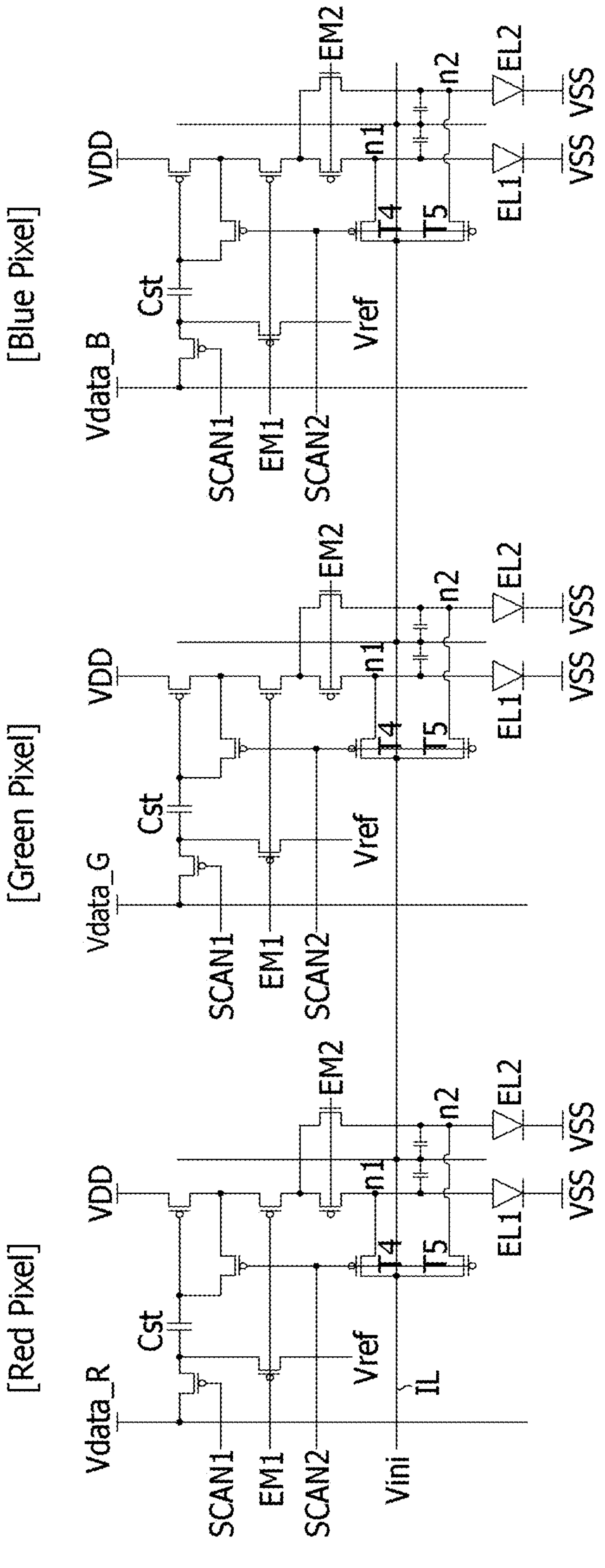
FIG. 5 is an example of a diagram illustrating a connection relationship of the initialization voltage lines of the pixel circuit shown in FIG. 2B.

FIG. 5 is an example of a diagram illustrating a connection relationship of the initialization voltage lines of the pixel circuit shown in FIG. 2B.

Referring to FIG. 5, a pixel according to an example embodiment may include a plurality of sub-pixels, and the plurality of sub-pixels may include a red sub-pixel, a green sub-pixel, and a blue sub-pixel.

The initialization voltage lines IL may be formed in a matrix form to apply the initialization voltage to the first node n1 and the second node n2 of each of the sub-pixels, but is not necessarily limited thereto.

Figure 6A:
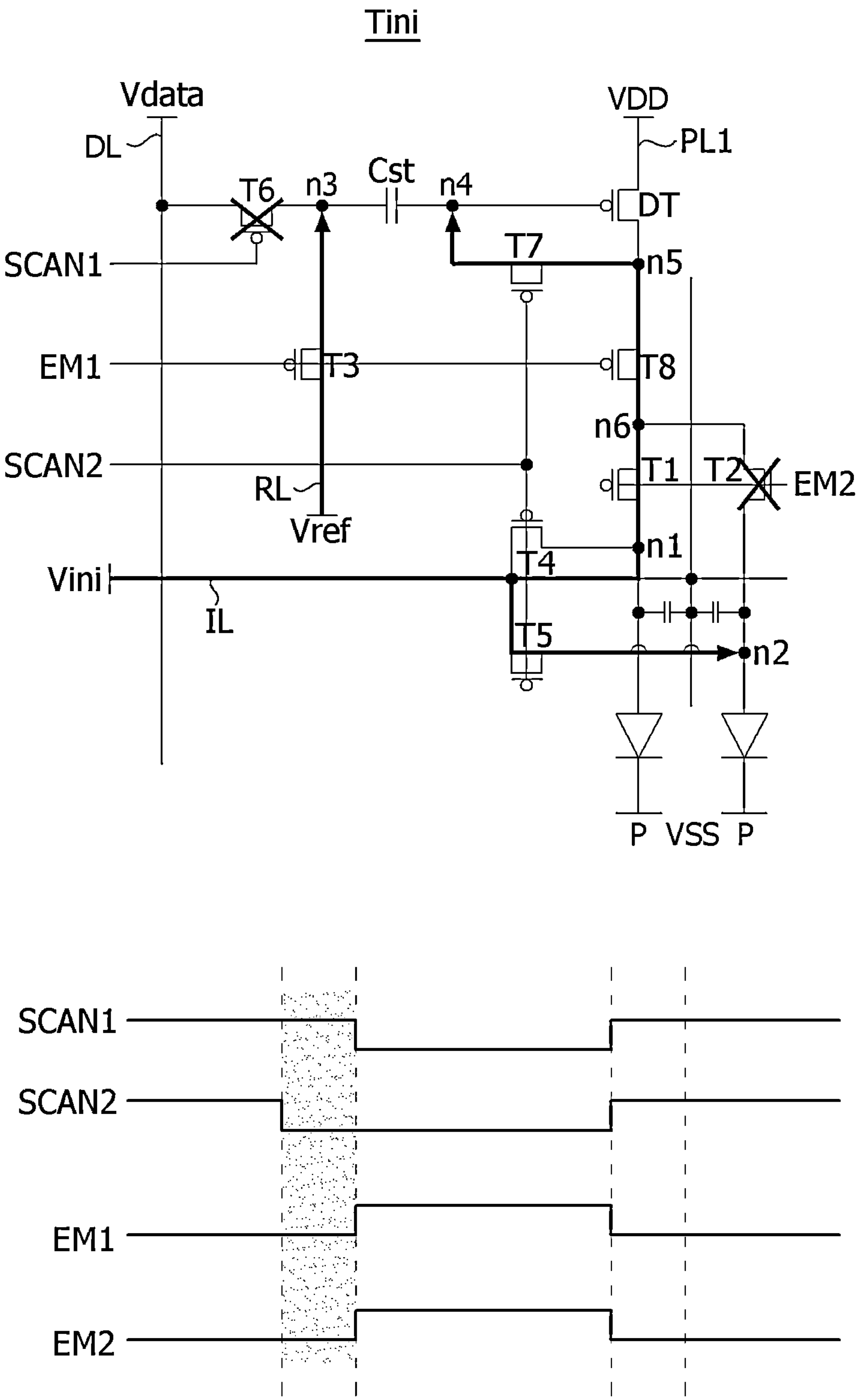
FIGS. 6A to 6C are example diagrams illustrating an operation principle of the pixel circuit shown in FIG. 2B.
Figure 6B:
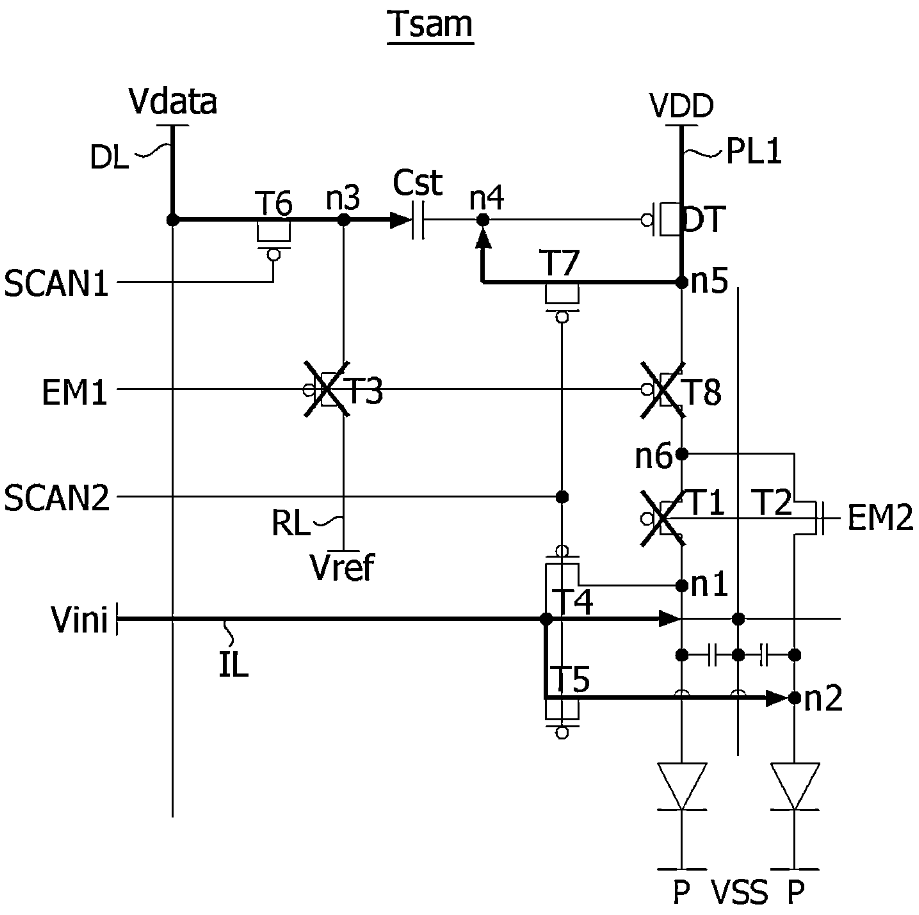
Figure 6B:
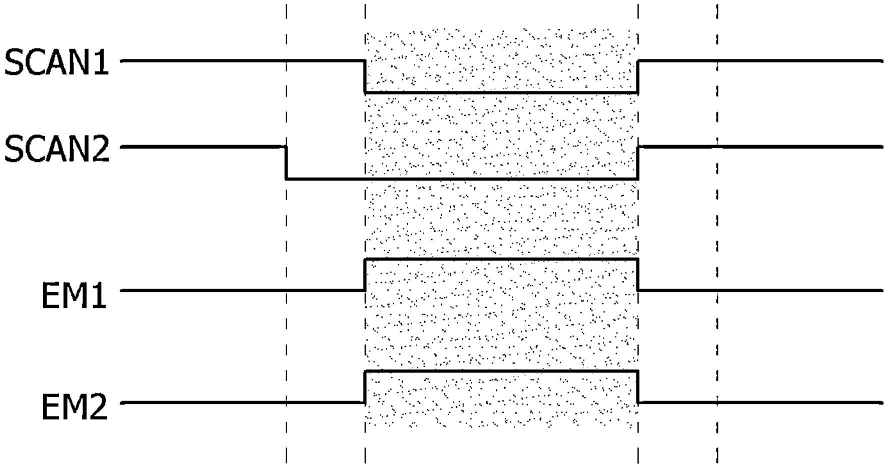
Figure 6C:
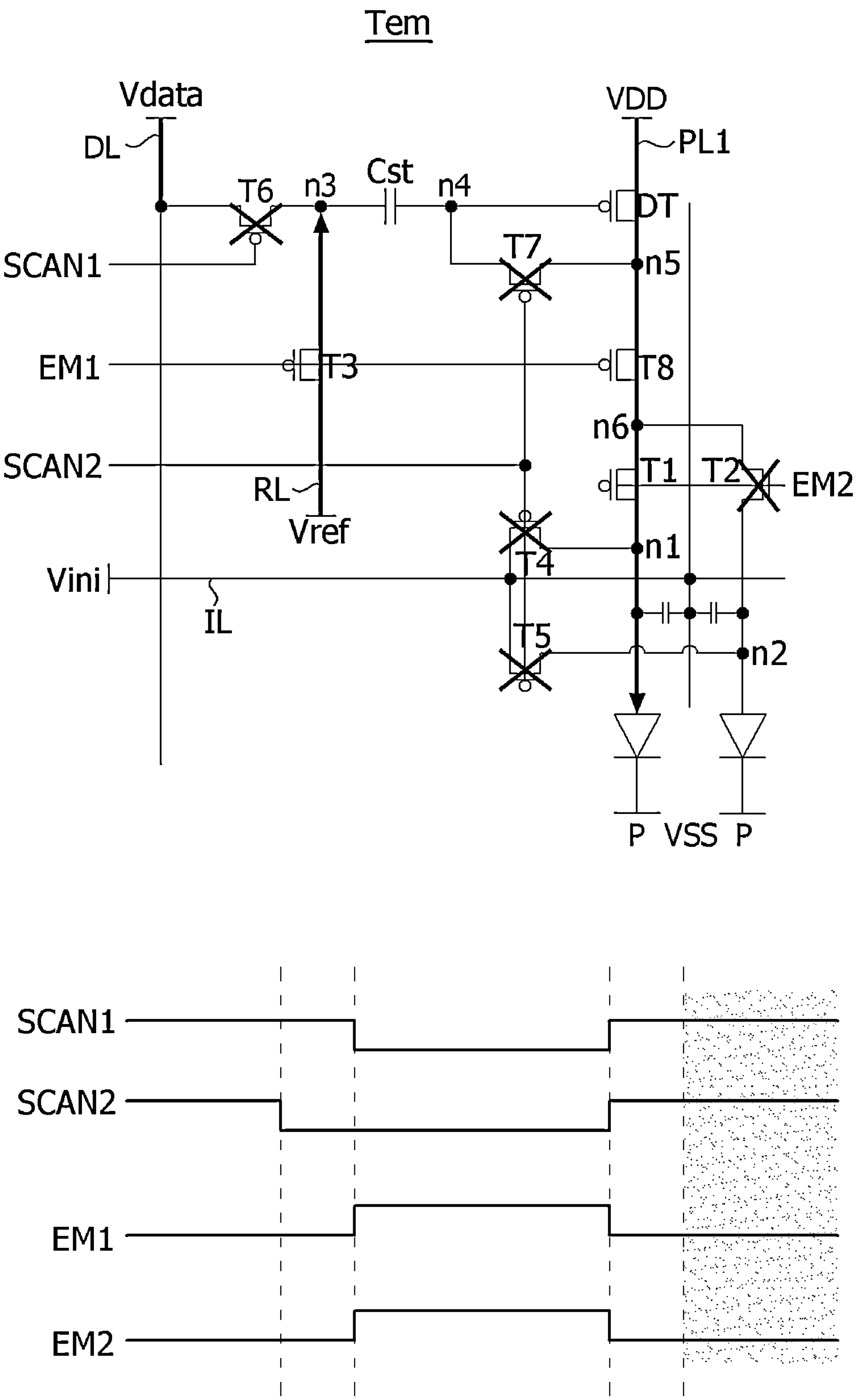
Figure 7A:
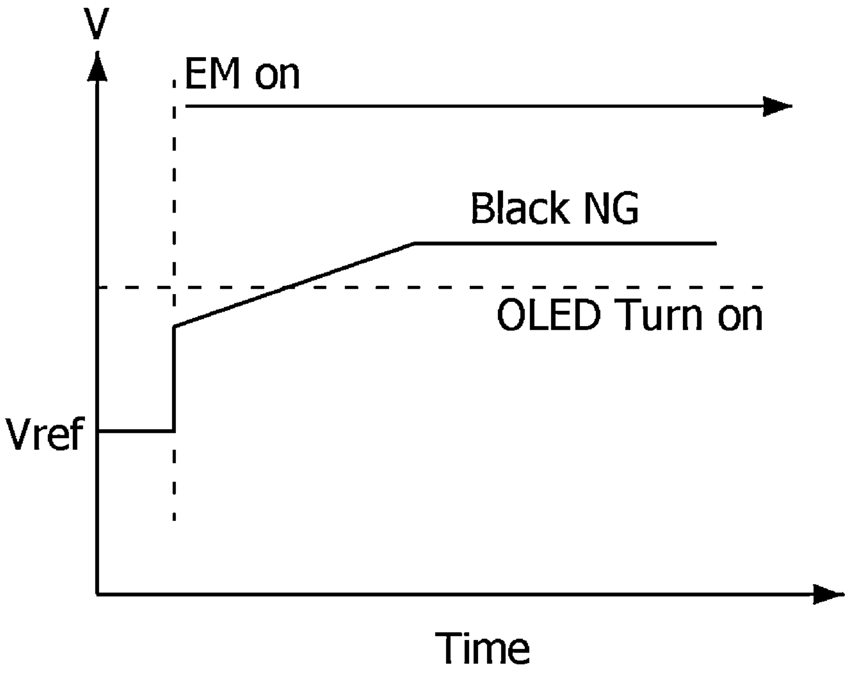
FIGS. 7A and 7B are example diagrams for comparing and explaining the light emission state of the pixel circuit shown in FIG. 2B.
Figure 7B:
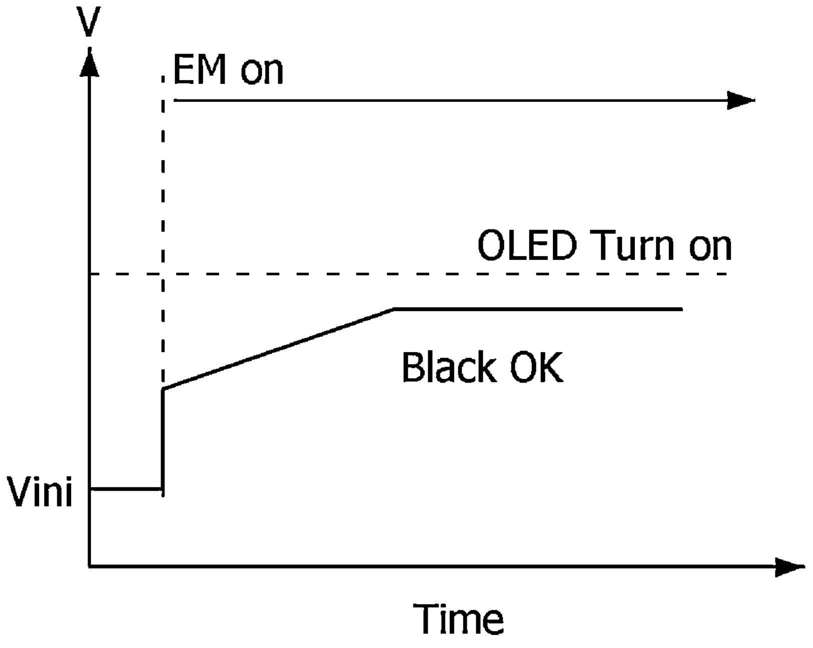

FIGS. 6A to 6C are example diagrams illustrating an operation principle of the pixel circuit shown in FIG. 2B, and FIGS. 7A and 7B are example diagrams for comparing and explaining the light emission state of the pixel circuit shown in FIG. 2B.

The pixel circuit according to the first example embodiment is driven in the following sequence: an initialization period Tini, a sampling period Tsam, and a light emission period Tem in the first mode and the second mode. The time period during which the initialization period Tini, the sampling period Tsam, and the light emission period Tem are performed may be controlled by the waveforms of the gate signals SCAN1, SCAN2, EM1, and EM2.

Here, for convenience, the operating principle of the pixel circuit in the first mode will be described.

Referring to FIG. 6A, during the initialization period Tini, the second and sixth switch elements T2 and T6 may be turned off, while the first switch element T1, the third to fifth switch elements T3 to T5, and the seventh to eighth switch elements T7 to T8 may be turned on, so that the reference voltage Vref may be applied to the third node n3 and the initialization voltage Vini may be applied to the first node n1 and the second node n2.

Referring to FIG. 6B, during the sampling period Tsam, the first switch element T1, the third switch element T3, and the eighth switch element T8 are turned off, while the second switch element T2 and the fourth to seventh switch elements T4 to T7 are turned on, so that the data voltage Vdata of the pixel data is applied to the third node n3 and the pixel driving voltage VDD is applied to the driving element DT to sense the threshold voltage Vth of the driving element, and consequently the voltage of the fourth node n4 becomes a voltage VDD+Vth.

Referring to FIG. 6C, during the light emission period Tem, the second switch element T2 and the fourth to seventh switch elements T4 to T7 are turned off, while the first switch element T1, the third switch element T3, and the eighth switch element T8 are turned on, so that the current generated according to the gate-source voltage of the driving element DT is supplied to the first light-emitting element EL1, thereby causing the first light emitting element EL1 to emit light.

In this case, the initialization voltage Vini applied to the pixel circuit may be set to be lower than the reference voltage Vref.

As in the comparative example of FIG. 7A, when the reference voltage Vref is applied without applying a separate initialization voltage, the anode electrode of the light-emitting element may be initialized to a relatively high voltage, resulting in black floating.

To improve this, in the example embodiment, the reference voltage Vref and the initialization voltage Vini are applied separately. As in the example embodiment of FIG. 7B, when the reference voltage Vref and the initialization voltage Vini which is set to be lower than the reference voltage Vref are applied, the anode electrode of the light-emitting element is initialized to a relatively low voltage, which may improve black floating.

Figure 8A:
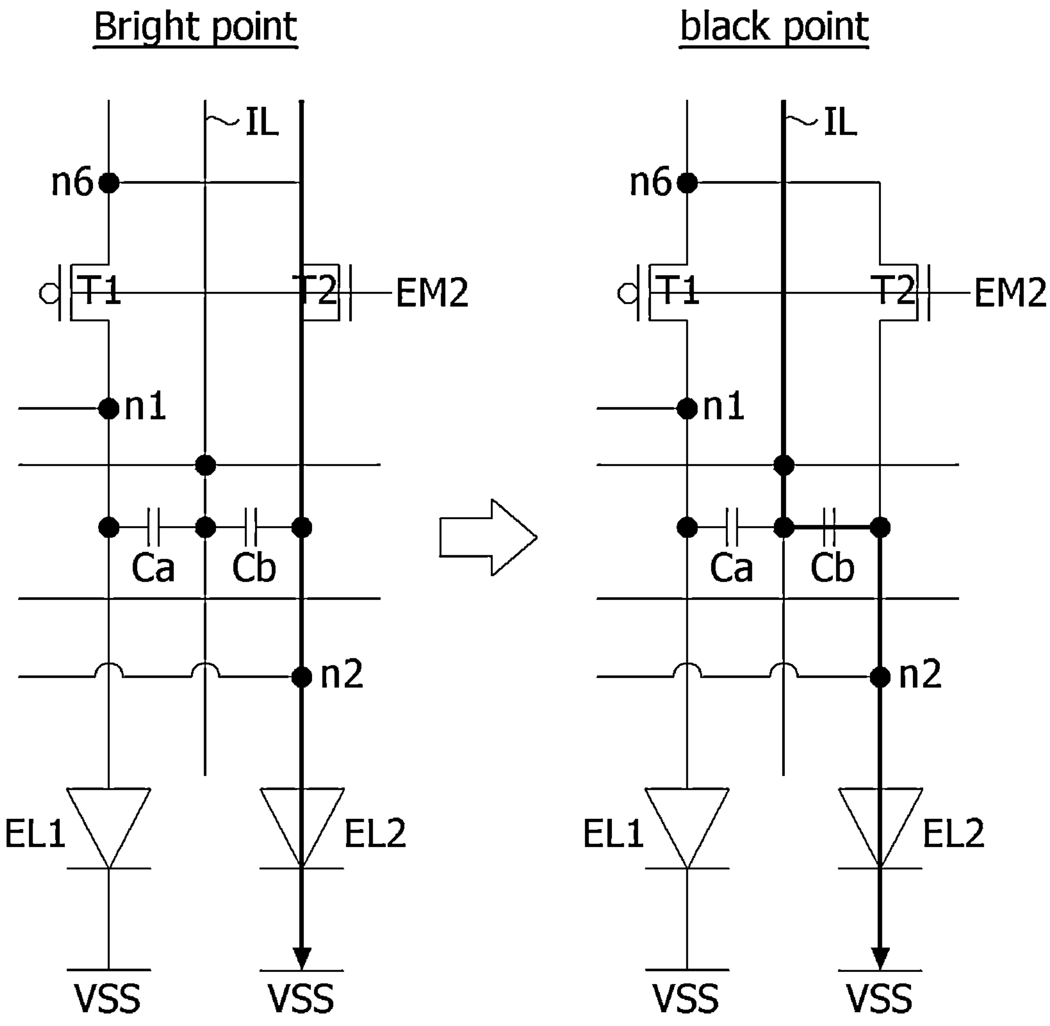
FIGS. 8A and 8B are diagrams illustrating examples to which repair capacitors are applied.
Figure 8B:
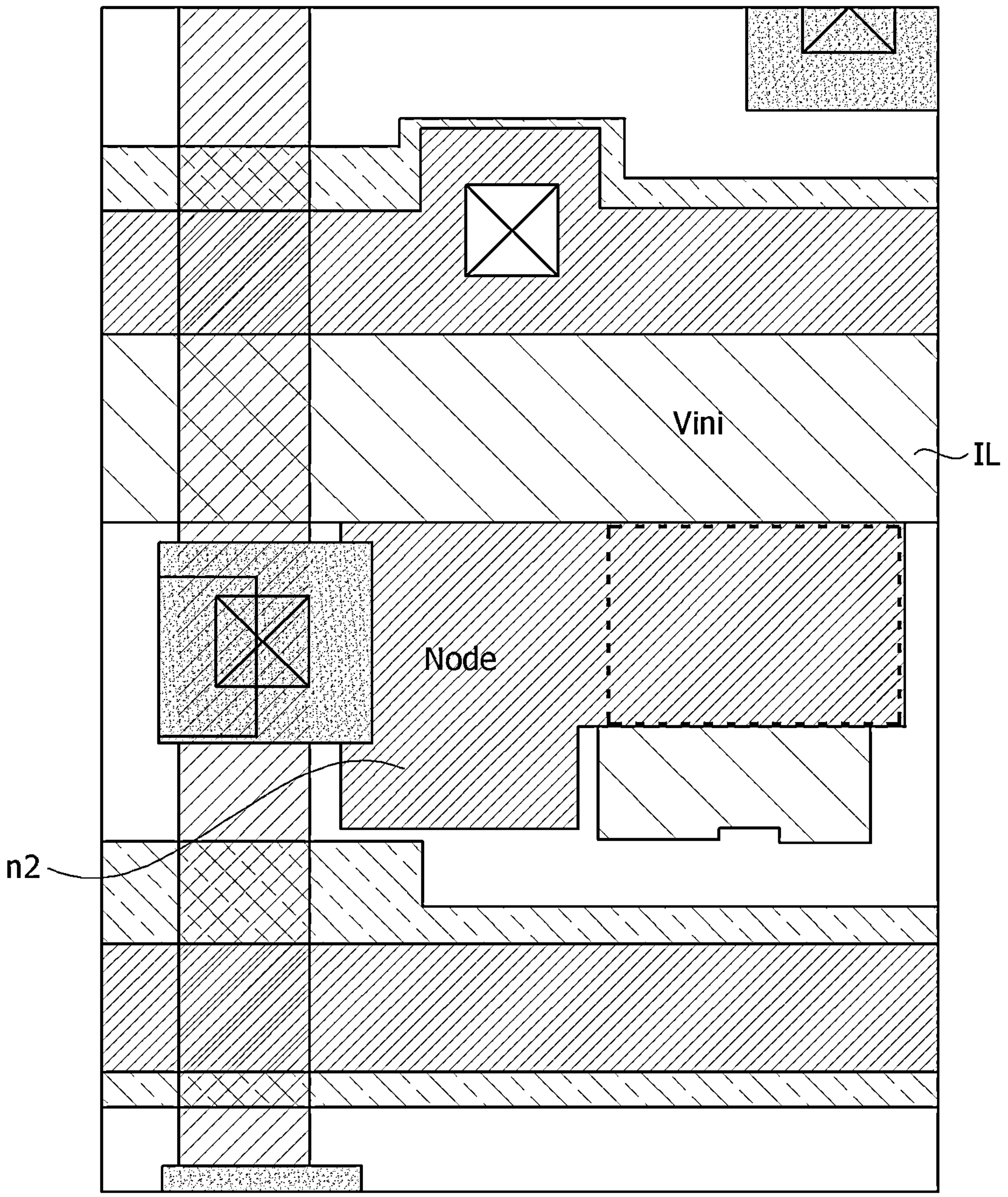

FIGS. 8A and 8B are diagrams illustrating examples to which repair capacitors are applied.

Referring to FIG. 8A, when a bright point occurs in the second light-emitting element EL2 during inspection of the pixel circuit according to an example embodiment, the second repair capacitor Cb connected to the second light-emitting element EL2 in which the bright point occurs may be welded using laser light so that the initialization voltage line IL and the second node n2 are short-circuited, thereby turning the second light-emitting element EL2 into a dark point.

Referring to FIG. 8B, an area of the second node n2 may be expanded to overlap the initialization voltage line IL to form the second repair capacitor Cb, and if necessary, the initialization voltage line IL and the second node n2 may be short-circuited by welding the repair capacitor Cb.

While the second repair capacitor Cb is described here as an example, the first repair capacitor Ca may also be formed in the same manner as the second repair capacitor, and, if necessary, the first repair capacitor and the initialization voltage line may be short-circuited.

As described above, the example embodiment may allow a node and the repair capacitor formed using the initialization voltage line to be short-circuited so that the bright point is turned into the dark point, thereby contributing to improve production yields.

Figure 9A:
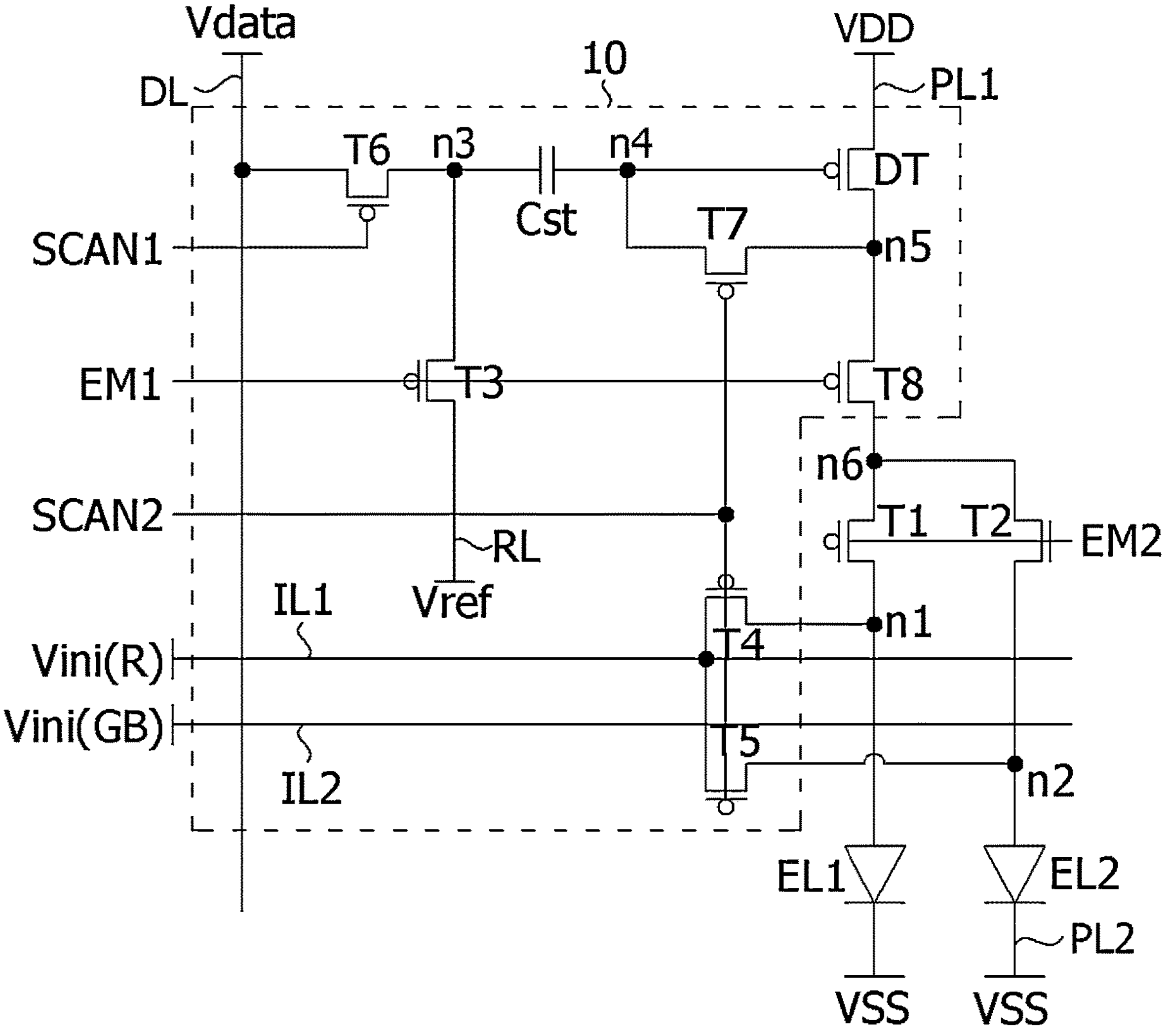
FIGS. 9A and 9B are circuit diagrams illustrating a pixel circuit according to a second example embodiment of the present disclosure.
Figure 9B:
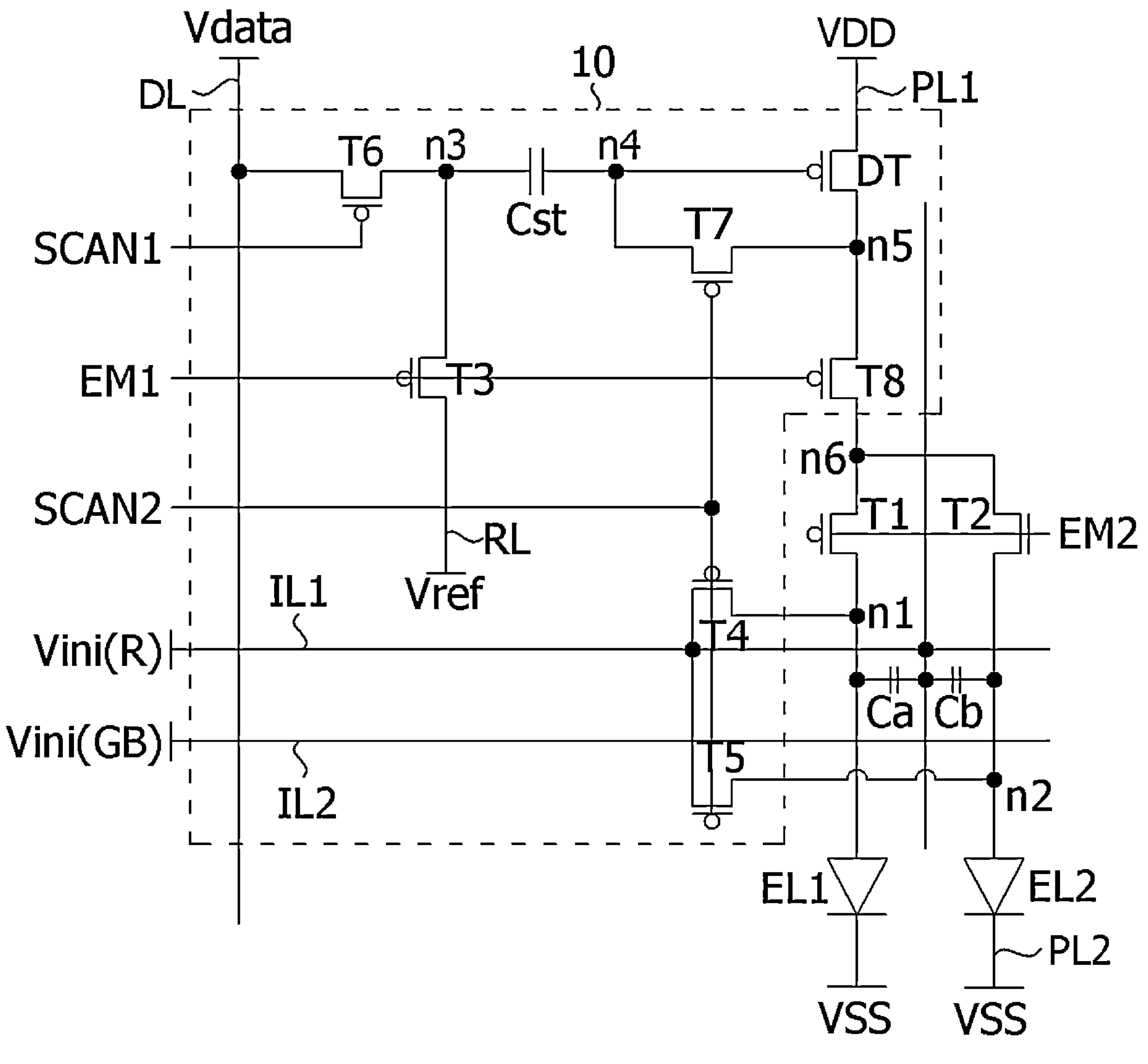
Figure 10:
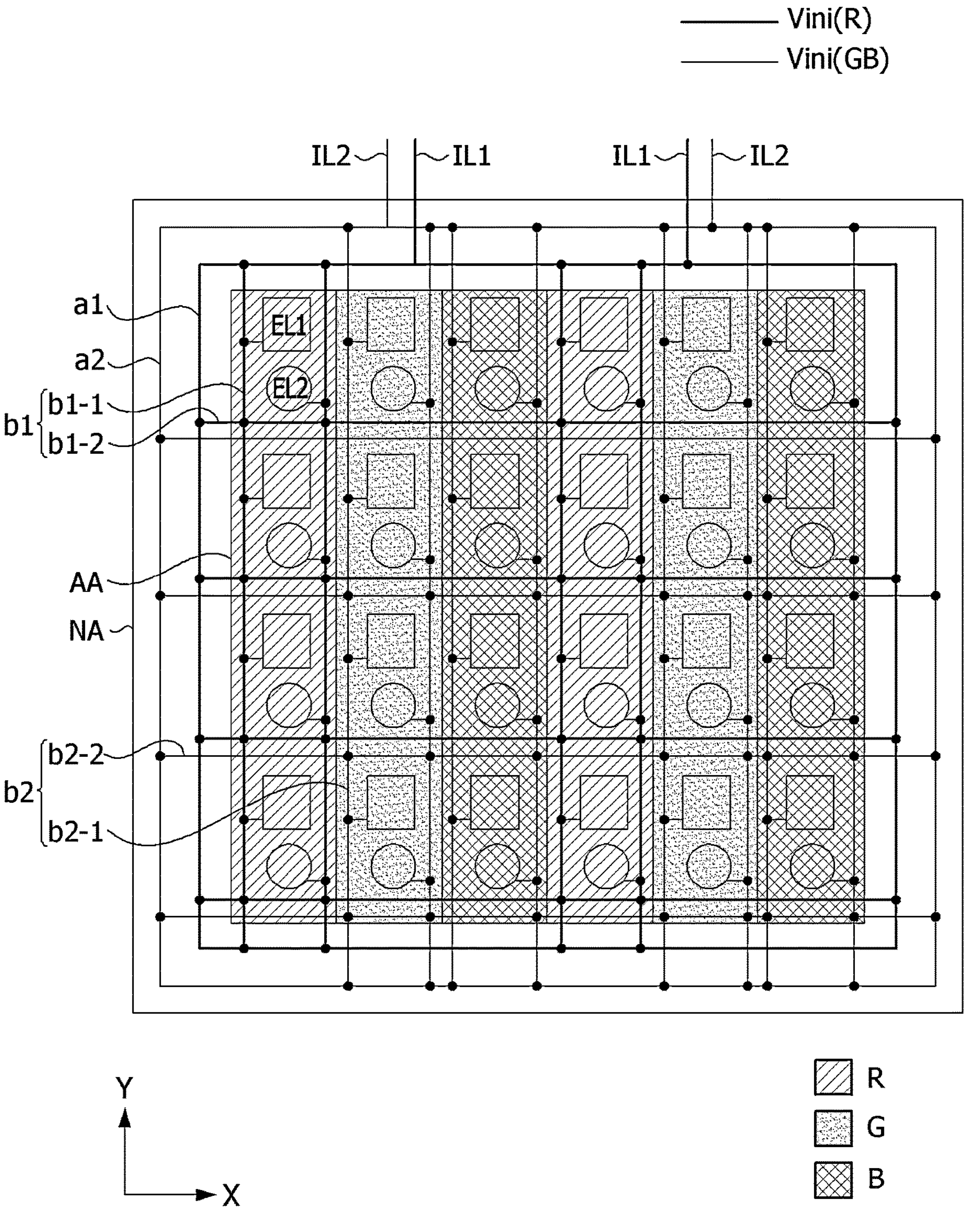
FIG. 10 is an example of a diagram illustrating an arrangement of the initialization voltage lines shown in FIG. 9B.
Figure 11:
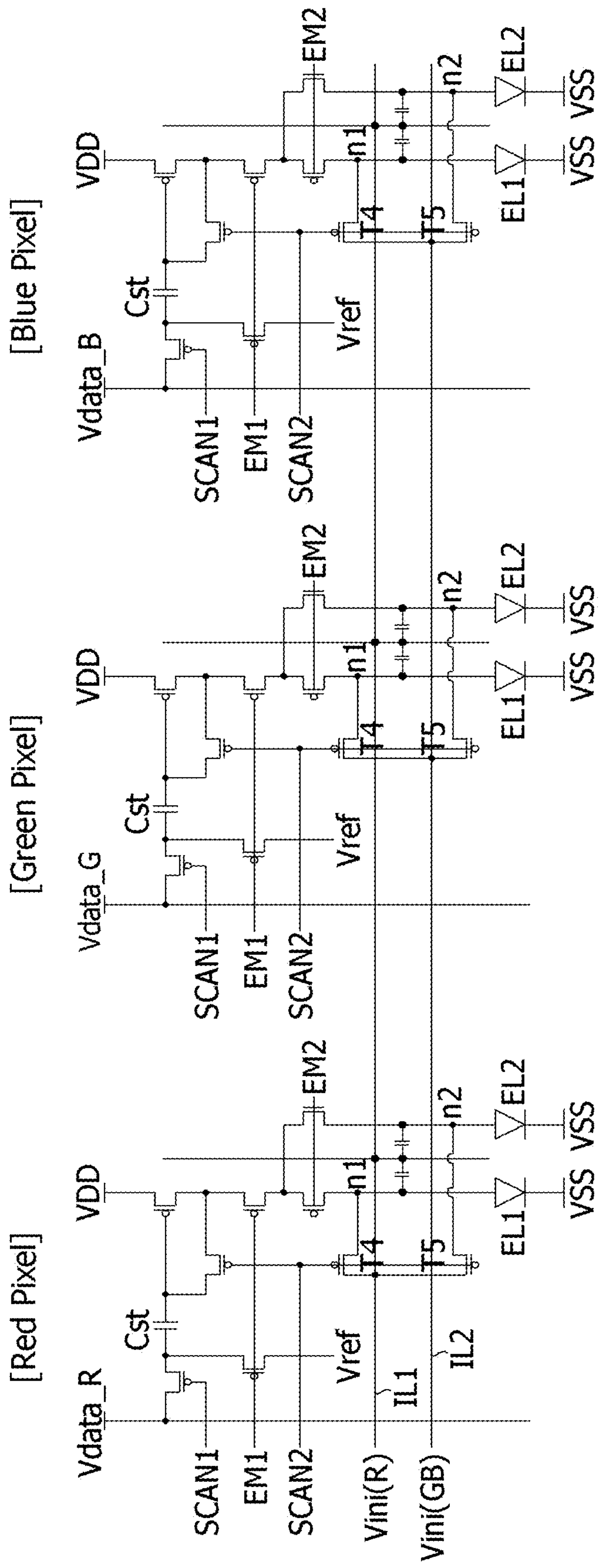
FIG. 11 is an example of a diagram illustrating a connection relationship of the initialization voltage lines of the pixel circuit shown in FIG. 9B.

FIGS. 9A and 9B are circuit diagrams illustrating a pixel circuit according to a second example embodiment of the present disclosure, FIG. 10 is a an example of diagram illustrating an arrangement of the initialization voltage lines shown in FIG. 9B, and FIG. 11 is an example of a diagram illustrating a connection relationship of the initialization voltage lines of the pixel circuit shown in FIG. 9B.

Referring to FIGS. 9A and 9B, a pixel circuit according to a second example embodiment includes a first light-emitting element EL1 that emits light in the first mode PMODE, a second light-emitting element EL2 that emits light in the second mode SMODE, a driving element DT to drive the first and second light-emitting elements EL1 and EL2, a compensation circuit 10 connected to the driving element, a first switch element T1, and a second switch element T2. The compensation circuit includes a plurality of switch elements T3 to T8 and a capacitor Cst. The driving element DT and the plurality of switch elements T1 and T3 to T8 may be implemented as p-channel transistors, and the switch element T2 may be implemented as an n-channel transistor, but are not necessarily limited thereto.

The pixel circuit according to the second example embodiment is the same as the pixel circuit according to the first example embodiment of FIGS. 2A to 2B, with a different configuration in which the initialization voltage is set differently for each color of the pixels, and therefore only the different configuration is described.

The fourth switch element T4 is connected between the first node n1 and a first initialization voltage line IL1. The fourth switch element T4 is turned on according to the gate-on voltage VGL of the second gate signal SCAN2 to connect the first node n1 to the first initialization voltage line IL1. The fourth switch element T4 includes a first electrode connected to the first initialization voltage line IL1, a gate electrode to which the second gate signal SCAN2 is applied, and a second electrode connected to the first node n1.

The fifth switch element T5 is connected between the second node n2 and the first initialization voltage line IL1. The fifth switch element T5 is turned on according to the gate-on voltage VGL of the second gate signal SCAN2 to connect the second node n2 to the first initialization voltage line IL1. The fifth switch element T5 includes a first electrode connected to the first initialization voltage line IL1, a gate electrode to which the second gate signal SCAN2 is applied, and a second electrode connected to the second node n2.

Referring to FIG. 10, a pixel according to the example embodiment may include a plurality of sub-pixels, and the plurality of sub-pixels (or each of the plurality of sub-pixels) may include a red sub-pixel, a green sub-pixel, and a blue sub-pixel.

The first initialization voltage line IL1 may be connected to the red sub-pixel, and may apply a first initialization voltage Vini(R) to the first node n1 and the second node n2 of the red sub-pixel. A second initialization voltage line IL2 may be connected to the green and blue sub-pixels, and may apply a second initialization voltage Vini(GB) to each of the first node n1 and the second node n2 of the green and blue sub-pixels. The first and second initialization voltage lines IL1 and IL2 may be arranged in a matrix form.

The first and second initialization voltage lines IL1 and IL2 include first voltage lines a1 and a2 that receive an initialization voltage from the power supply 150 of FIG. 1, and second voltage lines b1 and b2 that are branched from the first voltage lines a1 and a2. The first voltage lines a1 and a2 may be formed to have a first size having a first width and a first thickness, and the second voltage lines b1 and b2 may be formed to have a second size having a second width and a second thickness which is smaller than the first size.

The first voltage lines a1 and a2 may be disposed in the non-display area NA surrounding the display area AA that displays an image, and the second voltage lines b1 and b2 may be disposed in the display area AA. The second voltage lines b1 and b2 may include a plurality of second-first voltage lines b1-1 and b2-1 branched from the first voltage line disposed in the first axial direction and a plurality of second-second voltage lines b1-2 and b2-2 branched from the first voltage line disposed in the second axial direction, respectively.

The second-first voltage lines b1-1 and b2-1 may supply the initialization voltage to the corresponding sub-pixels. In one or more examples, each of the second-first voltage lines b1-1 may be connected to one or more corresponding sub-pixels (e.g., red sub-pixels; e.g., first and second nodes n1 and n2 of the red sub-pixels), and supply the initialization voltage to the one or more corresponding sub-pixels. Similarly, each of the second-first voltage lines b2-1 may be connected to one or more corresponding sub-pixels (e.g., green and blue sub-pixels; e.g., first and second nodes n1 and n2 of the green and blue sub-pixels), and supply the initialization voltage to the one or more corresponding sub-pixels.

The second-second voltage lines b1-2 and b2-2 may connect the first voltage lines a1 and a2 disposed in the second axial direction and may lower the resistance of the voltage lines.

In this case, two voltage lines may be formed to be arranged for every one pixel line. For example, but not necessarily limited to, the second-first voltage line b2-1 and the second-second voltage line b2-2 may be formed to be arranged one pair for each pixel line within the display area AA.

The first and second initialization voltage lines IL1 and IL2 may apply the initialization voltage to the first node n1 to which the anode of the first light-emitting element EL1 is connected and the second node n2 to which the anode of the second light-emitting element EL2 is connected. The first repair capacitor Ca may be formed between the first node n1 and the first initialization voltage line IL1, and the second repair capacitor Cb may be formed between the second node n2 and the second initialization voltage line IL2.

Referring to FIG. 11, the first initialization voltage Vini (R) may be applied to the first node n1 and the second node n2 to which the first and second light-emitting elements EL1 and EL2 of the red sub-pixel are connected, respectively, and the second initialization voltage Vini(GB) may be applied to the first node n1 and the second node n2 to which the first and second light-emitting elements EL1 and EL2 of the green and blue sub-pixels are connected, respectively.

Figure 12A:
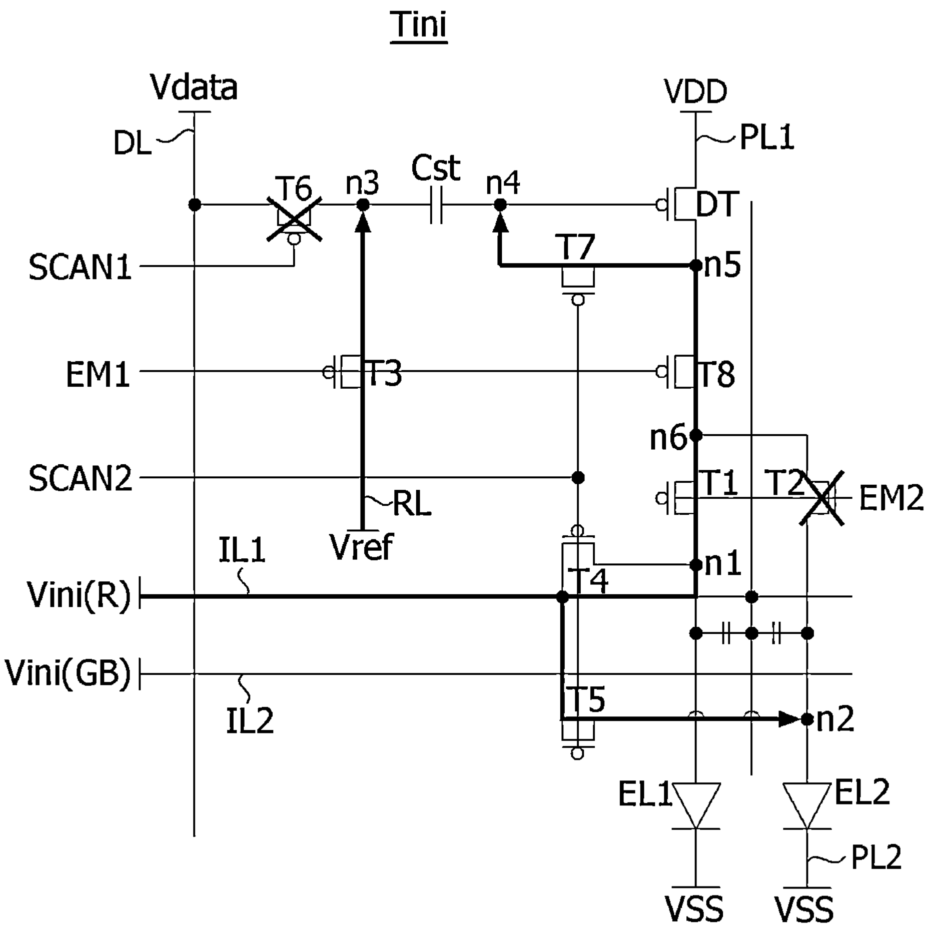
FIGS. 12A to 12C are example diagrams illustrating an operation principle of the pixel circuit shown in FIG. 9B.
Figure 12A:
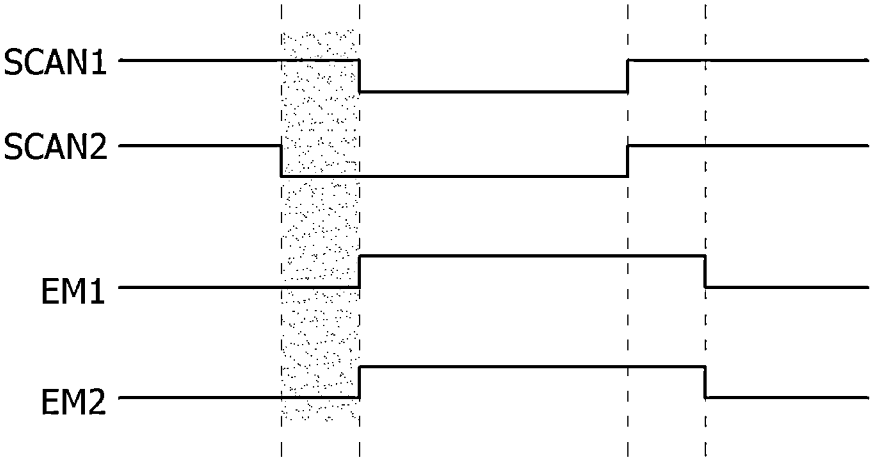
Figure 12B:
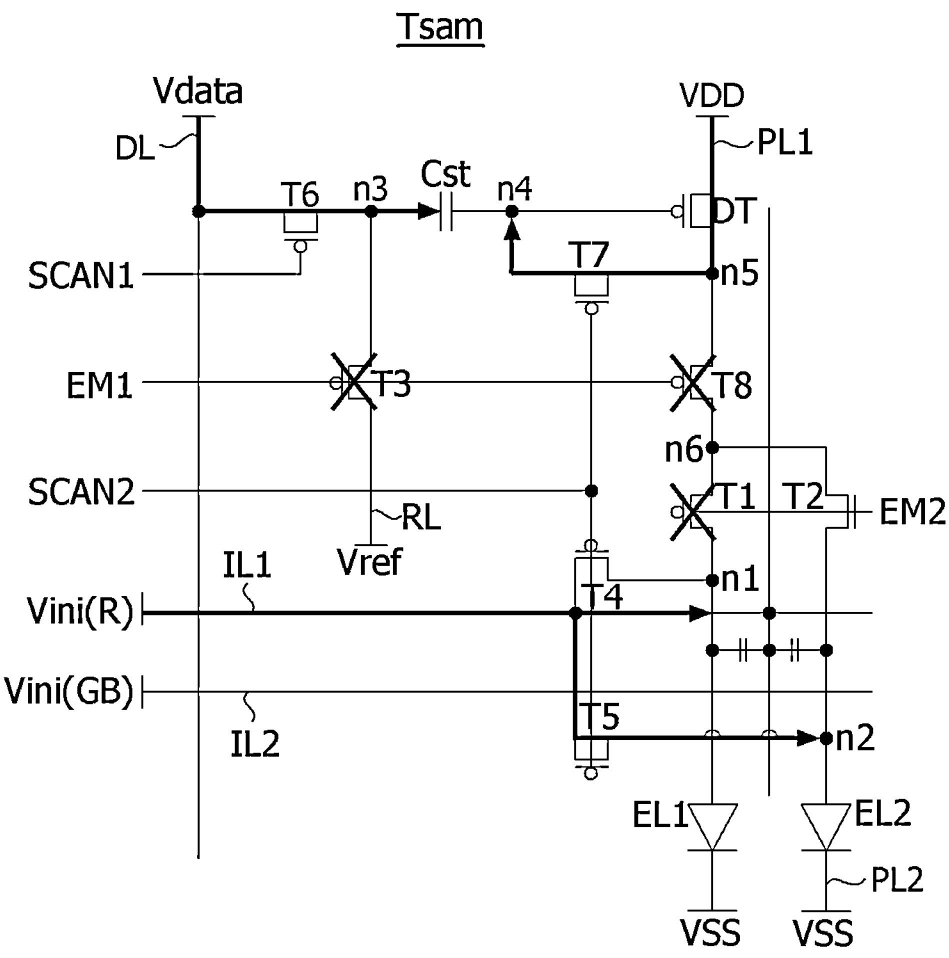
Figure 12B:
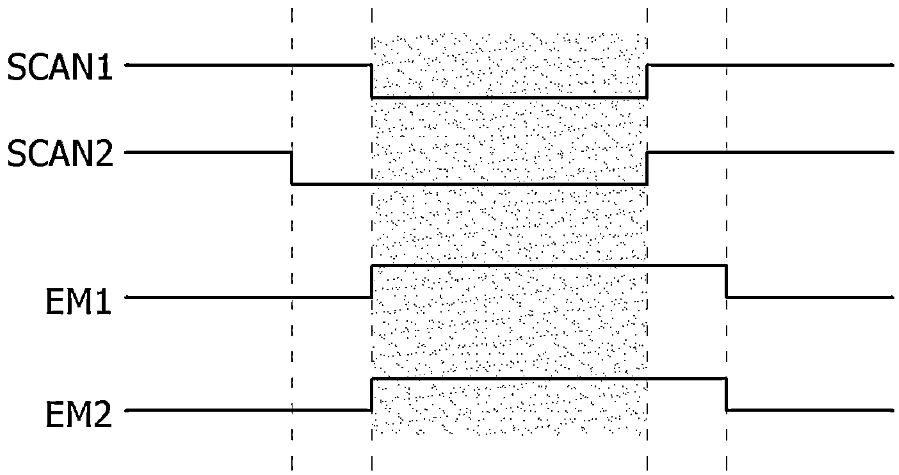
Figure 12C:
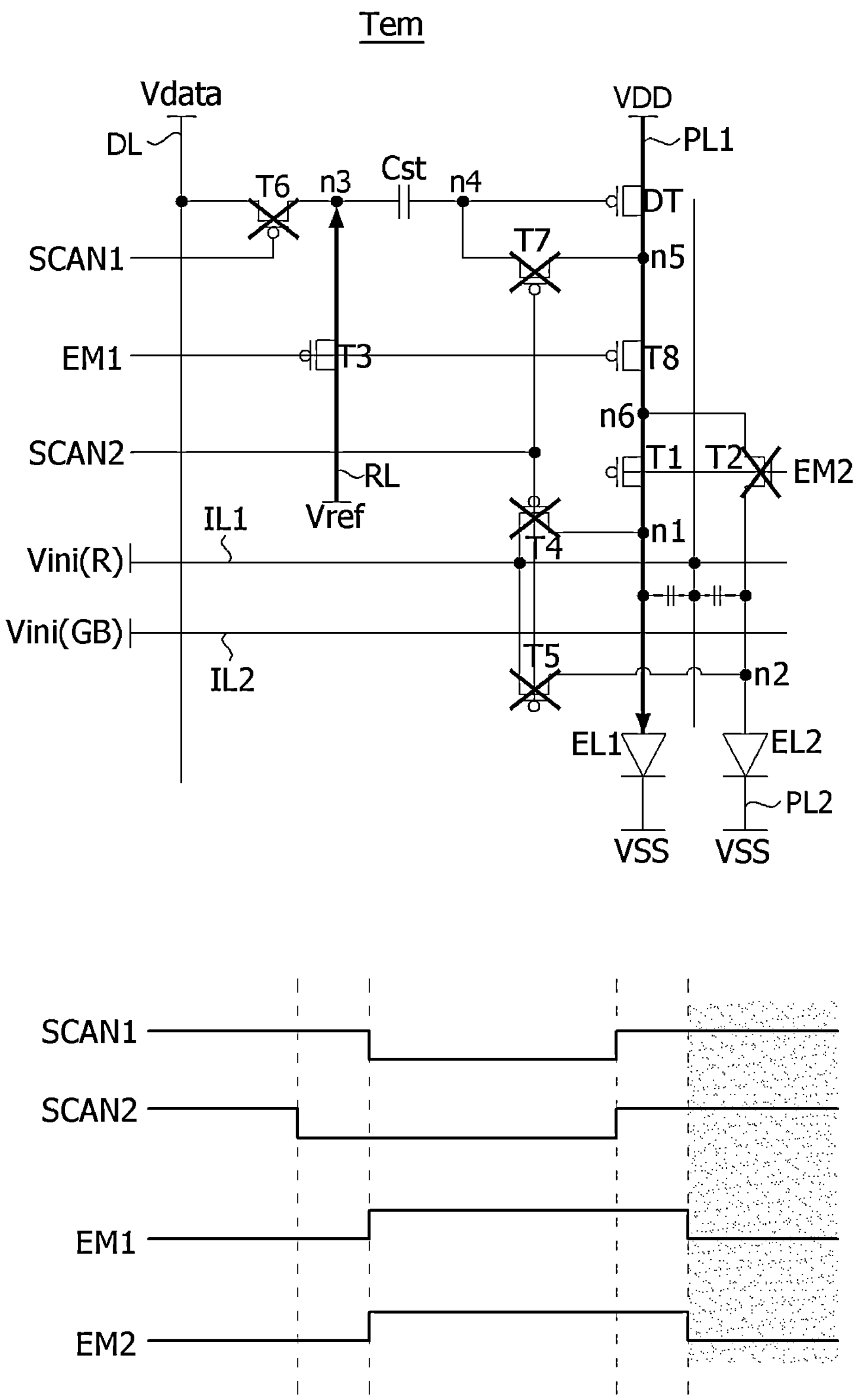
Figure 13A:
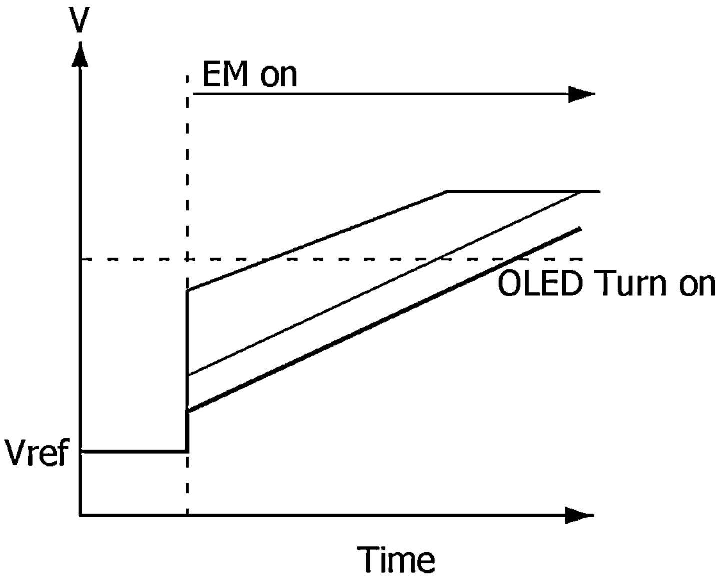
FIGS. 13A and 13B are example diagrams for comparing and explaining the light emission state of the pixel circuit shown in FIG. 9B.
Figure 13B:
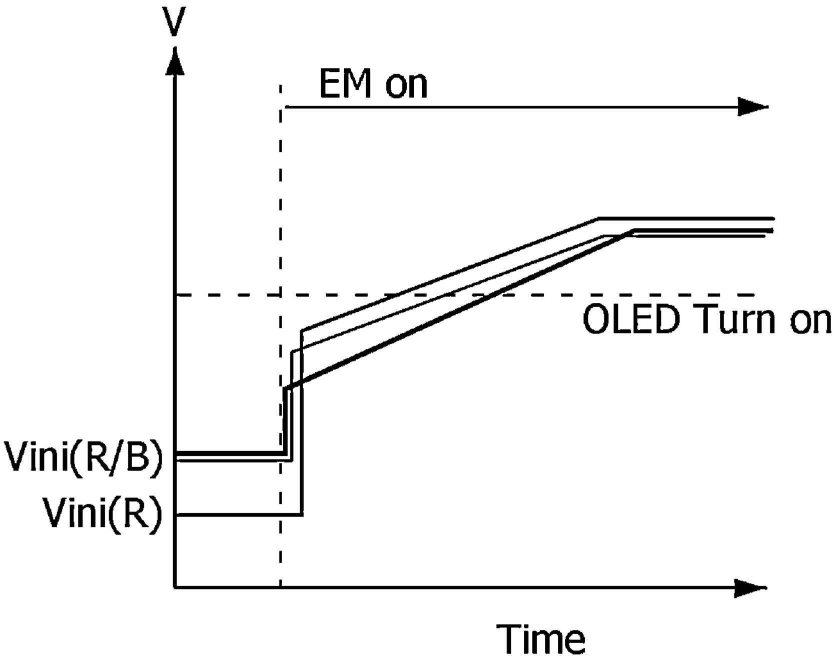

FIGS. 12A to 12C are example diagrams illustrating an operation principle of the pixel circuit shown in FIG. 9B, and FIGS. 13A and 13B are example diagrams for comparing and explaining the light emission state of the pixel circuit shown in FIG. 9B.

The pixel circuit according to the second example embodiment is driven in the following sequence: an initialization period Tini, a sampling period Tsam, and a light emission period Tem in the first mode and the second mode. The time during which the initialization period Tini, the sampling period Tsam, and the light emission period Tem are carried out may be controlled by the waveforms of the gate signals SCAN1, SCAN2, EM1, and EM2.

Here, for convenience, the operating principle of the pixel circuit in the first mode will be described.

Referring to FIG. 12A, during the initialization period Tini, the second switch element T2 and the sixth switch elements T6 may be turned off, while the first switch element T1, the third to fifth switch elements T3 to T5, and the seventh to eighth switch elements T7 to T8 may be turned on, so that the reference voltage Vref may be applied to the third node n3 and the initialization voltage Vini may be applied to the first node n1 and the second node n2.

Referring to FIG. 12B, during the sampling period Tsam, the first switch element T1, the third switch element T3, and the eighth switch element T8 are turned off, while the second switch element T2 and the fourth to seventh switch elements T4 to T7 are turned on, so that the data voltage Vdata of the pixel data is applied to the third node n3 and the pixel driving voltage VDD is applied to the driving element DT to sense the threshold voltage Vth of the driving element, and consequently the voltage of the fourth node n4 becomes a voltage VDD+Vth.

Referring to FIG. 12C, during the light emission period Tem, the second switch element T2 and the fourth to seventh switch elements T4 to T7 are turned off, while the first switch element T1, the third switch element T3, and the eighth switch element T8 are turned on, so that the current generated according to the gate-source voltage of the driving element DT is supplied to the first light-emitting element EL1, thereby causing the first light emitting element EL1 to emit light.

In this case, the first initialization voltage Vini1 may be set to be lower than the second initialization voltage Vini2.

As in the comparative example of FIG. 13A, when the reference voltage Vref is applied equally to the red, green, and blue sub-pixels, the time at which the light-emitting element emits light may be different for each color of the pixels.

This is because the area of the light-emitting element in the red sub-pixel is smaller than the area of the light-emitting element in the green and blue sub-pixels, which results in the capacitance across the light-emitting element in the red sub-pixel being smaller than the capacitance across the light-emitting element in the green and blue sub-pixels and the threshold voltage of the light-emitting element in the red sub-pixel being smaller than the threshold voltage of the light-emitting elements in the green and blue sub-pixels, which in turn causes the light-emitting element in the red sub-pixel to emit at a relatively small current earlier than the light-emitting elements in the green and blue sub-pixels.

As in the example embodiment of FIG. 13B, different initialization voltages are applied for each pixel color. In other words, the initialization voltage Vini(R) applied to the red sub-pixel may be set to be lower than the initialization voltage Vini(GB) applied to the green and blue sub-pixels to improve the phenomenon that the light-emitting element in the red sub-pixel emits light earlier than the light-emitting elements in the green and blue sub-pixels.

As described above, the example embodiment may improve the phenomenon that the red sub-pixel emits light earlier by applying different initialization voltages for each pixel color, thereby improving image quality at low grayscale.

Figure 14A:
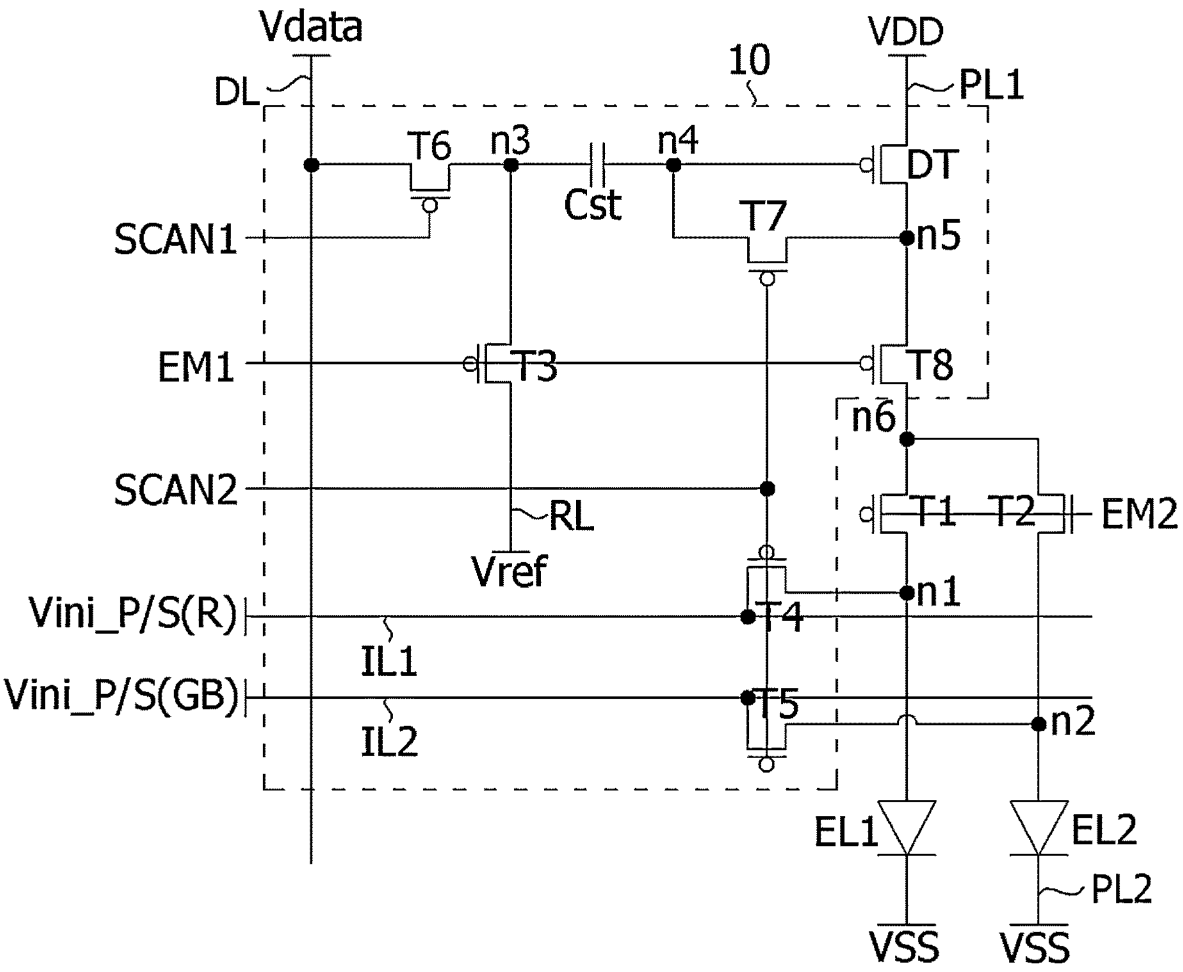
FIGS. 14A and 14B are circuit diagrams illustrating a pixel circuit according to a third example embodiment of the present disclosure.
Figure 14B:
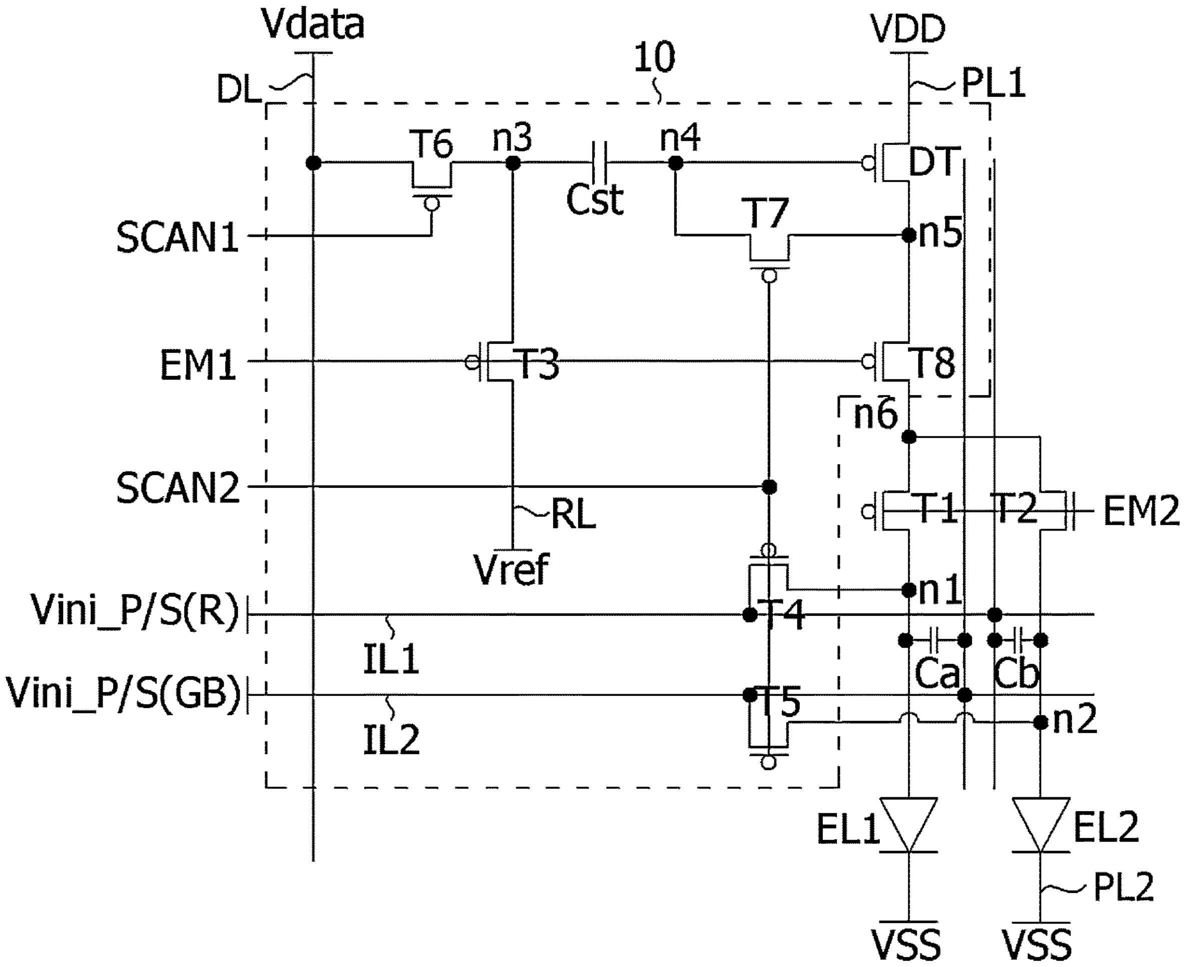
Figure 15:
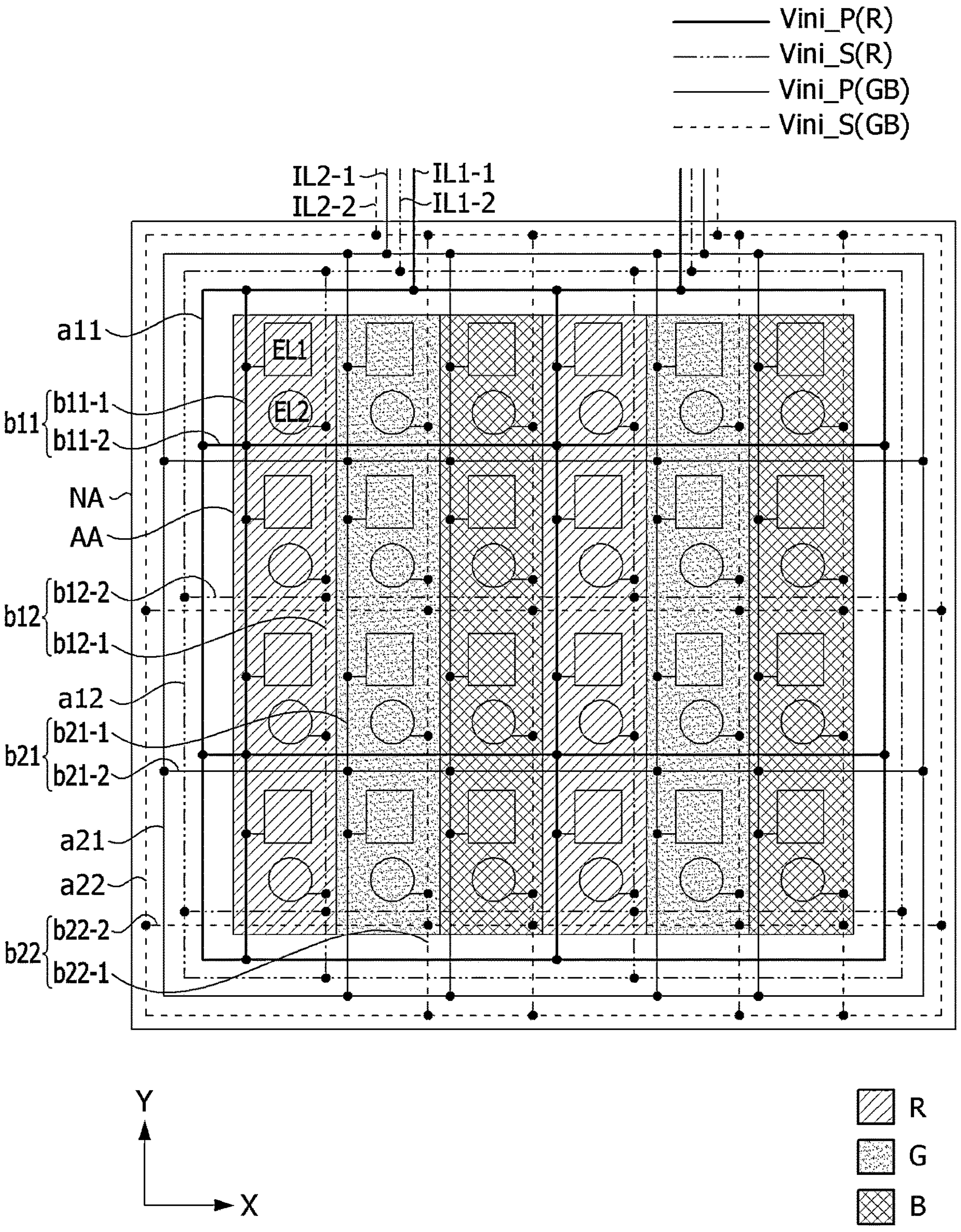
FIG. 15 is an example of a diagram illustrating a connection relationship of the initialization voltage lines of the pixel circuit shown in FIG. 14B.
Figure 17:
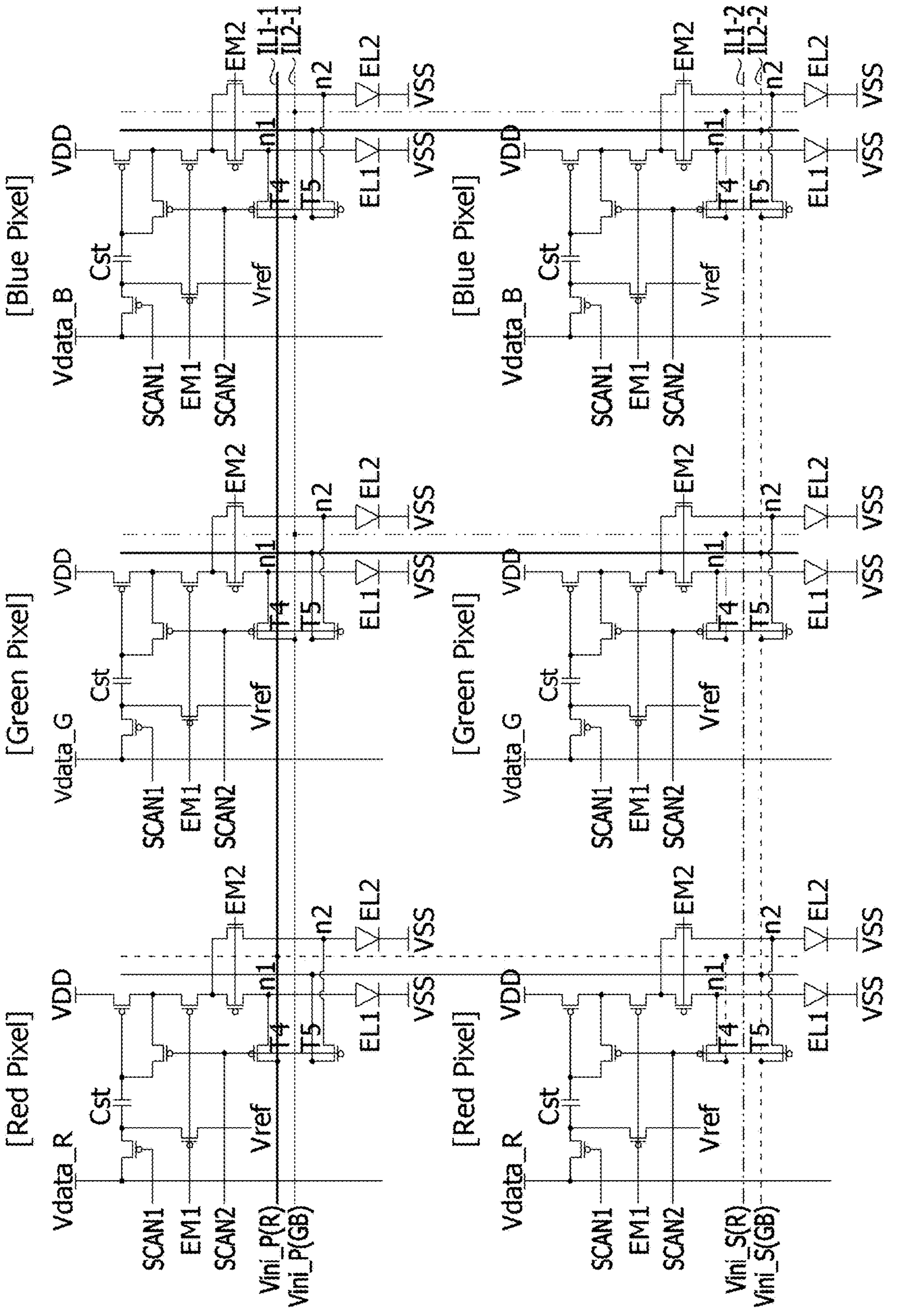
FIG. 17 is an example of a diagram illustrating a connection relationship of the initialization voltage lines of the pixel circuit shown in FIG. 14B.

FIGS. 14A and 14B are circuit diagrams illustrating a pixel circuit according to a third example embodiment of the present disclosure, FIG. 15 is an example of a diagram illustrating a connection relationship of the initialization voltage lines of the pixel circuit shown in FIG. 14B, FIG. 16 is an example of a diagram to illustrate the magnitude of an initialization voltage applied to the pixel circuit, and FIG. 17 is an example of a diagram illustrating a connection relationship of the initialization voltage lines of the pixel circuit shown in FIG. 14B.

Referring to FIGS. 14A and 14B, a pixel circuit according to a third example embodiment includes a first light-emitting element EL1 that emits light in the first mode PMODE, a second light-emitting element EL2 that emits light in the second mode SMODE, a driving element DT to drive the first and second light-emitting elements EL1 and EL2, a compensation circuit 10 connected to the driving element, a first switch element T1, and a second switch element T2. The compensation circuit includes a plurality of switch elements T3 to T8 and a capacitor Cst. The driving element DT and the plurality of switch elements T1 and T3 to T8 may be implemented as p-channel transistors, and the switch element T2 may be implemented as an n-channel transistor, but are not necessarily limited thereto.

The pixel circuit according to the third example embodiment is the same as the pixel circuit according to the second example embodiment of FIGS. 9A to 9B, with a different configuration in which the initialization voltage is set differently for each pixel color, and therefore only the different configuration is described.

The fourth switch element T4 is connected between the first node n1 and a first initialization voltage line IL1. The fourth switch element T4 is turned on according to the gate-on voltage VGL of the second gate signal SCAN2 to connect the first node n1 to the first initialization voltage line IL1. The fourth switch element T4 includes a first electrode connected to the first initialization voltage line IL1, a gate electrode to which the second gate signal SCAN2 is applied, and a second electrode connected to the first node n1.

As in FIG. 15, the first initialization voltage line IL1 may include a first-first initialization voltage line IL1-1 to which a first-first initialization voltage Vini_P(R) is applied and a first-second initialization voltage line IL1-2 to which a second initialization voltage Vini_S(R) is applied. The first-first initialization voltage line IL1-1 may be connected to the first node n1 of the red sub-pixel, and the first-second initialization voltage line IL1-2 may be connected to the second node n2 of the red sub-pixel.

The first-first and first-second initialization voltage lines IL1-1 and IL1-2 include first voltage lines a11 and a12 to which the initialization voltage is applied from the power supply 150 of FIG. 1, and second voltage lines b11 and b12 that are branched from the first voltage lines a11 and a12. The first voltage lines a11 and a12 may be formed to have a first size having a first width and a first thickness, and the second voltage lines b11 and b12 may be formed to have a second size having a second width and a second thickness which is smaller than the first size.

The first voltage lines a11 and a12 may be disposed in the non-display area NA surrounding the display area AA that displays an image, and the second voltage lines b11 and b12 may be disposed in the display area AA. The second voltage lines b11 and b12 may include a plurality of second-first voltage lines b11-1 and b12-1 branched from the first voltage line disposed in the first axial direction and a plurality of second-second voltage lines b11-2 and b12-2 branched from the first voltage line disposed in the second axial direction, respectively.

The second-first voltage lines b11-1 and b12-1 may supply the initialization voltage to the corresponding sub-pixels. In one or more examples, each of the second-first voltage lines b11-1 may be connected to one or more corresponding sub-pixels (e.g., red sub-pixels; e.g., first nodes n1 of the red sub-pixels), and supply the initialization voltage to the one or more corresponding sub-pixels. Similarly, each of the second-first voltage lines b12-1 may be connected to one or more corresponding sub-pixels (e.g., red sub-pixels; e.g., second nodes n2 of the red sub-pixels), and supply the initialization voltage to the one or more corresponding sub-pixels.

The second-second voltage lines b11-2 and b12-2 may connect the first voltage lines disposed in the second axial direction and may lower the resistance of the voltage lines.

The fifth switch element T5 is connected between the second node n2 and the second initialization voltage line IL2. The fifth switch element T5 is turned on according to the gate-on voltage VGL of the second gate signal SCAN2 to connect the second node n2 to the second initialization voltage line IL2. The fifth switch element T5 includes a first electrode connected to the second initialization voltage line IL2, a gate electrode to which the second gate signal SCAN2 is applied, and a second electrode connected to the second node n2.

As in FIG. 15, the second initialization voltage line IL2 may include a second-first initialization voltage line IL2-1 to which a second-first initialization voltage Vini_P (GB) is applied and a second-second initialization voltage line IL2-2 to which a second-second initialization voltage Vini_S (GB) is applied. The second-first initialization voltage line IL2-1 may be connected to the first node n1 of the green and blue sub-pixels, and the second-second initialization voltage line IL2-2 may connect the second node n2 of the green and blue sub-pixels.

The second-first and second-second initialization voltage lines IL2-1 and IL2-2 include first voltage lines a21 and a22 to which the initialization voltage is applied from the power supply 150 of FIG. 1, and second voltage lines b21 and b22 that are branched from the first voltage lines a21 and a22. The first voltage lines a21 and a22 may be formed to have a first size having a first width and a first thickness, and the second voltage lines b21 and b22 may be formed to have a second size having a second width and a second thickness which is smaller than the first size.

The first voltage lines a21 and a22 may be disposed in the non-display area NA surrounding the display area AA that displays an image, and the second voltage lines b21 and b22 may be disposed in the display area AA. The second voltage lines b21 and b22 may include a plurality of second-first voltage lines b21-1 and b22-1 branched from the first voltage line disposed in the first axial direction and a plurality of second-second voltage lines b21-2 and b22-2 branched from the first voltage line disposed in the second axial direction, respectively.

The second-first voltage lines b21-1 and b22-1 may supply the initialization voltage to the corresponding sub-pixels. In one or more examples, each of the second-first voltage lines b21-1 may be connected to one or more corresponding sub-pixels (e.g., green and blue sub-pixels; e.g., first nodes n1 of the green and blue sub-pixels), and supply the initialization voltage to the one or more corresponding sub-pixels. Similarly, each of the second-first voltage lines b22-1 may be connected to one or more corresponding sub-pixels (e.g., green and blue sub-pixels; e.g., second nodes n2 of the green and blue sub-pixels), and supply the initialization voltage to the one or more corresponding sub-pixels.

The second-second voltage lines b21-2 and b22-2 may connect the first voltage lines a21 and a22 disposed in the second axial direction and may lower the resistance of the voltage lines.

In this case, two voltage lines may be formed to be arranged for every one pixel line. For example, but not necessarily limited to, each of the second-second voltage line b11-2 and second-second voltage line b21-2; and second-second voltage lines b12-2 and second-second voltage lines b22-2 may be formed to be alternately arranged one pair for each pixel line within the display area AA.

As in FIG. 16, the first-first initialization voltage Vini_P (R), the first-second initialization voltage Vini_S(R), the second-first initialization voltage Vini_P (GB), and the second-second initialization voltage Vini_S (GB) are set to be larger in this order, but may be set to be less than the reference voltage Vref.

For example, the reference voltage Vref may be set to 3V, the first-first initialization voltage Vini_P(R) to 0.5V, the first-second initialization voltage Vini_S(R) to 1 V, the second-first initialization voltage Vini_P (GB) to 1.5 V, and the second-second initialization voltage Vini_S (GB) to 2 V.

Referring to FIG. 17, different initialization voltages, such as the first initialization voltages Vini_P/S(R) and the second initialization voltages Vini_P/S (GB), may be applied for each color of different sub-pixels.

For example, the first initialization voltages Vini_P/S(R) may be applied to the first node n1 and the second node n2 of the red sub-pixel, and the second initialization voltages Vini_P/S (GB) may be applied to the first node n1 and the second node n2 of the green and blue sub-pixels.

Figure 18A:
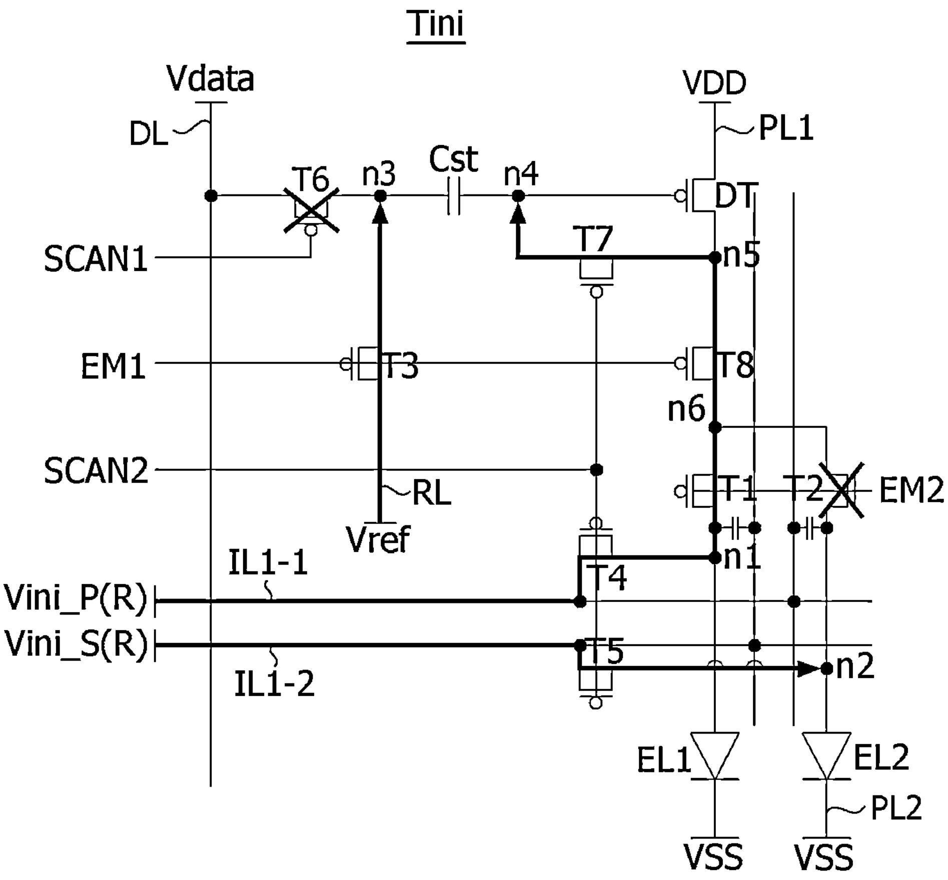
FIGS. 18A to 18C are example diagrams illustrating an operation principle of the pixel circuit shown in FIG. 14B.
Figure 18A:
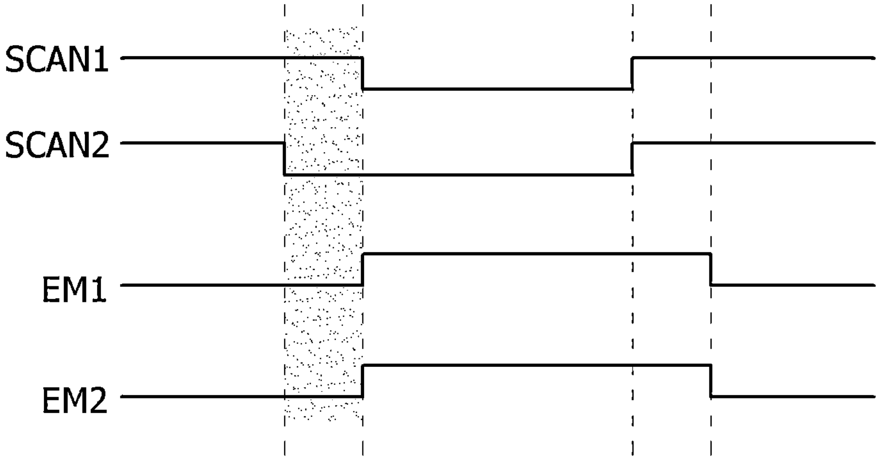
Figure 18B:
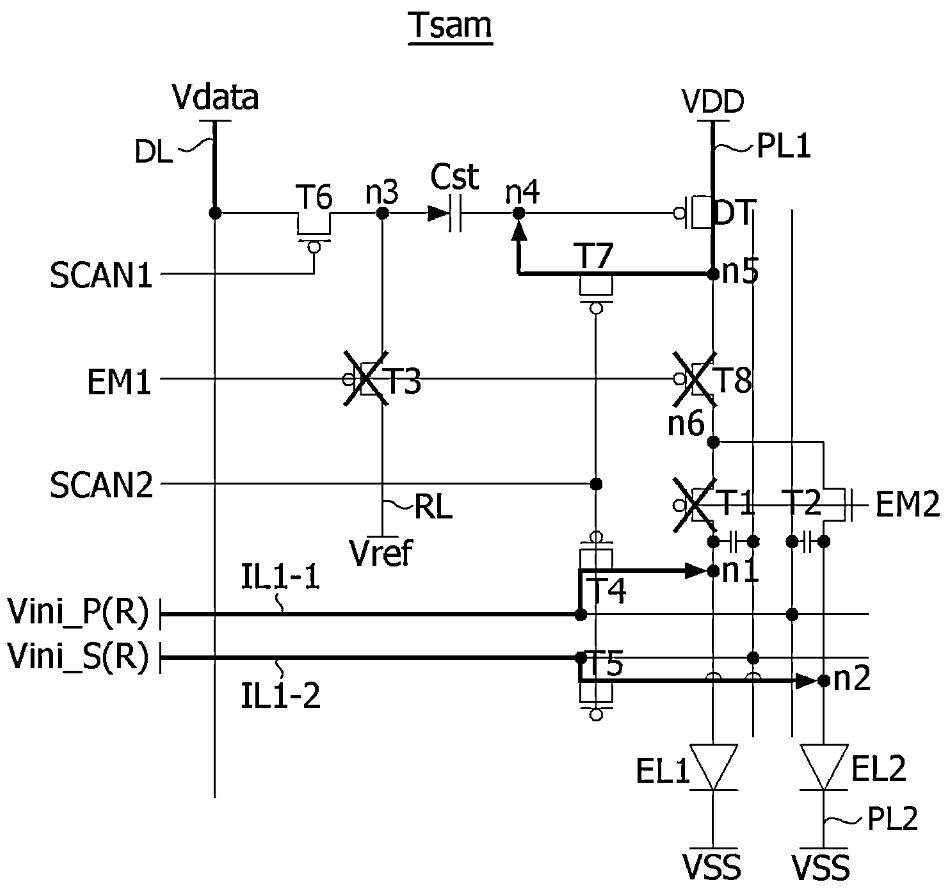
Figure 18B:
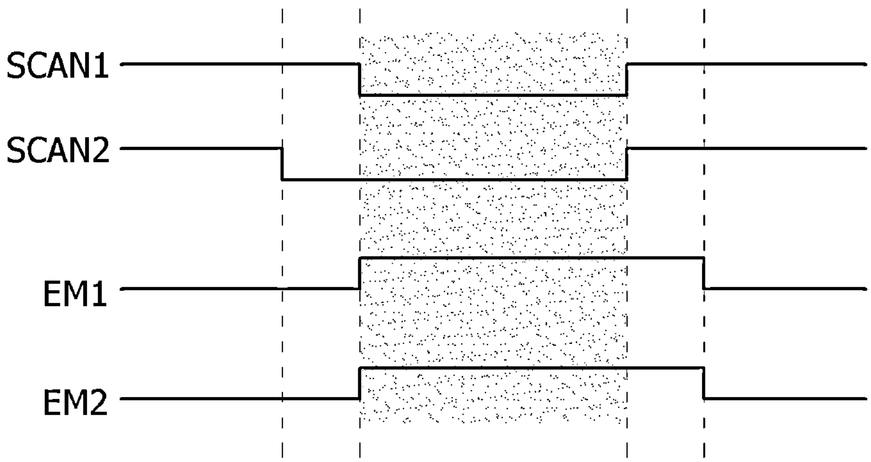
Figure 18C:
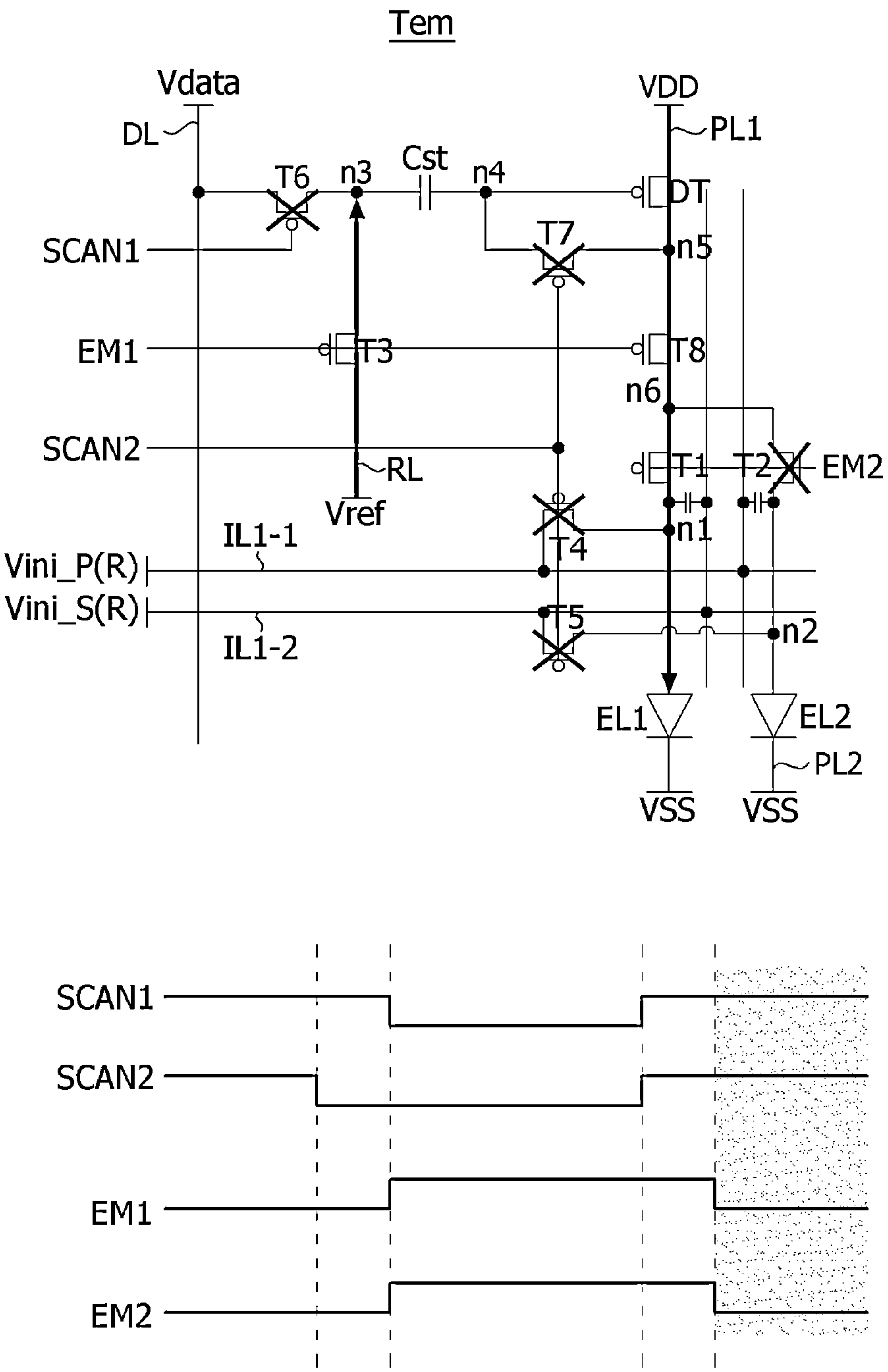

FIGS. 18A to 18C are example diagrams illustrating an operation principle of the pixel circuit shown in FIG. 14B.

The pixel circuit according to the third example embodiment is driven in the following sequence: an initialization period Tini, a sampling period Tsam, and a light emission period Tem in the first mode and the second mode. The time during which the initialization period Tini, the sampling period Tsam, and the light emission period Tem are carried out may be controlled by the waveforms of the gate signals SCAN1, SCAN2, EM1, and EM2.

Here, for convenience, the operating principle of the pixel circuit in the first mode will be described.

Referring to FIG. 18A, during the initialization period Tini, the second switch element T2 and the sixth switch elements T6 may be turned off, while the first switch element T1, the third to fifth switch elements T3 to T5, and the seventh to eighth switch elements T7 to T8 may be turned on, so that the reference voltage may be applied to the third node n3, the first-first reference voltage Vini_P(R) may be applied to the first node n1 and the first-second initialization voltage Vini_S(R) may be applied to the second node n2.

Referring to FIG. 18B, during the sampling period Tsam, the first switch element T1, the third switch element T3, and the eighth switch element T8 are turned off, while the second switch element T2 and the fourth to seventh switch elements T4 to T7 are turned on, so that the data voltage Vdata of the pixel data is applied to the third node n3 and the pixel driving voltage VDD is applied to the driving element DT to sense the threshold voltage Vth of the driving element, and consequently, the voltage of the fourth node n4 becomes a voltage VDD+Vth.

Referring to FIG. 18C, during the light emission period Tem, the second switch element T2 and the fourth to seventh switch elements T4 to T7 are turned off, while the first switch element T1, the third switch element T3, and the eighth switch element T8 are turned on, so that the current generated according to the gate-source voltage of the driving element DT is supplied to the first light-emitting element EL1, thereby causing the first light emitting element EL1 to emit light.

Figure 19A:
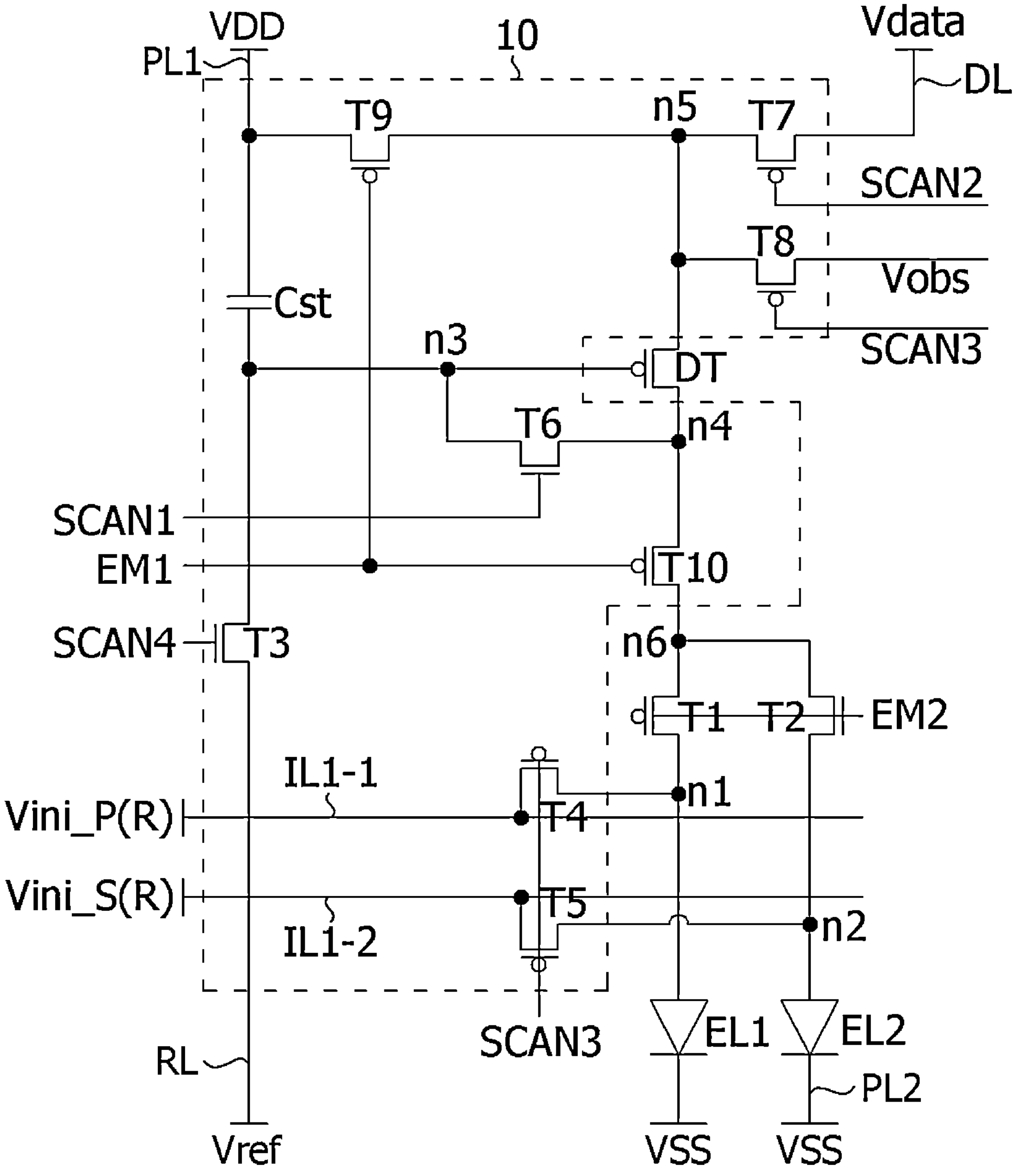
FIGS. 19A and 19B are circuit diagrams illustrating a pixel circuit according to a fourth example embodiment of the present disclosure.
Figure 19B:
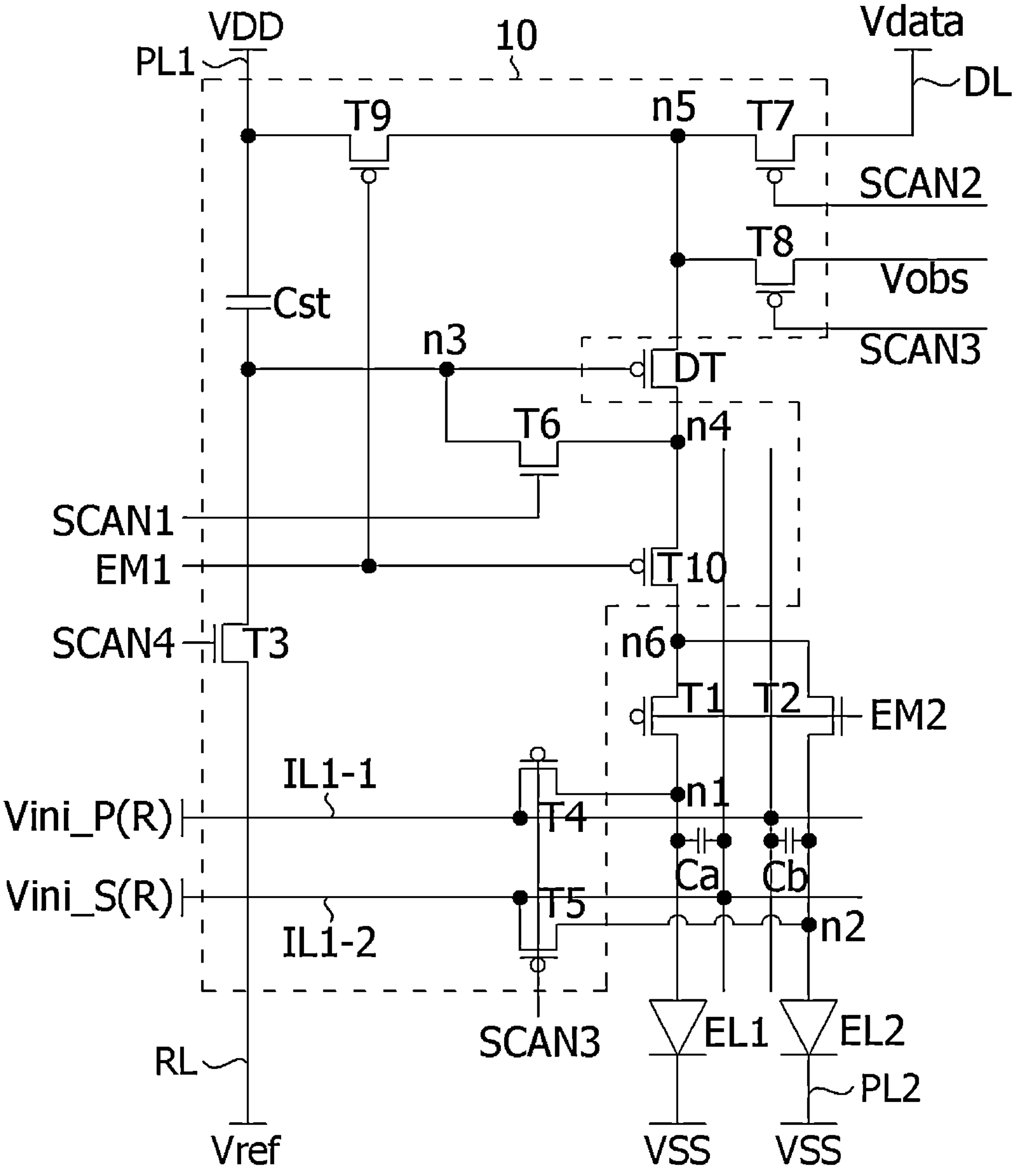
Figure 20:
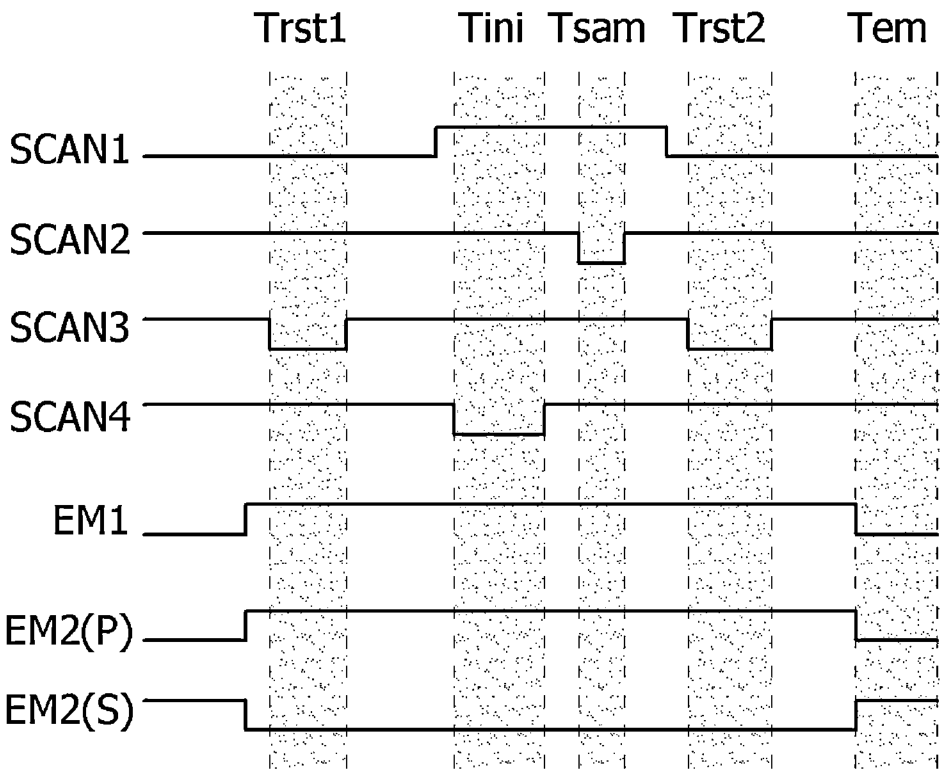
FIG. 20 is an example of a diagram illustrating a driving waveform of the pixel circuit shown in FIG. 10.

FIGS. 19A and 19B are circuit diagrams illustrating a pixel circuit according to a fourth example embodiment of the present disclosure, and FIG. 20 is an example of a diagram illustrating a driving waveform of the pixel circuit shown in FIG. 10.

Referring to FIGS. 19A and 19B, a pixel circuit according to a fourth example embodiment includes a first light-emitting element EL1 that emits light in the first mode PMODE, a second light-emitting element EL2 that emits light in the second mode SMODE, a driving element DT to drive the first and second light-emitting elements EL1 and EL2, a compensation circuit 10 connected to the driving element, a first switch element T1, and a second switch element T2. The compensation circuit includes a plurality of switch elements T3 to T10 and a capacitor Cst. The driving element DT and the plurality of switch elements T1, T4 to T5, and T7 to T10 may be implemented as p-channel transistors, and the switch element T2 to T3 and T6 may be implemented as n-channel transistors, but are not necessarily limited thereto.

The driving element DT generates a current according to the gate-source voltage Vgs to drive the first and second light-emitting elements EL1 and EL2. The driving element DT includes a first electrode connected to a fifth node n5, a gate electrode connected to a third node n3, and a second electrode connected to a fourth node n4.

Each of the first and second light-emitting elements EL1 and EL2 may be implemented as an OLED. The light-emitting elements EL1 and EL2 include an anode electrode, a cathode electrode, and an organic compound layer formed between these electrodes. An anode electrode of the first light-emitting element EL1 is connected to a first node n1, and a cathode electrode thereof is connected to the second constant voltage node PL2 to which the pixel base voltage VSS is applied. An anode electrode of the second light-emitting element EL2 is connected to a second node n2, and a cathode electrode thereof is connected to the second constant voltage node PL2.

A first switch element T1 is connected between the first node n1 and the sixth node n6. The first switch element T1 is turned on according to the gate-on voltage VGL of a sixth gate signal EM2 to connect the first node n1 to the sixth node n6. The first switch element T1 includes a first electrode connected to the sixth node n6, a gate electrode to which the sixth gate signal EM2 is applied, and a second electrode connected to the first node n1.

A second switch element T2 is connected between the second node n2 and the sixth node n6. The second switch element T2 is turned on according to the gate-on voltage VGH of the sixth gate signal EM2 to connect the second node n2 to the sixth node n6. The second switch element T2 includes a first electrode connected to the sixth node n6, a gate electrode to which the sixth gate signal EM2 is applied, and a second electrode connected to the second node n2.

A third switch element T3 is connected between a third node n3 and the reference voltage line RL. The third switch element T3 is turned on according to the gate-on voltage VGH of a fourth gate signal SCAN4 to connect the third node n3 to the reference voltage line RL. The third switch element T3 includes a first electrode connected to the third node n3, a gate electrode to which the fourth gate signal SCAN4 is applied, and a second electrode connected to the reference voltage line RL.

A fourth switch element T4 is connected between the first node n1 and the first-first initialization voltage line IL1-1. The fourth switch element T4 is turned on according to the gate-on voltage VGL of a third gate signal SCAN3 to connect the first node n1 to the first-first initialization voltage line IL1-1. The fourth switch element T4 includes a first electrode connected to the first-first initialization voltage line IL1-1, a gate electrode to which the third gate signal SCAN3 is applied, and a second electrode connected to the first node n1.

A fifth switch element T5 is connected between the second node n2 and the first-second initialization voltage line IL1-2. The fifth switch element T5 is turned on according to the gate-on voltage VGL of the third gate signal SCAN3 to connect the second node n2 to the first-second initialization voltage line IL1-2. The fifth switch element T5 includes a first electrode connected to the first-second initialization voltage line IL1-2, a gate electrode to which the third gate signal SCAN3 is applied, and a second electrode connected to the second node n2.

A sixth switch element T6 is connected between the third node n3 and the fourth node n4. The sixth switch element T6 is turned on in response to the gate-on voltage VGH of the first gate signal SCAN1 to connect the gate electrode of the driving element DT and a second electrode thereof. The sixth switch element T6 includes a first electrode connected to the third node n3, a gate electrode to which the first gate signal SCAN1 is applied, and a second electrode connected to the fourth node n4.

A seventh switch element T7 is connected between the data line DL and the fifth node n5. The seventh switch element T7 is turned on according to the gate-on voltage VGL of the second gate signal SCAN2 to apply the data voltage Vdata of pixel data to the fifth node n5. The seventh switch element T7 includes a first electrode connected to the fifth node n5, a gate electrode to which the second gate signal SCAN2 is applied, and a second electrode connected to the data line DL.

An eighth switch element T8 is connected between the fifth node n5 and a bias voltage line BL. The eighth switch element T8 is turned on according to the gate-on voltage VGL of the third gate signal SCAN3 to connect the fifth node n5 to the bias voltage line BL. The eighth switch element T8 includes a first electrode connected to the fifth node n5, a gate electrode to which the third gate signal SCAN3 is applied, and a second electrode connected to the bias voltage line BL.

A ninth switch element T9 is connected between the first power line PL1 and the fifth node n5. The ninth switch element T9 is turned on according to the gate-on voltage VGL of a fifth gate signal EM1 to connect the first power line PL1 to the fifth node n5. The ninth switch element T9 includes a first electrode connected to the first power line PL1, a gate electrode to which the fifth gate signal EM1 is applied, and a second electrode connected to the fifth node n5.

A tenth switch element T10 is connected between the fourth node n4 and the sixth node n6. The tenth switch element T10 is turned on according to the gate-on voltage VGL of the fifth gate signal EM1 to connect the fourth node n4 to the sixth node n6. The tenth switch element T10 includes a first electrode connected to the fourth node n4, a gate electrode to which the fifth gate signal EM1 is applied, and a second electrode connected to the sixth node n6.

The pixel circuit according to the fourth example embodiment is driven in the following sequence: an initialization period Tini, a sampling period Tsam, an OBS period Tobs, and a light emission period Tem in the first mode and the second mode, as shown in FIG. 20. The time during which the initialization period Tini, the sampling period Tsam, the OBS period Tobs, and the light emission period Tem are performed may be controlled by the waveforms of the gate signals SCAN1 to SCAN4 and EM1 to EM2.

Here, the sixth gate signal EM2(P) may be applied when the pixel circuit is driven in the first mode PMODE, and the sixth gate signal EM2(S) may be applied when the pixel circuit is driven in the second mode SMODE.

In the first to fourth example embodiments as described above, since the first mode and the second mode are determined by the EM signal, the entire screen is operated in the first mode or the second mode.

Figure 21:
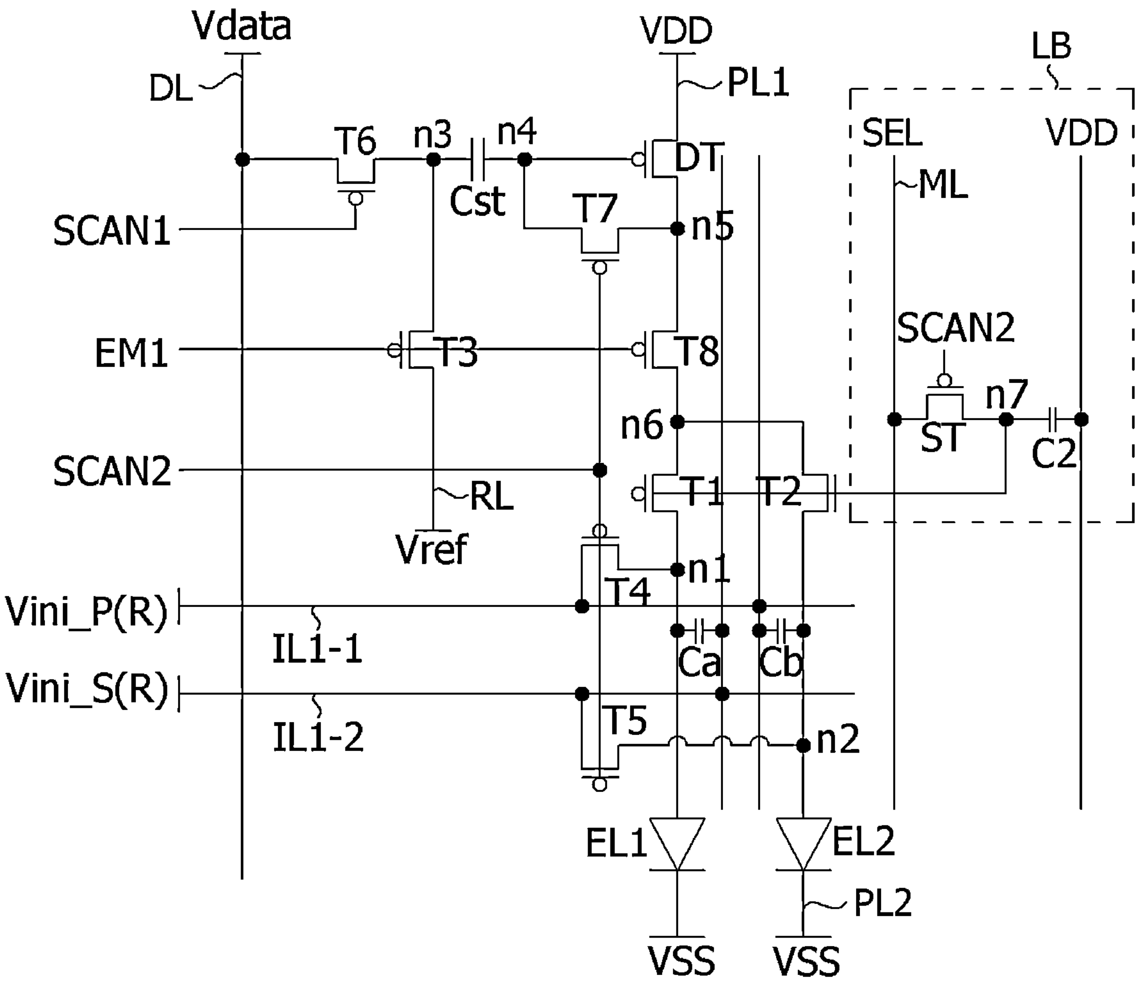
FIG. 21 is a circuit diagram illustrating a pixel circuit according to a fifth example embodiment of the present disclosure.
Figure 22A:
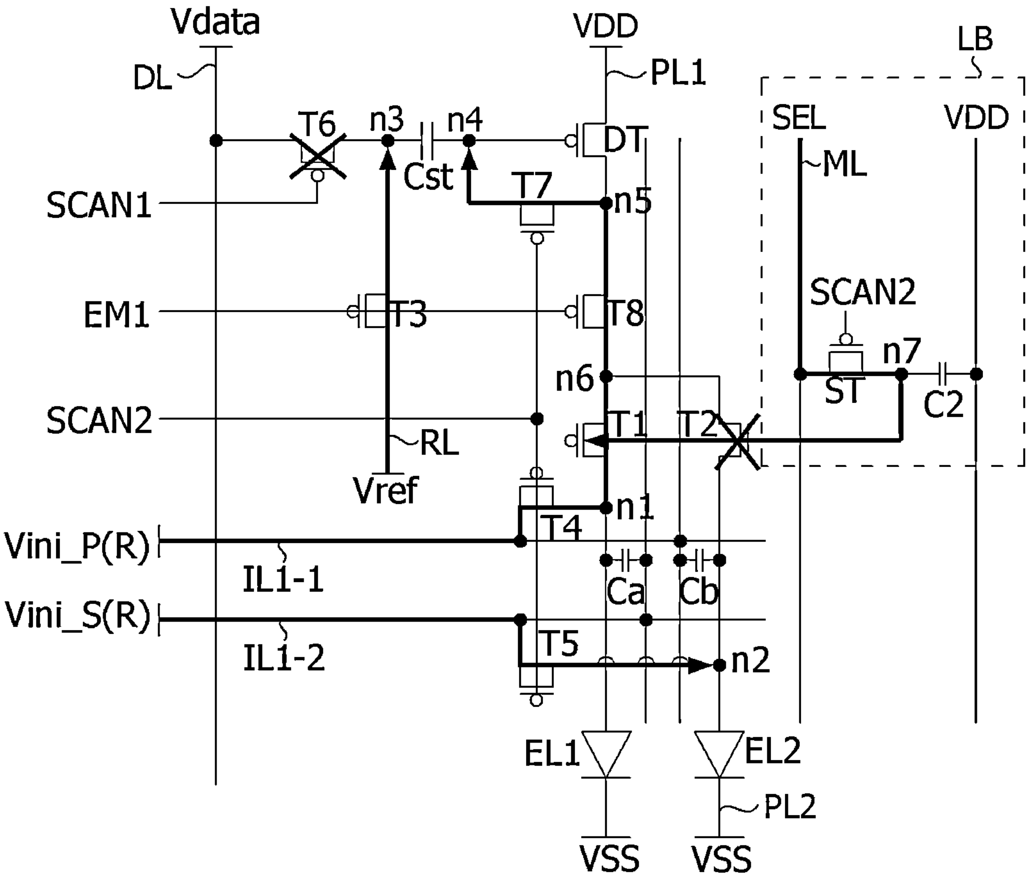
FIGS. 22A to 22C are example diagrams illustrating an operation principle of the pixel circuit shown in FIG. 21.
Figure 22A:
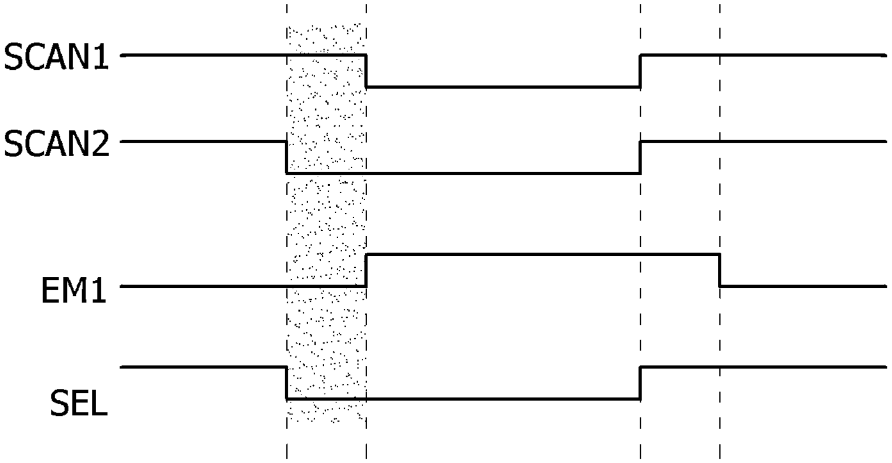
Figure 22B:
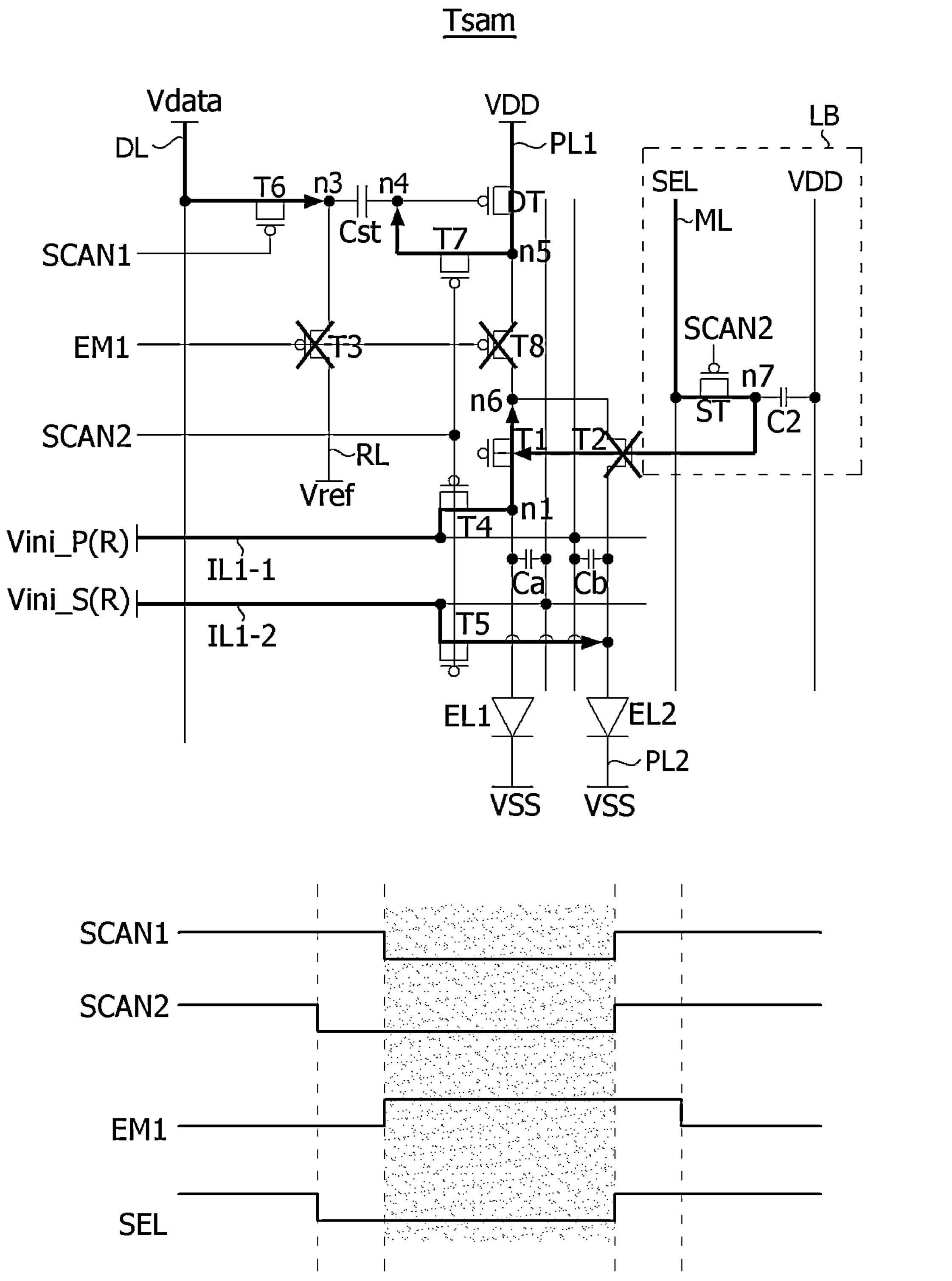
Figure 22C:
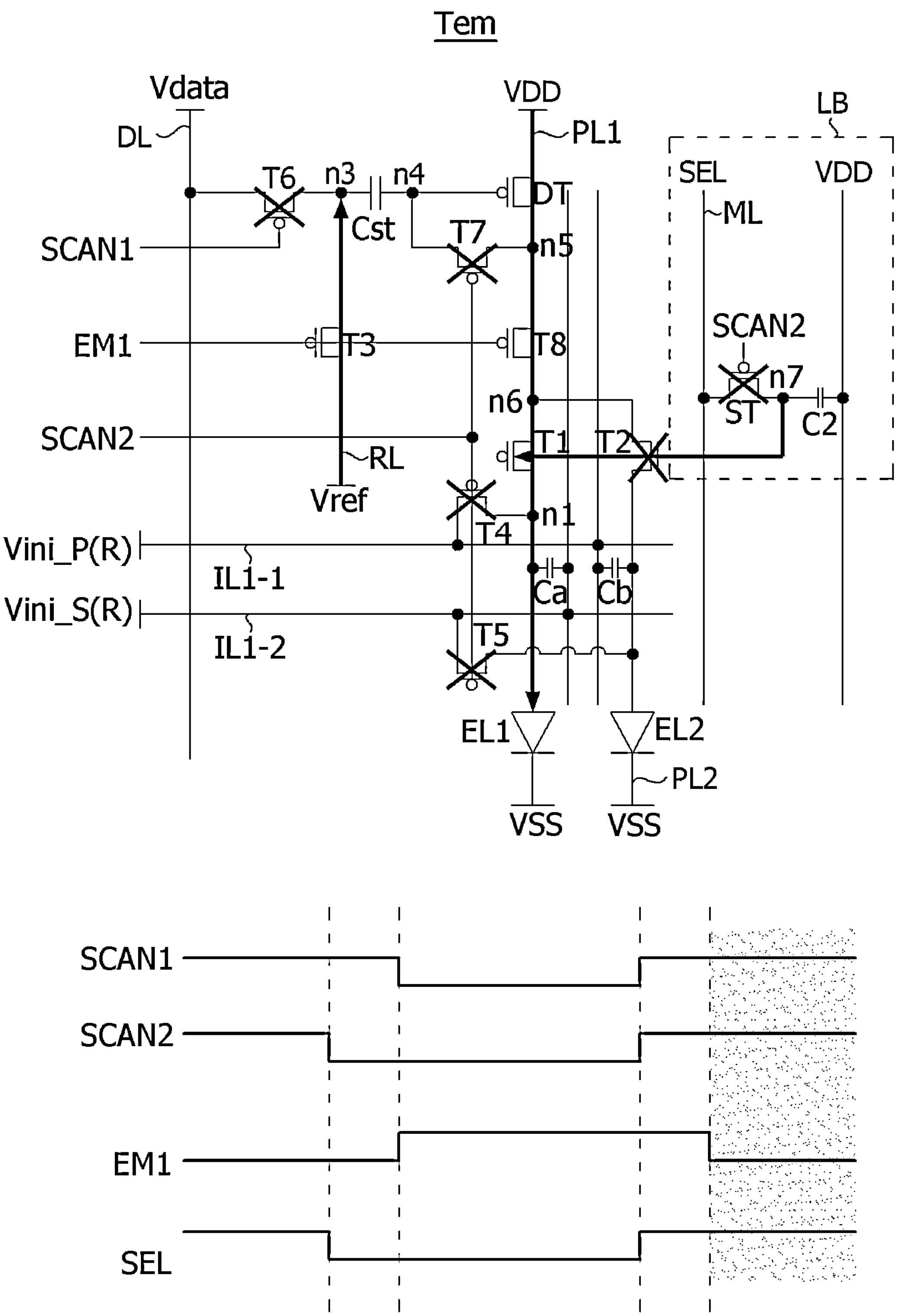

FIG. 21 is a circuit diagram illustrating a pixel circuit according to a fifth example embodiment of the present disclosure, and FIGS. 22A to 22C are example diagrams illustrating an operation principle of the pixel circuit shown in FIG. 21.

Referring to FIG. 21, a pixel circuit according to a fifth example embodiment includes a first light-emitting element EL1 that emits light in the first mode PMODE, a second light-emitting element EL2 that emits light in the second mode SMODE, a driving element DT to drive the first and second light-emitting elements EL1 and EL2, a compensation circuit 10 connected to the driving element, a first switch element T1, and a second switch element T2. The compensation circuit includes a plurality of switch elements T3 to T8 and a capacitor Cst. The driving element DT and the plurality of switch elements T1 and T3 to T8 may be implemented as p-channel transistors, and the switch element T2 may be implemented as an n-channel transistor, but are not necessarily limited thereto.

The pixel circuit according to the fifth example embodiment is the same as the pixel circuit according to the third example embodiment of FIGS. 14A to 14B, with a different configuration in which a selection block LB is added, and therefore only the different configuration is described.

The selection block LB may include a selection switch element ST and a second capacitor C2.

The selection switch element ST is connected between a mode line ML and a seventh node n7. The selection switch element ST is turned on according to the gate-on voltage VGL of the second gate signal SCAN2 to connect the mode line ML, to which a mode selection signal SEL is applied, to the seventh node n7. The selection switch element ST includes a first electrode connected to the mode line ML, a gate electrode to which the second gate signal SCAN2 is applied, a second electrode connected to the seventh node n7.

The second capacitor C2 may be connected between the seventh node n7 and the first power line PL1.

The pixel circuit according to the fifth example embodiment is driven in the following sequence: an initialization period Tini, a sampling period Tsam, and a light emission period Tem in the first mode and the second mode. The time during which the initialization period Tini, the sampling period Tsam, and the light emission period Tem are performed may be controlled by the waveforms of the gate signals SCAN1, SCAN2, and EM1.

Here, for convenience, the operating principle of the pixel circuit in the first mode will be described.

Referring to FIG. 22A, during the initialization period Tini, the second switch element T2 and the sixth switch elements T6 may be turned off, while the first switch element T1, the third to fifth switch elements T3 to T5, and the seventh to eighth switch element T7 to T8 may be turned on, so that the reference voltage Vref may be applied to the third node n3, the first initialization voltage Vini_P(R) may be applied to the first node n1, and the second initialization voltage Vini_S(R) may be applied to the second node n2.

Referring to FIG. 22B, during the sampling period Tsam, the second to third switch element T2 to T3 and the eighth switch element T8 are turned off, while the first switch element T1, the fourth to seventh switch elements T4 to T7, and the selection switch element ST are turned on, so that the data voltage Vdata of pixel data is applied to the third node n3 and the pixel driving voltage VDD is applied to the driving element DT to sense the threshold voltage Vth of the driving element, and consequently, the voltage of the fourth node n4 becomes a voltage VDD+Vth.

Referring to FIG. 22C, during the light emission period Tem, the second switch element T2, the fourth to seventh switch elements T4 to T7, and the selection switch element ST are turned off, while the first switch element T1, the third switch element T3, and the eighth switch element T8 are turned on, so that the current generated according to the gate-source voltage of the driving element DT is supplied to the first light-emitting element EL1, thereby causing the first light emitting element EL1 to emit light.

In this case, even if the selector switch element ST is switched to the turn-off state, the seventh switch element T7 may be maintained in the turn-on state due to the voltage stored in the second capacitor C2.

Figure 23:
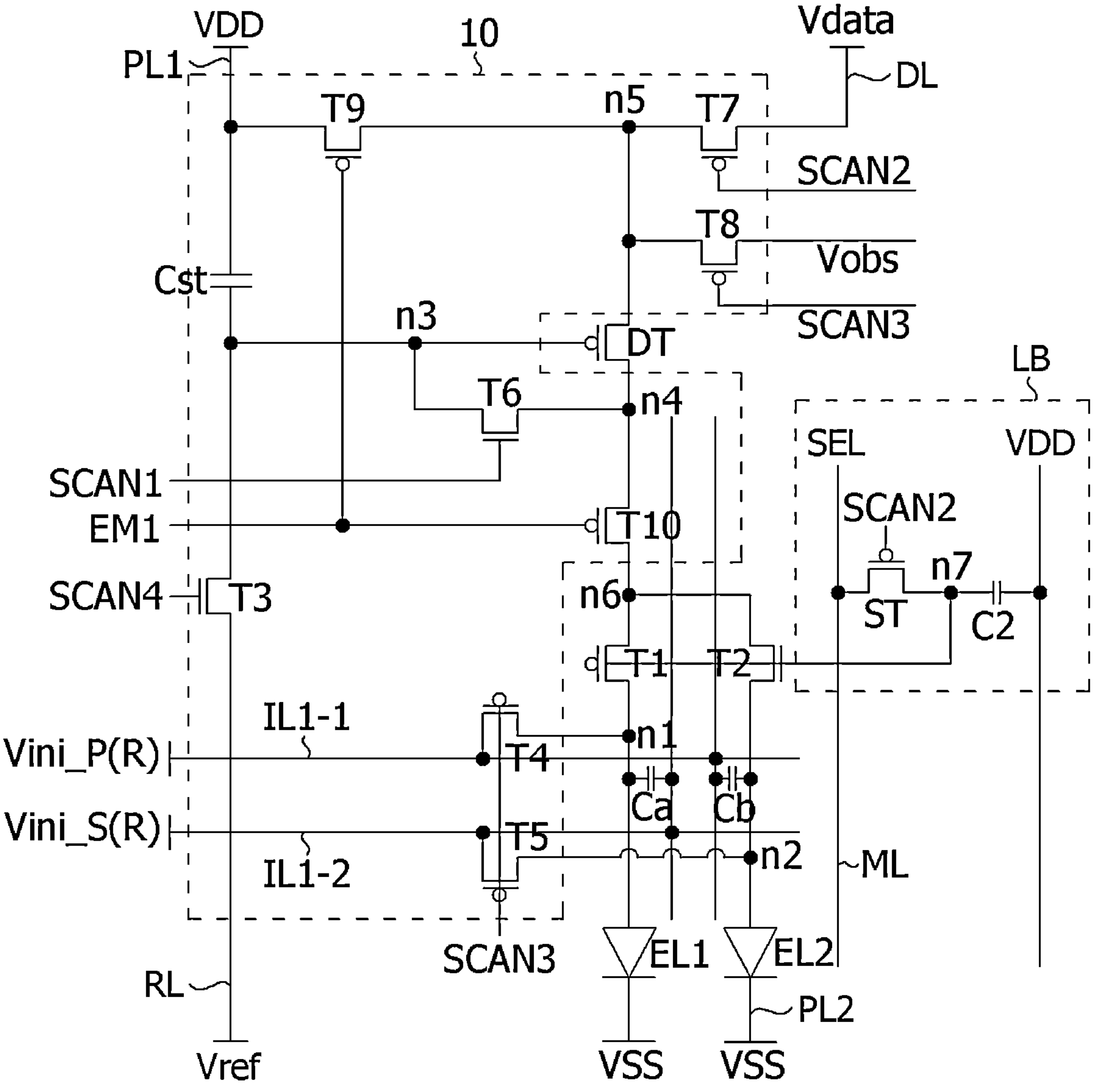
FIG. 23 is a circuit diagram illustrating a pixel circuit according to a sixth example embodiment of the present disclosure.

FIG. 23 is a circuit diagram illustrating a pixel circuit according to a sixth example embodiment of the present disclosure, and FIGS. 24A to 24E are example diagrams illustrating an operation principle of the pixel circuit shown in FIG. 23.

Referring to FIG. 23, a pixel circuit according to a sixth example embodiment includes a first light-emitting element EL1 that emits light in the first mode PMODE, a second light-emitting element EL2 that emits light in the second mode SMODE, a driving element DT to drive the first and second light-emitting elements EL1 and EL2, a compensation circuit 10 connected to the driving element, a first switch element T1, and a second switch element T2. The compensation circuit includes a plurality of switch elements T3 to T10 and a capacitor Cst. The driving element DT and the plurality of switch elements T1, T4 to T5, and T7 to T10 may be implemented as p-channel transistors, and the switch element T2 to T3 and T6 may be implemented as n-channel transistors, but are not necessarily limited thereto.

The pixel circuit according to the sixth example embodiment is the same as the pixel circuit according to the fourth example embodiment of FIGS. 19B, with a different configuration in which a selection block LB is added, and therefore only the different configuration is described.

The selection block LB may include a selection switch element ST and a second capacitor C2.

The selection switch element ST is connected between a mode line ML and a seventh node n7. The selection switch element ST is turned on according to the gate-on voltage VGL of the second gate signal SCAN2 to connect the mode line ML, to which a mode selection signal SEL is applied, to the seventh node n7. The selection switch element ST includes a first electrode connected to the mode line ML, a gate electrode to which the second gate signal SCAN2 is applied, a second electrode connected to the seventh node n7.

The second capacitor C2 may be connected between the seventh node n7 and the first power line PL1.

The pixel circuit according to the sixth example embodiment is driven in the first mode PMODE and the second mode SMODE in the following sequence: a first reset period Trst1, an initialization period Tini, a sampling period Tsam, a second reset period Trst2, and a light emission period Tem. The time during which the initialization period Tini, the sampling period Tsam, and the light emission period Tem are performed may be controlled by the waveforms of the gate signals SCAN1, SCAN2, SCAN3, SCAN4, and EM1.

Here, for convenience, the operating principle of the pixel circuit in the first mode will be described.

Figure 24A:
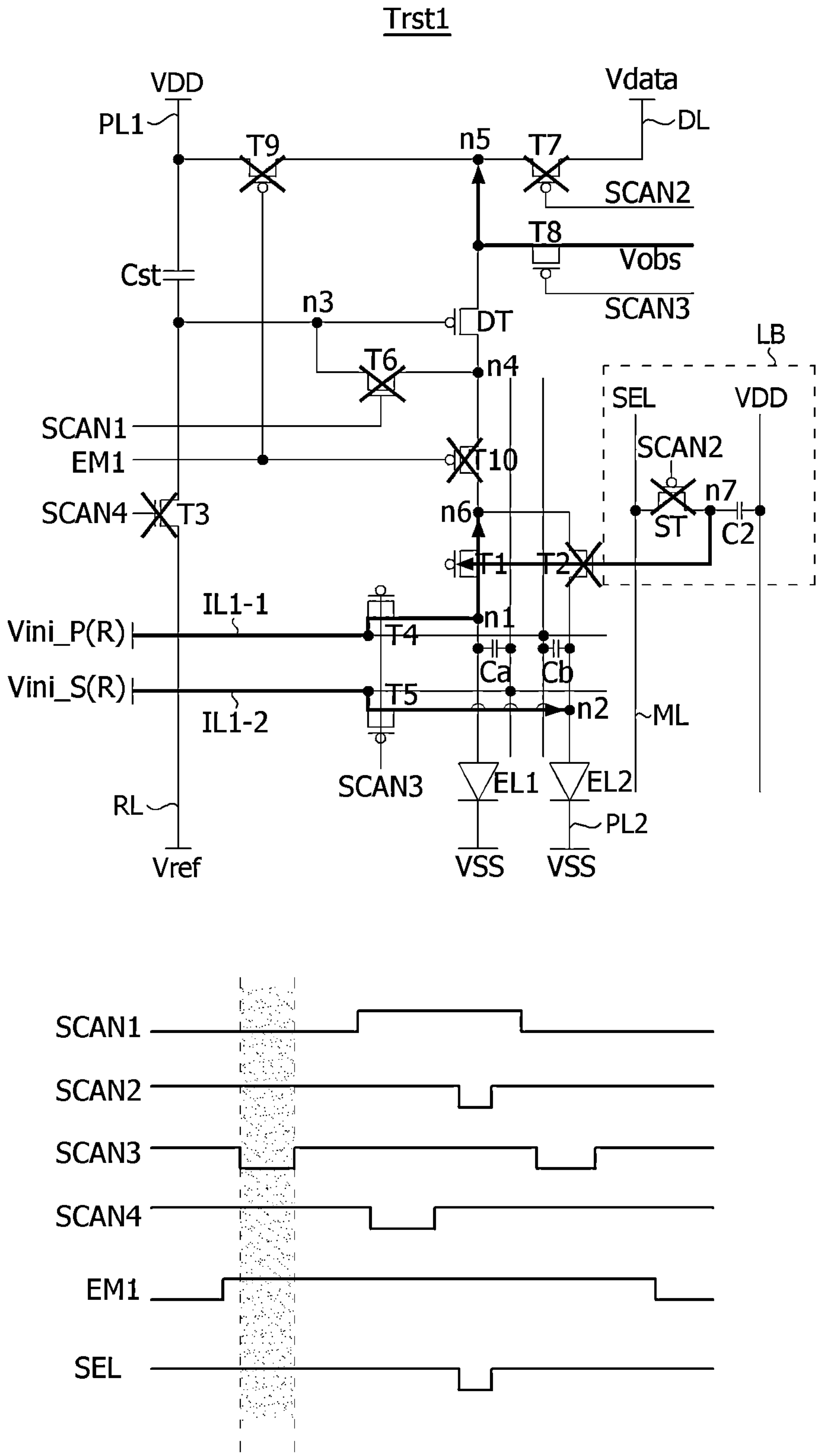
FIGS. 24A to 24E are example diagrams illustrating an operation principle of the pixel circuit shown in FIG. 23.

Referring to FIG. 24A, during the first reset period Trst1, the second to third switch elements T2 to T3, the sixth to seventh switch elements T6 to T7, the ninth to tenth switch elements T9 to T10, and the selection switch element ST are turned off, while the first switch element T1, the fourth to fifth switch elements T4 to T5 and the eighth switch element T8 are turned on, so that the first initialization voltage Vini_P(R) may be applied to the first node n1 and the second initialization voltage Vini_S(R) may be applied to the second node n2.

Figure 24B:
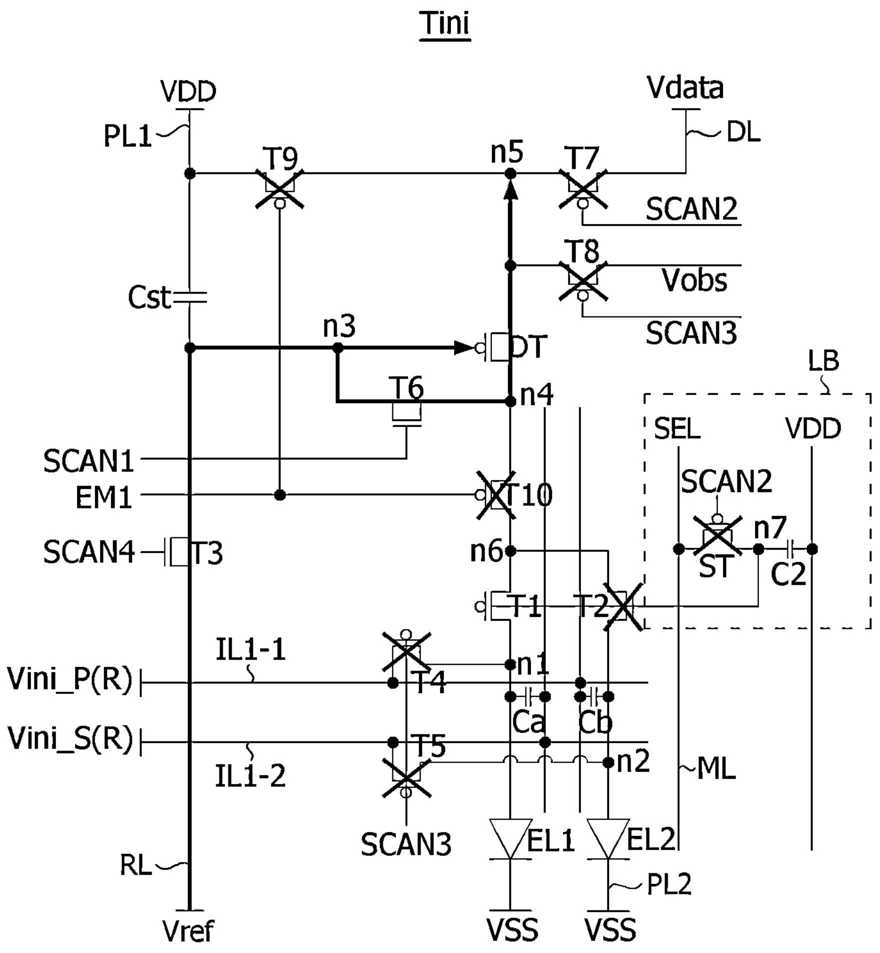
Figure 24B:
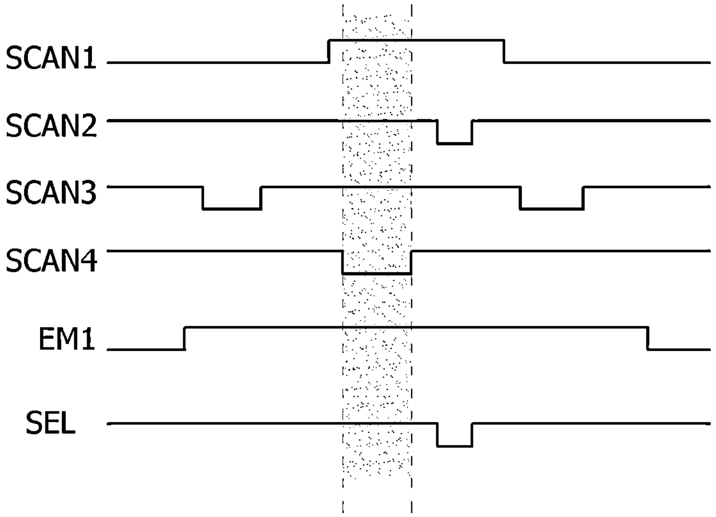

Referring to FIG. 24B, during the initialization period Tini, the second switch element T2, the fourth to fifth switch elements T4 to T5, the seventh to tenth switch elements T7 to T10, and the selection switch element ST are turned off, while the first switch element T1, the third switch element T3, and the sixth switch element T6 are turned on, so that a reset voltage Vref may be applied to the third node n3 and the fifth node n5. In one or more aspects, a reference voltage and a reference voltage line may be referred to as a reset voltage and a reset voltage line, respectively, and vice versa.

Figure 24C:
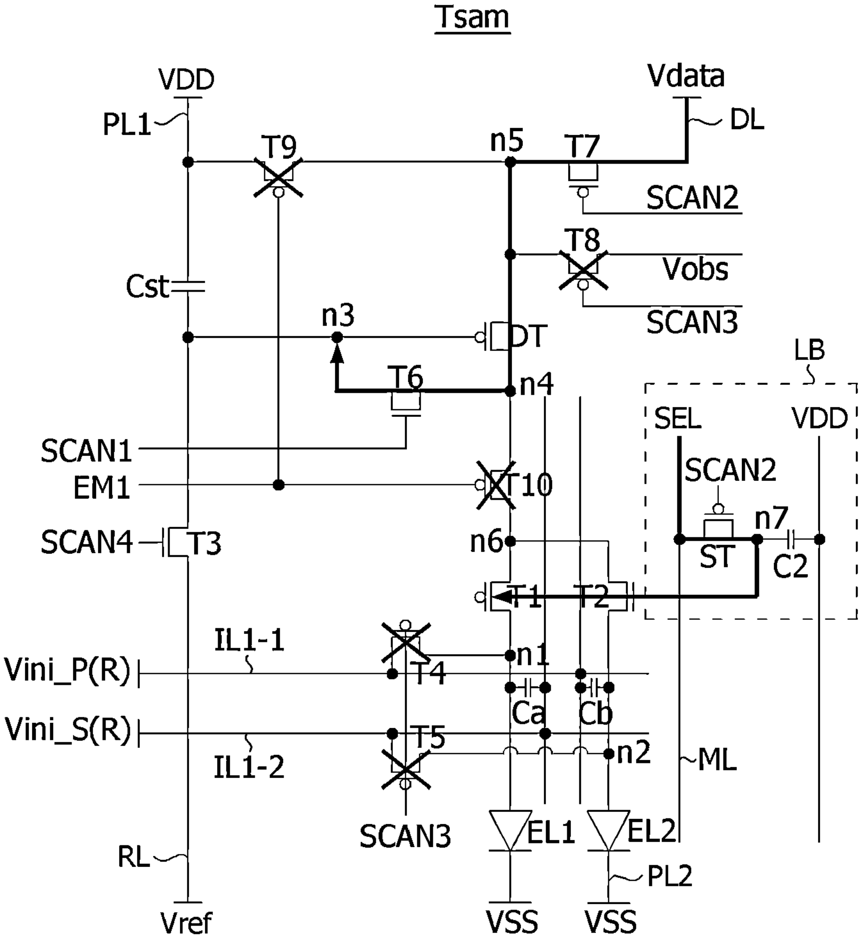
Figure 24C:
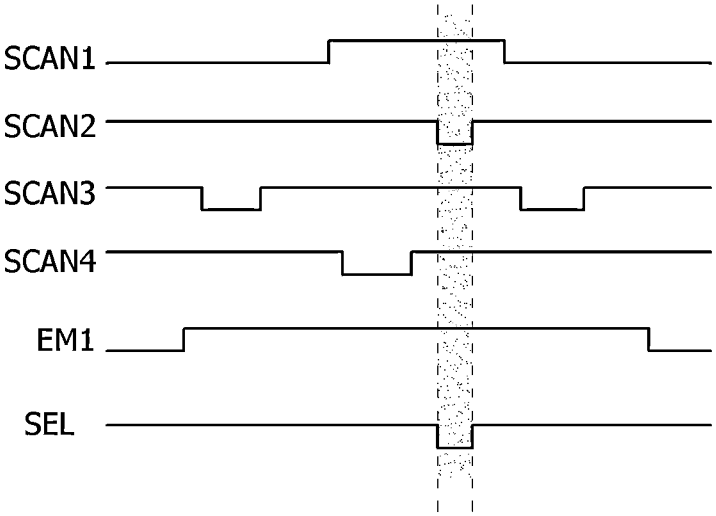

Referring to FIG. 24C, during the sampling period Tsam, the fourth to fifth switch elements T4 to T5, and the eighth to tenth switch elements T8 to T10 are turned off, while the first switch element T1 to the third switch element T3, the sixth to seventh switch elements T6 to T7, and the selection switch element ST are turned on, so that the data voltage Vdata of pixel data is applied to the third node n3 to sense the threshold voltage Vth of the driving element, and consequently, the voltage of the third node n3 becomes a voltage Vdata+Vth.

Figure 24D:
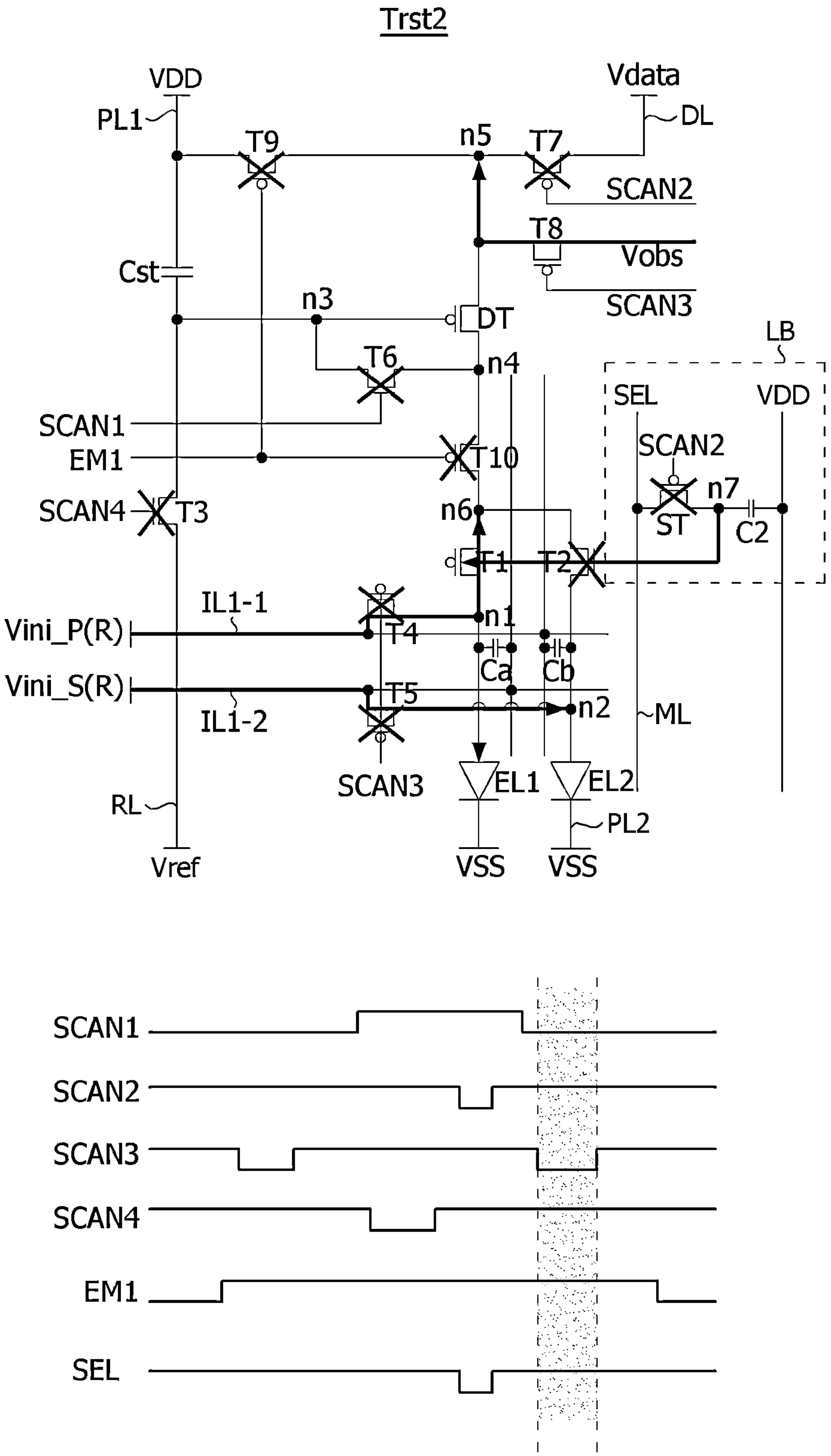

Referring to FIG. 24D, during the second reset period Trst2, the second to seventh switch elements T2 to T7, the ninth to tenth switch elements T9 to T10, and the selection switch element ST are turned off, while the first switch element T1 and the eighth switch element T8 are turned on, so that the first initialization voltage Vini_P(R) may be applied to the first node n1 and the second initialization voltage Vini_S(R) may be applied to the second node n2.

Figure 24E:
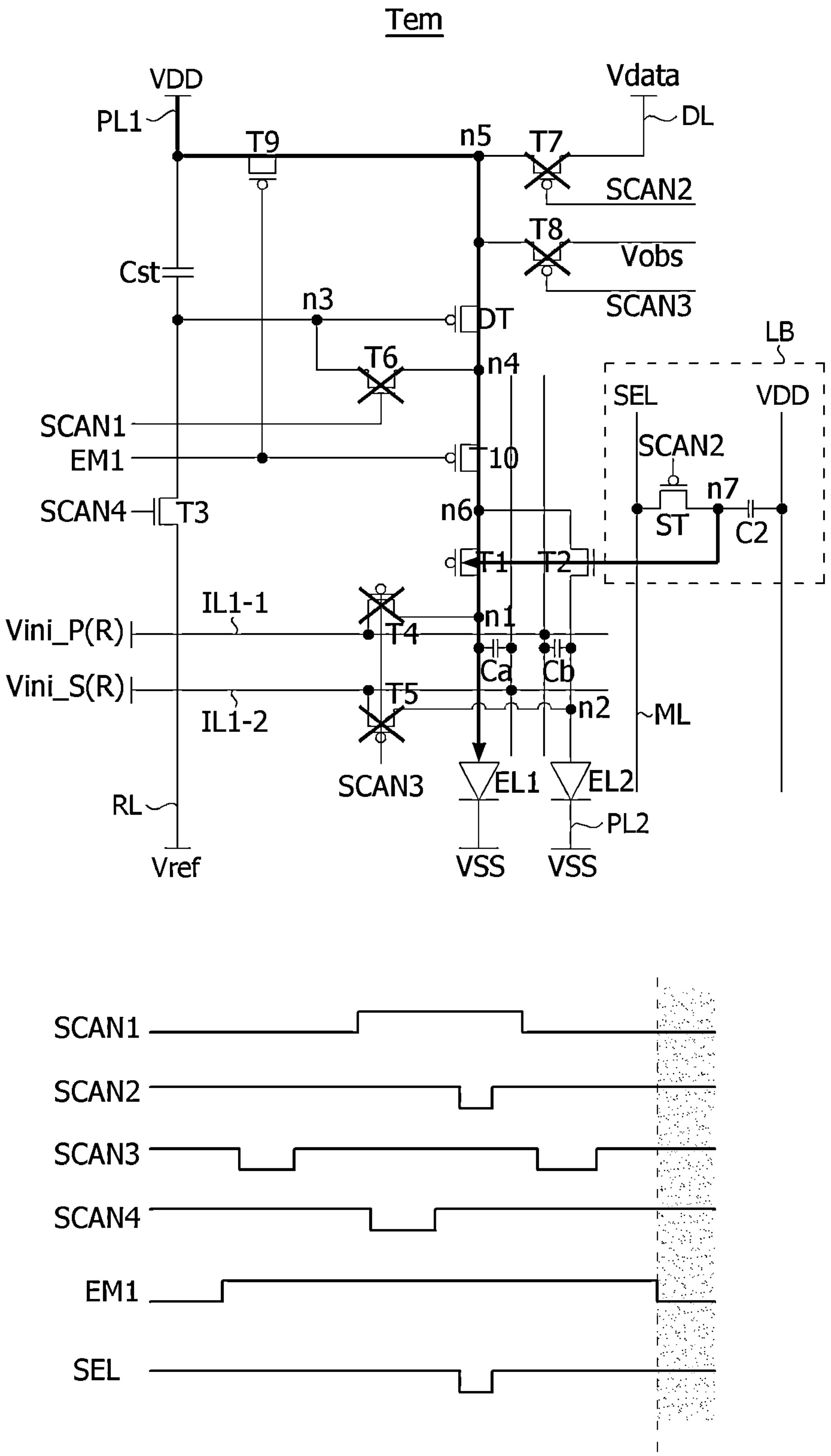

Referring to FIG. 24E, during the light emission period Tem, the fourth to eighth switch elements T4 to T8 are turned off, while the first switch element T1 to the third switch element T3, the ninth to tenth switch elements T9 to T10, and the selection switch element ST are turned on, so that the current generated according to the gate-source voltage of the driving element DT is supplied to the first light-emitting element EL1, thereby causing the first light-emitting element to emit light.

In this case, even if the selector switch element ST is switched to the turn-off state, the first switch element T1 may be maintained in the turn-on state due to the voltage stored in the second capacitor C2.

In the fifth to sixth example embodiments as described above, since the first mode and the second mode are determined by the mode selection signal, the pixel circuit is operated in the first mode or the second mode in units of a pixel.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The scope of protection of the present disclosure should be construed based on the following claims, and all technical features within the scope of equivalents thereof should be construed as being included within the scope of the present disclosure.

What is claimed is:

1. A pixel circuit, comprising:

a first light-emitting element;

a second light-emitting element;

a driving element configured to drive the first and second light-emitting elements;

a first switch element connected between the driving element and the first light-emitting element;

a second switch element connected between the driving element and the second light-emitting element; and a compensation circuit, including:

a capacitor connected to a gate electrode of the driving element;

a third switch element directly connected between a voltage line to which a reference voltage is for being applied and one electrode of the capacitor;

a fourth switch element directly connected between a first node to which an anode electrode of the first light-emitting element is connected and an initialization voltage line to which an initialization voltage is for being applied;

a fifth switch element directly connected between a second node to which an anode electrode of the second light-emitting element is connected and the initialization voltage line; and a switch element connected between a node of the driving element and a sixth node, wherein:

the first switch element includes a first electrode connected to the sixth node, a second electrode connected to the first node, and a gate electrode to which a first gate signal is for being applied; and the second switch element includes a first electrode connected to the sixth node, a second electrode connected to the second node, and a gate electrode to which the first gate signal is for being applied.

2. The pixel circuit of claim 1, wherein the initialization voltage is set to be lower than the reference voltage.

3. The pixel circuit of claim 1, wherein a first repair capacitor is formed between the initialization voltage line and the first node, and a second repair capacitor is formed between the initialization voltage line and the second node.

4. The pixel circuit of claim 3, wherein the driving element includes the gate electrode connected to a fourth node, a first electrode connected to a power line to which a pixel driving voltage is for being applied, and a second electrode connected to a fifth node, the capacitor is connected between a third node and the fourth node, and the third switch element is connected between the third node and the voltage line to which the reference voltage is for being applied, and wherein the compensation circuit further includes:

a sixth switch element connected between the third node and a data line; and a seventh switch element connected between the fourth node and the fifth node.

5. The pixel circuit of claim 4, wherein:

the fourth switch element includes a first electrode connected to the initialization voltage line, a gate electrode to which a second gate signal is for being applied, and a second electrode connected to the first node, and the fifth switch element includes a first electrode connected to the initialization voltage line, a gate electrode to which the second gate signal is for being applied, and a second electrode connected to the second node.

6. The pixel circuit of claim 3, wherein the driving element includes the gate electrode connected to a third node, a first electrode connected to a fifth node, and a second electrode connected to a fourth node, the capacitor is connected between a power line to which a pixel driving voltage is for being applied and the third node, and the third switch element is connected between the third node and the voltage line to which the reference voltage is for being applied, and wherein the compensation circuit further includes:

a sixth switch element connected between the third node and the fourth node;

a seventh switch element connected between the fifth node and a data line;

an eighth switch element connected between the fifth node and a bias voltage line to which a bias voltage is for being applied; and a ninth switch element connected between the power line and the fifth node.

7. The pixel circuit of claim 6, wherein:

the fourth switch element includes a first electrode connected to the initialization voltage line, a gate electrode to which a second gate signal is for being applied, and a second electrode connected to the first node, and the fifth switch element includes a first electrode connected to the initialization voltage line, a gate electrode to which the second gate signal is for being applied, and a second electrode connected to the second node.

8. The pixel circuit of claim 5, wherein the initialization voltage line includes:

a first initialization voltage line configured to apply a first initialization voltage to the anode electrode of the first light-emitting element; and a second initialization voltage line configured to apply a second initialization voltage to the anode electrode of the second light-emitting element, and wherein the first initialization voltage is set to be lower than the second initialization voltage.

9. A display device, comprising:

a pixel array in which a plurality of data lines, a plurality of gate lines, a plurality of voltage lines, and a plurality of pixel circuits are disposed;

a data driver configured to output data voltages to the plurality of data lines; and a gate driver configured to output gate signals to the plurality of gate lines, wherein each of the plurality of pixel circuits includes:

a first light-emitting element;

a second light-emitting element;

a driving element configured to drive the first and second light-emitting elements;

a first switch element connected between the driving element and the first light-emitting element;

a second switch element connected between the driving element and the second light-emitting element; and a compensation circuit, including:

a capacitor connected to a gate electrode of the driving element;

a third switch element directly connected between a voltage line to which a reference voltage is for being applied and one electrode of the capacitor;

a fourth switch element directly connected between a first node to which an anode electrode of the first light-emitting element is connected and an initialization voltage line to which an initialization voltage is for being applied;

a fifth switch element directly connected between a second node to which an anode electrode of the second light-emitting element is connected and the initialization voltage line; and a switch element connected between a node of the driving element and a sixth node, wherein:

the first switch element includes a first electrode connected to the sixth node, a second electrode connected to the first node, and a gate electrode to which a first gate signal is for being applied; and the second switch element includes a first electrode connected to the sixth node, a second electrode connected to the second node, and a gate electrode to which the first gate signal is for being applied.

10. The display device of claim 9, wherein a first repair capacitor is formed between the initialization voltage line and the first node, and a second repair capacitor is formed between the initialization voltage line and the second node.

11. The display device of claim 10, wherein the driving element includes the gate electrode connected to a fourth node, a first electrode connected to a power line to which a pixel driving voltage is for being applied, and a second electrode connected to a fifth node, the capacitor is connected between a third node and the fourth node, and the third switch element is connected between the third node and the voltage line to which the reference voltage is for being applied, and wherein the compensation circuit further includes:

a sixth switch element connected between the third node and a data line; and a seventh switch element connected between the fourth node and the fifth node.

12. The display device of claim 11, wherein:

the fourth switch element includes a first electrode connected to the initialization voltage line, a gate electrode to which a second gate signal is for being applied, and a second electrode connected to the first node, and the fifth switch element includes a first electrode connected to the initialization voltage line, a gate electrode to which the second gate signal is for being applied, and a second electrode connected to the second node.

13. The display device of claim 10, wherein the driving element includes the gate electrode connected to a third node, a first electrode connected to a fifth node, a second electrode connected to a fourth node, the capacitor is connected between a power line to which a pixel driving voltage is for being applied and the third node, and the third switch element is connected between the third node and the voltage line to which the reference voltage is for being applied, and wherein the compensation circuit further includes:

a sixth switch element connected between the third node and the fourth node;

a seventh switch element connected between the fifth node and a data line;

an eighth switch element connected between the fifth node and a bias voltage line to which a bias voltage is for being applied; and a ninth switch element connected between the power line and the fifth node.

14. The display device of claim 13, wherein:

the fourth switch element includes a first electrode connected to the initialization voltage line, a gate electrode to which a second gate signal is for being applied, and a second electrode connected to the first node, and the fifth switch element includes a first electrode connected to the initialization voltage line, a gate electrode to which the second gate signal is for being applied, and a second electrode connected to the second node.

15. The display device of claim 12, wherein the initialization voltage line includes:

a first initialization voltage line configured to apply a first initialization voltage to the anode electrode of the first light-emitting element; and a second initialization voltage line configured to apply a second initialization voltage to the anode electrode of the second light-emitting element, and wherein the first initialization voltage is set to be lower than the second initialization voltage.

16. The display device of claim 9, wherein the initialization voltage line includes:

a first-first initialization voltage line;

a first-second initialization voltage line;

a second-first initialization voltage line; and a second-second initialization voltage line, and wherein:

the first-first initialization voltage line is configured to apply a first-first initialization voltage to an anode electrode of a first light-emitting element included in a pixel circuit of a red sub-pixel;

the first-second initialization voltage line is configured to apply a first-second initialization voltage to anode electrodes of first light-emitting elements included in pixel circuits of green and blue sub-pixels;

the second-first initialization voltage line is configured to apply a second-first initialization voltage to an anode electrode of a second light-emitting element included in the pixel circuit of the red sub-pixel; and the second-second initialization voltage line is configured to apply a second-second initialization voltage to anode electrodes of second light-emitting elements included in the pixel circuits of the green and blue sub-pixels.

17. The display device of claim 16, wherein:

the second-first initialization voltage is set to be higher than the first-first initialization voltage;

the first-second initialization voltage is set to be higher than the second-first initialization voltage; and the second-second initialization voltage is set to be higher than the first-second initialization voltage.

18. The display device of claim 9, wherein:

the first light-emitting element is configured to emit light with a first viewing angle;

the second light-emitting element is configured to emit light with a second viewing angle; and the second viewing angle is wider than the first viewing angle.

19. The display device of claim 9, wherein each of the plurality of pixel circuits further includes:

a selection switch element connected between a mode line to which a mode selection signal is for being applied and respective gate electrodes of the first and second switch elements; and a second capacitor connected between the selection switch element and a power line, and wherein the selection switch element is configured to apply the mode selection signal to the respective gate electrodes of the first and second switch elements.

20. The display device of claim 10, wherein one of the first repair capacitor and the second repair capacitor is short-circuited.

21. The display device of claim 9, wherein the plurality of voltage lines include the initialization voltage line to which the initialization voltage is for being applied, and wherein the initialization voltage line includes:

a first voltage line which is disposed in a non-display area surrounding a display area for displaying an image and which is configured to receive the initialization voltage from a power supply; and a plurality of second voltage lines which are disposed in the display area, which are branched from the first voltage line, and which are configured to supply the initialization voltage to a plurality of sub-pixels.

22. The display device of claim 21, wherein the plurality of second voltage lines include:

a plurality of second-first voltage lines branched from a part of the first voltage line, wherein the plurality of second-first voltage lines are disposed in a first axial direction, and wherein each of the plurality of second-first voltage lines is configured to supply the initialization voltage to one or more corresponding sub-pixels of the plurality of sub-pixels; and a plurality of second-second voltage lines branched from a part of the first voltage line, wherein the plurality of second-second voltage lines are disposed in a second axial direction perpendicular to the first axial direction.

23. The display device of claim 22, wherein each of the plurality of second-second voltage lines connects two parts of the first voltage line respectively disposed in the second axial direction.

24. The display device of claim 21, wherein each of the plurality of second voltage lines has a width smaller than a width of the first voltage line and has a thickness smaller than a thickness of the first voltage line.

* * * * *